United States Patent [19]
Tanaka et al.

[11] Patent Number: 5,799,288
[45] Date of Patent: Aug. 25, 1998

[54] REMAINING MONEY MANAGEMENT SYSTEM WITH CASH DEMAND PREDICTION

[75] Inventors: Takao Tanaka; Masanori Mukai; Takeshi Nagaoka, all of Kawasaki; Kazuo Nakamura, Maebashi; Takaaki Hirooka, Kawasaki; Takuji Shiota, Kawasaki; Yoshihiro Kakiuchi, Kawasaki; Ryoichi Tabei, Kawasaki; Kouichi Matsuo, Kawasaki, all of Japan

[73] Assignee: Fujitsu Limited, Kanagawa, Japan

[21] Appl. No.: 672,052

[22] Filed: Jun. 26, 1996

[30] Foreign Application Priority Data

Jul. 11, 1995 [JP] Japan ................. 7-175283

[51] Int. Cl.[6] ................................. G07F 19/00
[52] U.S. Cl. ............................. 705/43; 705/42
[58] Field of Search .................... 705/42, 43

[56] References Cited

U.S. PATENT DOCUMENTS

| | | | |
|---|---|---|---|
| 3,648,020 | 3/1972 | Tateisi et al. | 705/43 |
| 3,801,805 | 4/1974 | Hatanaka et al. | 705/43 |
| 3,914,579 | 10/1975 | Shigemori et al. | 705/43 |
| 4,321,671 | 3/1982 | Ohsako | 705/43 |
| 4,602,332 | 7/1986 | Hirose et al. | 705/43 |
| 4,620,087 | 10/1986 | Aizaki | 235/379 |
| 4,638,434 | 1/1987 | Aizaki | 705/43 |
| 4,825,051 | 4/1989 | Kawai et al. | 705/43 |
| 4,884,514 | 12/1989 | Shockey et al. | 109/24.1 |
| 4,922,419 | 5/1990 | Ohashi et al. | 705/43 |

FOREIGN PATENT DOCUMENTS

| | | | |
|---|---|---|---|
| 0 644 511 A2 | 3/1995 | European Pat. Off. | G07D 13/00 |
| 2 269 256 | 2/1994 | United Kingdom | G07F 5/24 |

*Primary Examiner*—Allen R. MacDonald
*Assistant Examiner*—James W. Myhre
*Attorney, Agent, or Firm*—Nikaido, Marmelstein, Murray & Oram LLP

[57] ABSTRACT

The invention provides a remaining money management system which can predict and manage a demanded cash amount for an ATM. The remaining money management system includes one or more automatic cash transaction apparatus, and a remaining money management apparatus which manages remaining money amounts based on transaction data from the automatic cash transaction apparatus. The remaining money management apparatus includes a storage section for cumulatively storing transaction data from the automatic cash transaction apparatus, and a prediction section for calculating and predicting demanded cash amounts within a designated time for the automatic cash transaction apparatus based on transaction data in the past accumulated in the storage section. The remaining money amount management system can be applied to an apparatus for managing ATMs installed in monetary facilities such as banks.

45 Claims, 59 Drawing Sheets

FIG. 8

| FACTORS |
|---|
| ① DAY OF THE WEEK (MONDAY TO SUNDAY) |
| ② DATE (FIRST TO SIXTH WEEKS) |
| ③ END & BEGINNING OF MONTH/5TH/10TH DAY/PAYDAY, AROUND PAYDAY |
| ④ DATE (1ST TO 30TH DAY/EVERY THIRD DAY/EVERY FIFTH DAY) |
| ⑤ END & BEGINNING OF YEAR/GOLDEN WEEK/BON FESTIVAL (AROUND SUMMER VACATION) |
| ⑥ SEASON (SPRING, SUMMER, AUTUMN, WINTER) |
| ⑦ WEATHER (FINE/RAIN/SNOW) |
| ⋮ |

FIG. 10

| ITEM | | DAY OF THE WEEK | | | DATE | | | PARTICULAR DATE | | TOTAL OF DEMANDED MONEY AMOUNT IN THE PAST |
|---|---|---|---|---|---|---|---|---|---|---|
| | FACTOR | MONDAY | --- | SUNDAY | FIRST WEEK | --- | SIXTH WEEK | PAYDAY | --- | |
| FIRST WEEK | MONDAY | 5 TIMES | | 0 TIME | 3 TIMES | | 3 TIMES | 1 TIME | | 800 NOTES |
| | --- | | | | | | | | | |
| | SUNDAY | 0 TIME | | 5 TIMES | 5 TIMES | | 5 TIMES | 0 TIME | | 300 NOTES |
| DATE | FIRST WEEK | 3 TIMES | | 5 TIMES | 6 TIMES | | 0 TIME | 0 TIME | | 1000 NOTES |
| | --- | | | | | | | | | |
| | SIXTH WEEK | 3 TIMES | | 5 TIMES | 0 TIME | | 6 TIMES | 5 TIMES | | 2000 NOTES |
| PARTICULAR DATE | PAYDAY | 1 TIME | | 0 TIME | 0 TIME | | 5 TIMES | 3 TIMES | | 5000 NOTES |
| | --- | | | | | | | | | |

FIG. 11

| ITEM | DAY OF THE WEEK | | | | | | | DATE | | | | | | PARTICULAR DATE | |
|---|---|---|---|---|---|---|---|---|---|---|---|---|---|---|---|
| FACTOR | MONDAY | TUES-DAY | WEDNES-DAY | THURS-DAY | FRIDAY | SATUR-DAY | SUNDAY | 1ST WEEK | 2ND WEEK | 3RD WEEK | 4TH WEEK | 5TH WEEK | 6TH WEEK | PAYDAY | - |
| VALUE OF FACTOR | $X_{11}$ | $X_{12}$ | $X_{13}$ | $X_{14}$ | $X_{15}$ | $X_{16}$ | $X_{17}$ | $X_{21}$ | $X_{22}$ | $X_{23}$ | $X_{24}$ | $X_{25}$ | $X_{26}$ | $X_{31}$ | - |

FIG. 13

PREDICTION TABLE OF 1ST MACHINE (with 2ND MACHINE ... nTh MACHINE behind)

| ITEM | FACTOR | -1000 | -500 | 0 | 500 | 1000 | SCORE OF FACTOR |
|---|---|---|---|---|---|---|---|
| DAY OF THE WEEK | MONDAY | | | | | | 230 |
| | TUESDAY | | | | | | -150 |
| | WEDNESDAY | | | | | | -80 |
| | THURSDAY | | | | | | 170 |
| | FRIDAY | | | | | | 240 |
| | SATURDAY | | | | | | -90 |
| | SUNDAY | | | | | | -200 |
| DATE | 1ST WEEK | | | | | | -50 |
| | 2ND WEEK | | | | | | -130 |
| | 3RD WEEK | | | | | | 60 |
| | 4TH WEEK | | | | | | 260 |
| | 5TH WEEK | | | | | | 300 |
| | 6TH WEEK | | | | | | 100 |
| PARTICULAR DATE | PAYDAY | | | | | | 800 |
| | AFTER PAYDAY | | | | | | 500 |
| | OTHER THAN PAYDAY | | | | | | -500 |
| SEASON | SPRING | | | | | | --- |
| | SUMMER | | | | | | --- |
| | AUTUMN | | | | | | --- |
| | WINTER | | | | | | --- |

F I G. 23(a)
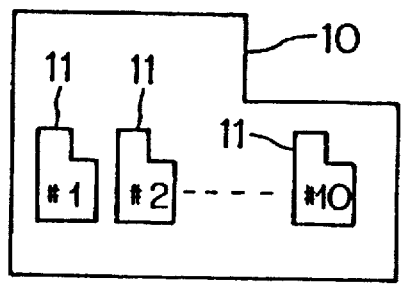
F I G. 23(b)
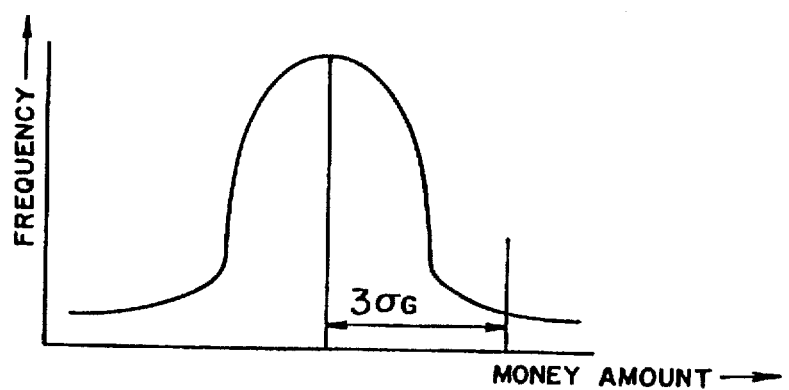

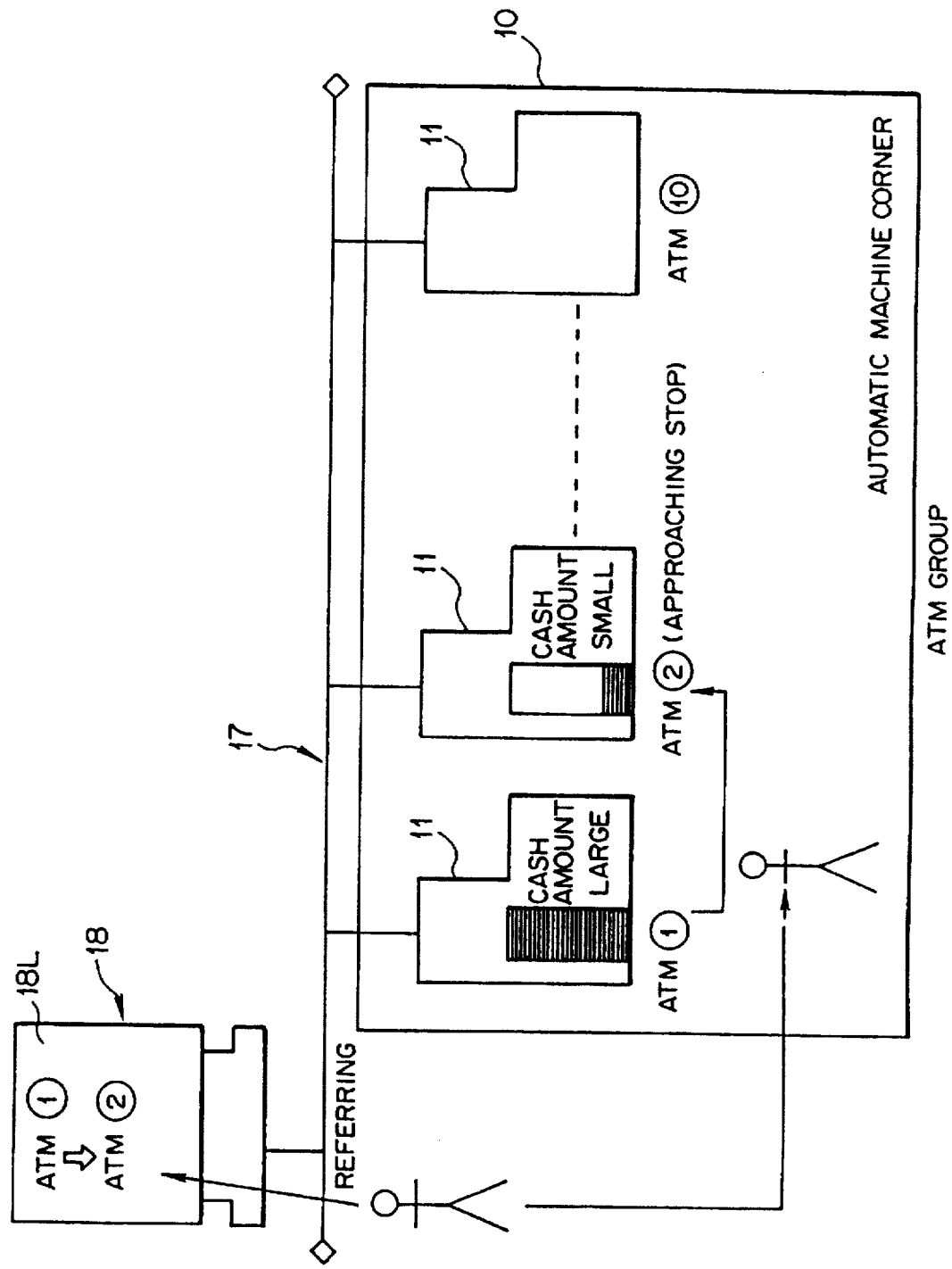

F I G. 48
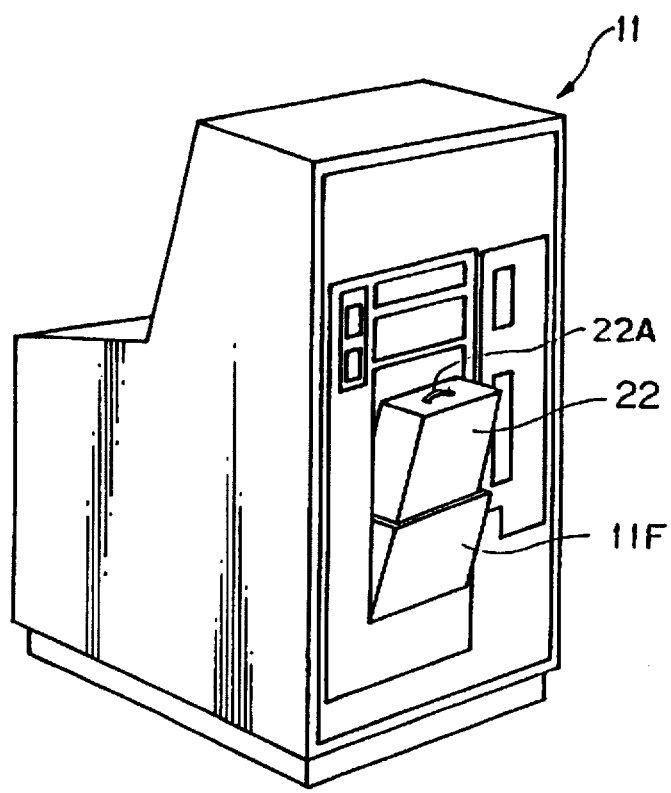

F I G. 63
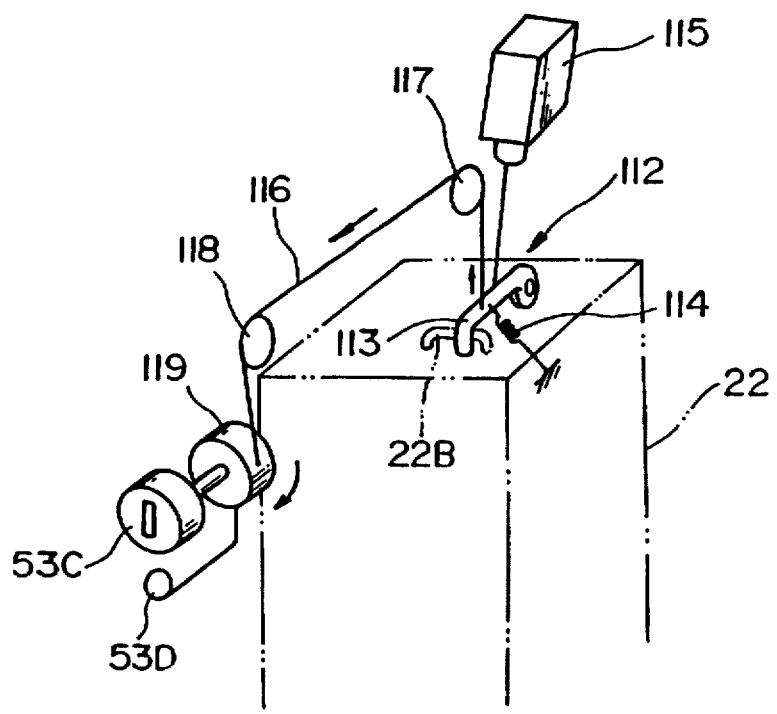

REMAINING MONEY MANAGEMENT SYSTEM WITH CASH DEMAND PREDICTION

BACKGROUND OF THE INVENTION

1. Field of the Invention

This invention relates to a remaining money management system for managing remaining money (remaining amounts of different currencies such as paper money or bills and coins) in an automatic teller machine installed in a bank or the like.

2. Description of the Related Art

Generally, supplement or extraction of cash into or from an automatic teller machine (hereinafter referred to ATM or automatic machine) installed in an automatic machine corner of a bank is performed by a staff member.

In such supplement or extraction, the numbers of different currencies to be supplemented or extracted and the time for supplement or extraction are decided frequently relying upon the experience or the sixth sense of the staff member, and usually, when shortage of the cash occurs with an ATM, a call is developed from the ATM and a staff member supplementally loads the ATM with cash in response to the call.

Since the timing at which cash is to be supplemented to or extracted from an ATM or the amount of money to be supplemented or extracted is decided relying upon the experience or the sixth sense of a staff member and cash is supplemented or extracted by hand of the staff member in this manner, the burden to the staff member is heavy. The burden is very heavy particularly where the staff member takes charge of a large number of ATMs.

Further, although the amount of money to be loaded into an ATM is desired to be as small as possible, where supplement and extraction of cash into and from the ATM is performed by a staff member as described above, the reduction of the amount of money to be loaded into the ATM depends upon the ability of the staff member.

SUMMARY OF THE INVENTION

It is an object of the present invention to provide a remaining money management system wherein demanded numbers of different currencies for an ATM can be predicted and managed to achieve reduction of the amount of money to be loaded into the ATM and reduction of the burden to a staff member.

In order to attain the object described above, according to the present invention, there is provided a remaining money management system, which comprises one or more automatic cash transaction apparatus, and a remaining money management apparatus for managing remaining money amounts corresponding to cash accommodated in the automatic cash transaction apparatus based on transaction data from the automatic cash transaction apparatus, the remaining money management apparatus including a storage section for cumulatively storing transaction data from the automatic cash transaction apparatus, and a prediction section for calculating and predicting demanded cash amounts within a designated period of time for the automatic cash transaction apparatus based on the transaction data in the past stored in the storage section.

In the remaining money management system, the prediction section of the remaining money management apparatus calculates and predicts demanded cash amounts within a designated period of time for the automatic cash transaction apparatus based on transaction data in the past stored in the storage section, and the remaining money amounts in the automatic cash transaction apparatus can be managed based on the predicted values. Consequently, the amounts of cash to be loaded into the automatic cash transaction apparatus can be reduced without relying upon the staff member, and the burden to the staff member can be reduced remarkably.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 8 is a diagrammatic view illustrating examples of the qualitative factor in the remaining money management system;

FIG. 10 is a diagrammatic view illustrating a cross tabulation table of qualitative factors produced upon conversion of qualitative data into quantitative data in prediction of a demanded cash amount in the remaining money management system;

FIG. 11 is a diagrammatic view illustrating values of factors defined upon conversion of qualitative data into quantitative data in prediction of a demanded cash amount in the remaining money management system;

FIG. 13 is a diagrammatic view illustrating prediction tables for individual ATMs in the remaining money management system;

FIGS. 20 and 21 are schematic views illustrating different examples of a display of a result of demanded cash amount prediction of the remaining money management system;

FIGS. 23(a) and 23(b) are a diagrammatic view and a graph, respectively, illustrating processing when group control is performed upon determination of a safe money amount in the remaining money management system;

FIG. 31 is a diagrammatic view illustrating a money circulation method in an ATM group by the remaining money management system;

FIG. 48 is a perspective view of an ATM employed in the remaining money management system as viewed from the rear side;

FIG. 63 is a perspective view schematically showing the locking mechanism of FIG. 62.

DESCRIPTION OF THE PREFERRED EMBODIMENT

A. Aspect of the Invention

Figure 1:
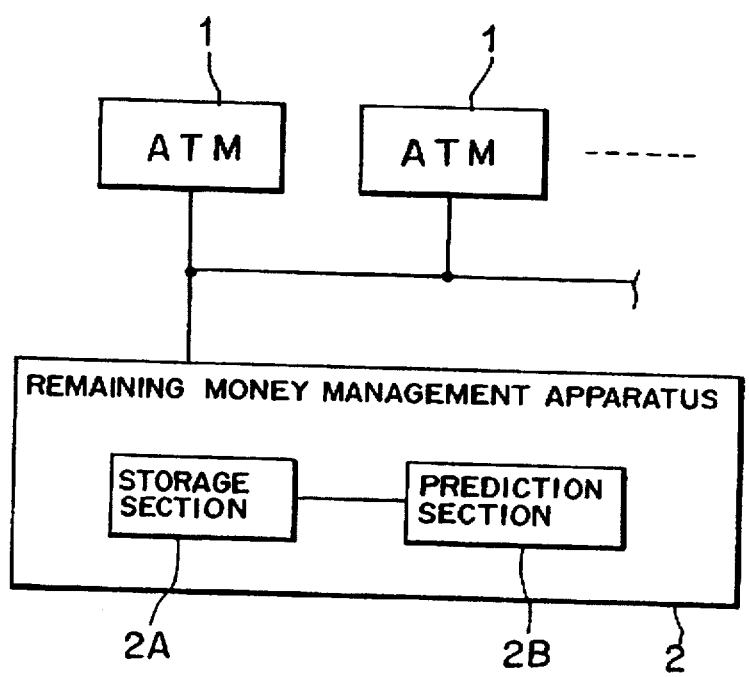
FIG. 1 is a block diagram illustrating an aspect of the present invention.

FIG. 1 is a block diagram illustrating an aspect of the present invention. Referring to FIG. 1, a remaining money management system includes one or more ATMs 1, and a remaining money management apparatus 2 for managing remaining money amounts corresponding to cash accommodated in the ATMs 1 based on transaction data from the ATMs 1.

The remaining money management apparatus 2 includes a storage section 2A for cumulatively storing transaction data from the ATMs 1, and a prediction section 2B for calculating and predicting demanded cash amounts within a designated period of time for the ATMs 1 based on the transaction data in the past stored in the storage section 2A.

The remaining money management system of the present invention may have the following various additional features.

(1) The prediction section 2B calculates a mean value of the demanded cash amounts in the past based on the transaction data in the past stored in the storage section 2A and converts, for each of qualitative factors which may have an influence on the demanded cash amount, a degree of influence of the qualitative factor on the demanded cash amount into a numerical value, and calculates a sum value of the mean value and the numerical data of the degrees of influence of the quality factors as a predicted value of the demanded cash amount. In this instance, the prediction section 2B converts the degree of influence of each of the quality factors for each of the ATMs 1 and produces and holds a prediction table of the numerical data for each of the ATMs 1. Further, the prediction table is produced for each of different currencies and after each fixed time interval.

(2) The remaining money management apparatus 2 calculates an error between an actual result value of the demanded cash amount and the predicted value of the demanded cash amount obtained by the prediction section 2B and automatically selects, based on the error, a qualitative factor to be used for calculation of the predicted value of the demanded cash amount.

(3) The prediction section 2B predicts, before money is supplemented to the ATMs 1, demanded cash amounts for a period of time after the current money supplementing time until a next money supplementing time and outputs the predicted values as initial load money amounts to the ATMs 1.

(4) The prediction section 2B predicts demanded cash amounts per unit time of the ATMs 1 and predicts demanded cash amounts on the real time basis till a predetermined point of time, normally supervises errors between actual remaining money amounts and the real time predicted values obtained by the prediction section 2B, calculates amounts of cash to be supplemented or extracted with which the errors are canceled, and indicates the calculated amounts of cash to be supplemented or extracted.

(5) The prediction section 2B produces and holds, for each of the ATMs 1, a predicted error table of errors between actual result values of the demanded cash amount and predicted values of the demanded cash amount obtained by the prediction section 2B is stored, calculates a standard deviation of the errors of the predictive error table as a standard error, and calculates a value obtained by multiplying the calculated standard error by a safety coefficient as a safety cash amount to be added to the predicted value of the demanded cash amount obtained by the prediction section 2B.

(6) The prediction section 2B predicts, where a plurality of ATMs 1 are involved, a total demanded cash amount for the plurality of ATMs 1, produces and holds a predicted error table of errors between sums of actual result values of the demanded cash amount of the plurality of ATMs 1 and predicted values of the total demanded cash amounts obtained for the plurality of ATMs 1 by the prediction section 2B, calculates a standard deviation of the errors of the predicted error table as a standard error, multiplies the calculated standard error by a safety coefficient to obtain a safety cash amount to be added to the predicted value of the total demanded cash amount obtained for the plurality of ATMs 1 by the prediction section 2B, and distributes the calculated safety cash amount at a distribution ratio to the ATMs 1.

In this instance, the safety cash amount may be distributed equally to the plurality of ATMs 1, or may be distributed to the ATMs 1 at a ratio of safety cash amounts individually calculated for the ATMs 1, or else may be distributed to the ATMs 1 at a ratio of squares of safety cash amounts individually calculated for the ATMs 1.

(7) The prediction section 2B predicts a predicted value of the demanded cash amount for each of the ATMs 1 after the current point of time after each time interval and determines a point of time at which the predicted value coincides with a current remaining cash amount in the ATM 1 as an operable time. (8) Where the remaining money management apparatus 2 is provided for each of a plurality of business offices, transaction data in the past of the plurality of business offices are analyzed to obtain a plurality of transaction form patterns to which the business offices individually belong, and in a first one of the business offices with which transaction data in the past to be used for prediction of demanded cash amounts by the prediction section 2B are not cumulatively stored in the storage section 2A, transaction data in the past of a second one of the other business offices which belongs to the same transaction form pattern as that of the first business office are stored into the storage section 2A, and then the prediction section 2B of the first business office predicts demanded cash amounts using the transaction data in the past of the second business office until new sufficient transaction data of the first business office are accumulated in the storage section 2A.

(9) When an installation environment condition of the ATMs 1 changes, a predicted value of a sum of demanded cash amounts obtained by the prediction section 2B for the ATMs 1 before the change of the installation environment condition is distributed at a distribution ratio to the ATMs 1 after the change of the installation environment condition, and the thus distributed values are used as predicted values for the ATMs 1 after the change of the installation environment condition.

In this instance, the predicted value of the sum may be distributed equally to the ATMs 1 after the change of the installation environment condition, or may be distributed at a distribution ratio set by a staff member to the ATMs 1 after the change of the installation environment condition, or else may be distributed to the ATMs 1 after the change of the installation environment condition at a distribution ratio calculated based on actual result data of the ATMs 1 after the change of the installation environment condition.

(10) The remaining money management apparatus 2 calculates, for each of the ATMs 1, errors between actual remaining cash amounts and the real time predicted values obtained by the prediction section 2B, discriminates, based on the errors calculated for each of the ATMs 1, one of the ATMs 1 which requires cash to be supplemented thereto and another one of the ATMs 1 which holds surplus cash, and develops an instruction to extract cash from the ATM 1 which holds surplus cash and supplement the extracted cash to the ATM 1 which requires cash to be supplemented thereto.

In this instance, the remaining money management apparatus 2 may display the instruction regarding the extraction and supplementing of cash so that a staff member referring to the displayed instruction may perform extraction and supplementing of cash from and to the relevant ATM 1.

(11) The remaining money management system further comprises a self-traveling robot for automatically performing extraction and supplementing of cash from and to the relevant ATM 1, and the remaining money management apparatus 2 includes a robot control section for controlling cash extraction and supplementing operations of the self-traveling robot in response to the instruction regarding the extraction and supplement of cash. Further, the remaining money management apparatus 2 displays the instruction regarding the extraction and supplementing of cash so that, when the self-traveling robot is out of order or the extraction or supplementing of cash by the self-traveling robot is impossible, a staff member referring to the displayed instruction may perform extraction and supplementing of cash from and to the relevant ATM 1.

(12) An accounting system host computer connected by means of dedicated lines to the ATMs 1 in a plurality of business offices may function as the remaining money management apparatus 2, or a staff member terminal provided at a window in a business office may function as the remaining money management apparatus 2, or else a remote supervision apparatus connected by means of a communication line to the ATMs 1 in a plurality of business offices may function as the remaining money management apparatus 2.

Transaction data of a staff member terminal provided at a window in a business office may be cumulatively stored into the storage section 2A, and the prediction section 2B may calculate and predict demanded cash amounts within a designated time for the staff member terminal based on the transaction data in the past of the staff member terminal accumulated in the storage section 2A.

(13) Various instructions (an instruction for the self-traveling robot to move to an object one of the ATMs 1 and another instruction for the self-traveling robot to extract or supplement cash from or to the object ATM 1) may be conveyed from the robot control section of the remaining money management apparatus 2 to the self-traveling robot by a radio communication channel via a radio communication base station.

(14) A free track for the self-traveling robot is formed from a magnetic tape applied to a floor, and the self-traveling robot includes a self-traveling truck for traveling along the free track while detecting the magnetic tape by means of a guiding magnetic sensor, and a robot mechanism mounted on the self-traveling truck for removing or mounting a cash cassette from or onto one of the ATMs 1 from the rear side of the ATMs 1 to perform extraction or supplementing of cash.

Where the self-traveling robot is provided in the remaining money management system of the present invention, the following various additional features can be provided.

(15) Marking magnetic tapes for individually specifying positions of the ATMs 1 are applied along the magnetic tape which forms the free track, and the self-traveling robot detects any of the marking magnetic tapes by means of a marking magnetic sensor to specify one of the ATMs 1 designated by the robot control section.

(16) A positioning apparatus for guiding a guide roller mounted on the self-traveling robot to control a stopping position of the self-traveling robot with respect to one of the ATMs 1 is provided on a rear face side of each of the ATMs 1. The positioning apparatus includes an arrival sensor for detecting that the self-traveling robot arrives and stops at one of the ATMs 1 in order to extract or supplement cash from or to the ATMs 1.

(17) The positioning apparatus includes a pair of feed terminals for supplying power for operating the robot mechanism of the self-traveling robot when the self-traveling robot stops while the self-traveling robot includes a pair of collection terminals for contacting with the feed terminals, and when the arrival sensor detects arrival of the self-traveling robot, power is supplied from the feed terminals to the collection terminals. A power supply circuit for supplying power for the robot mechanism to the feed terminals is provided separately from a power supply circuit for supplying power to the ATMs 1. The self-traveling robot includes a switching circuit for automatically switching power for the robot mechanism supplied to the collection terminals so that the power may be used to charge a self-traveling car power supply while the self-traveling robot stops and the robot mechanism of the self-traveling robot is inoperative.

(18) The remaining money management system further includes a station controller including an arrival sensor supervision section for supervising detection conditions of the ATMs 1 by the arrival sensors in a concentrated manner and notifying the detection conditions by the arrival sensors as an operation condition of the self-traveling robot to the remaining money management apparatus 2, an operation panel for inputting an instruction to control the operation condition of the self-traveling robot, a power supply section for supplying power for the robot mechanism, and a door opening/closing supervision section for supervising an opening/closing condition of a rear side door of one of the ATMs 1 which is opened when a cash extracting or supplementing operation is to be performed for the ATM 1 by the self-traveling robot.

(19) The rear side door of any of the ATMs 1 is automatically driven to open or close by power supplied from the power supply section of the station controller, and each of the ATMs 1 includes a door control section for driving, when a cash extracting or supplementing operation by the self-traveling robot is to be performed for the ATM 1, the rear side door to open to provide a space sufficient to allow the cash cassette to be removed or mounted from or onto the ATM 1 therethrough in response to an instruction from the self-traveling robot and for driving, when the removal or mounting of the cash cassette comes to an end, the rear side door to be closed.

(20) The self-traveling robot includes a light emitting element for emitting an optical signal to open or close the rear side door of any of the ATMs 1 while each of the ATMs 1 includes a light receiving element for receiving the optical signal from the light-emitting element, and, when to open or close the rear side door of one of the ATMs 1 in order to perform a cash extraction or supplementing operation by the self-traveling robot, the light emitting element of the self-traveling robot emits an optical signal for the ATM 1 toward the light receiving element of the ATM 1 and, only when the light receiving element of the ATM 1 receives an optical signal specified for the ATM 1, the door control section of the ATM 1 drives the rear side door to open or close.

(21) Each of the ATMs 1 includes a door open/close detection sensor for detecting and notifying an open or closed condition of the rear side door of any of the ATMs 1 to the door opening/closing supervision section, which supervises a detection condition by the door open/close detection sensor, and the station controller includes a service interruption detection circuit for detecting a service interruption of the power supply section, and a control section for causing, if the detection condition by the door open/close detection sensor is an open condition in any of the ATMs 1 when a service interruption is detected by the service interruption detection circuit, power of a backup power supply to be supplied until the door open/close detection sensor detects that the rear side door of the ATM 1 enters a closing condition.

In this instance, the station controller includes a time supervision section for supervising an elapsed time after detection of a service interruption by the service interruption detection circuit, and the control section stops the backup power supply and performs trouble ending processing if the detection condition of the door open/close detection sensor still is the open condition in the ATM 1 at a point of time when it is detected by the time supervision section that a fixed time elapses.

(22) The robot mechanism includes a receipt paper supplementing apparatus for supplementing receipt paper to any of the ATMs 1.

(23) The remaining money management system may further include a cassette station for defining a location at which the cash cassette is removed from or mounted onto the self-traveling robot. In this instance, the cassette station includes a locking mechanism for restricting removal of the cash cassette from the cassette station. Or, the cassette station may include a counting apparatus for counting an amount of cash in the cash cassette, and an automatic cash loading and extracting apparatus for automatically loading or extracting cash into or from the cash cassette.

(24) One of the ATMs 1 may be used as a location where the cash cassette is removed from or mounted onto the self-traveling robot. In this instance, an amount of cash in the cash cassette is counted making use of a counting function of the ATM 1 which is used as the location where the cash cassette is removed from or mounted onto the self-traveling robot, and a result of the counting is notified to the remaining money management apparatus 2.

With the remaining money management system described above with reference to FIG. 1, the following advantages can be anticipated.

(1) Since demanded cash amounts within a designated period of time for the ATMs 1 are calculated and predicted based on the transaction data in the past stored in the storage section 2A by the prediction section 2B and the demanded cash amounts for the ATMs 1 can be managed based on the predicted values, the remaining money management system is advantageous in that the amounts of money to be loaded can be compressed without depending upon a staff member and the burden to the staff member can be reduced significantly.

(2) Where the prediction section 2B converts a degree of influence of each of qualitative factors such as the day of the week or the date into a numerical value, demanded cash amounts can be predicted taking various qualitative factors into consideration, and consequently, prediction of a high degree of accuracy can be achieved. In this instance, where a prediction table is produced for each of the ATMs 1, a demanded cash amount can be predicted for each of the ATMs 1. Further, where the prediction table is produced for each of different currencies and after each fixed time interval, a demanded cash amount can be predicted for a currency or for a time interval designated by the staff member.

(3) Where the remaining money management apparatus 2 calculates an error between an actual result value of the demanded cash amount and the predicted value of the demanded cash amount obtained by the prediction section 2B and automatically selects, based on the error, a qualitative factor which has a significant influence on the demanded cash amount, the demanded cash amount can be predicted with a higher degree of accuracy.

(4) Where the prediction section 2B predicts demanded cash amounts for a period of time after the current money supplementing time until a next money supplementing time and outputs the predicted values as initial load money amounts to the ATMs 1, the staff member can determine an amount of money to be loaded initially upon starting of operation of the system without depending upon the experience or the sixth sense, but is required merely to supplementally load cash corresponding to the money amount into the ATMs 1. Consequently, the burden to the staff member can be reduced.

(5) Where the prediction section 2B normally supervises errors between actual remaining money amounts and the real time predicted values of demanded cash amounts for the ATMs 1 and calculates and indicates amounts of cash to be supplemented or extracted with which the errors are canceled, the staff member can cope with variations of remaining money amounts only by supplementing or extracting indicated amounts of cash without depending upon the experience or the sixth sense. Consequently, the burden to the staff member can be further reduced.

(6) A standard deviation of errors of the predictive error table (errors between actual result values of the demanded cash amount and predicted values of the demanded cash amount obtained by the prediction section 2B) is calculated as a standard error and a value calculated by multiplying the calculated standard error by a safety coefficient is added as a safety cash amount to the predicted value of the demanded cash amount. Accordingly, a safe money amount with which occurrence of stoppage of any ATM 1 arising from consumption of cash can be prevented with certainty can be determined without depending upon the experience or the sixth sense of the staff member. Consequently, the burden to the staff member can be further reduced.

(7) Where the prediction section 2B predicts, where a plurality of ATMs 1 are involved, a total demanded cash amount for the plurality of ATMs 1, calculates a sum total of actual result values of the demanded cash amount for the plurality of ATMs 1, calculates a safety cash amount for the entire plurality of ATMs 1 based on the predicted value and the actual result value thus calculated, and distributes the calculated safety cash amount at a distribution ratio to the ATMs 1, a safe money amount with which occurrence of stoppage of an ATM 1 arising from consumption of cash can be prevented with certainty can be determined without depending upon the experience or the sixth sense of the staff member. Further, since the plurality of ATMs 1 are treated as if they were a single ATM, a necessary minimum safety money amount can be determined, and the amount of money for the ATMs can be reduced with a higher degree of certainty.

(8) Where the prediction section 2B predicts an operable time based on a current remaining money amount, the staff member can refer to a result of the prediction to grasp till when each of the ATMs 1 can operate with the current remaining money amount, and consequently, the burden to the staff member can be reduced.

(9) Even if transaction data in the past are not cumulatively stored in the storage section 2A because the business office in which the system is incorporated is opened newly or a like case, where transaction data in the past of another business office which belongs to the same transaction form pattern are utilized as transaction data in the past of the business office, a demanded cash amount can be predicted with some degree of accuracy before transaction data for the business office are accumulated.

(10) Where, when an installation environment condition of the ATMs 1 changes, a predicted value of a sum of demanded cash amounts obtained by the prediction section 2B for the ATMs 1 before the change of the installation environment condition is distributed at a distribution ratio to the ATMs 1 after the change of the installation environment condition, demanded cash amounts for the ATMs after the change of the installation environment condition can be predicted with a high degree of accuracy using a data base produced from data accumulated for the individual ATMs 1.

(11) Where the remaining money management apparatus 2 discriminates one of the ATMs 1 which requires cash to be supplemented thereto and another one of the ATMs 1 which holds surplus cash and develops an instruction to extract cash from the ATM 1 which holds surplus cash and supplement the extracted cash to the ATM 1 which requires cash to be supplemented thereto, the staff member is required only to extract or supplement cash in accordance with the instruction, which further reduces the burden to the staff member. Further, after necessary amounts of cash are initially loaded into the plurality of ATMs 1, the cash in the ATMs can be circulated in the ATM group except when shortage of cash in the entire ATM group occurs. Consequently, loading of surplus cash can be eliminated, and accordingly, the amount of money for the ATM group can be compressed with a higher degree of certainty.

(12) Where the remaining money management system includes a self-traveling robot which automatically performs extraction and supplementing of cash from and to a relevant ATM 1, extraction or supplementing of cash from or to an ATM 1 need not be performed manually by the staff member at all, which can reduce the burden to the staff member remarkably. However, when the self-traveling robot is out of order or the extraction or supplementing of cash by the self-traveling robot is impossible, the staff member can refer to a displayed instruction to perform extraction or supplementing of cash can perform extraction and supplementing of cash from and to the ATM 1.

(13) Where an accounting system host computer or a remote supervision apparatus functions as the remaining money management apparatus 2 according to the present invention, the money amount can be managed for a plurality of business offices. Consequently, a demanded cash amount with regard to the entire money of the bank can be predicted to perform the remaining money amount management in units of a bank, and the money compression effect can be raised remarkably.

(14) Where the staff member terminal functions as the remaining money management apparatus 2 according to the present invention, there is no need of providing a remaining money management apparatus separately. Since the staff member terminal is normally used at a window by the staff member referring to a display thereon, when some instruction to any ATM 1 is developed, the instruction can be notified immediately to the staff member.

(15) Where transaction data of the staff member terminal are cumulatively stored into the storage section 2A and the prediction section 2B calculates and predicts demanded cash amounts within a designated time for the staff member terminal based on the transaction data, remaining money management for the entire money in the business office including the ATMs 1 and the staff member terminal can be realized.

(16) Where various instructions (an instruction for the self-traveling robot to move to an object one of the ATMs 1 and another instruction for the self-traveling robot to extract or supplement cash from or to the object ATM 1 (including an instruction to open or close an automatic door)) are conveyed from the robot control section of the remaining money management apparatus 2 to the self-traveling robot by a radio communication channel via a radio communication base station, an instruction can be sent with certainty to the self-traveling robot which moves around in the area in which the ATMs are arranged.

(17) Where a free track for the self-traveling robot is formed from a magnetic tape applied to a floor, there is no need of installing a rail or a like element, and even when a variation in layout is required upon removal of the ATMs 1 or installation of additional ATMs or where an obstacle such as a pillar is present between the ATMs 1, the travel path of the self-traveling robot can be arranged or varied very readily.

(18) Where the self-traveling robot detects any of the marking magnetic tapes applied along the free track, the self-traveling robot can specify the ATM instructed from the robot control section readily.

(19) Where the positioning apparatus compulsorily controls the stopping position of the self-traveling robot with respect to one of the ATMs 1, the distance between the ATM 1 and the self-traveling robot can be controlled to a fixed value, and consequently, automatic extraction or supplementing of cash from or to the ATM 1 can be performed with certainty by the robot mechanism. Further, by means of the arrival sensor provided for the positioning mechanism, it can be detected at which one of the ATMs the self-traveling robot arrives and stops.

(20) Where power is supplied from the feed terminals of the positioning mechanism to the collection terminals of the self-traveling robot only when the self-traveling robot stops and the robot mechanism must operate, there is no need of providing the power supply for the robot mechanism on the self-traveling robot. Consequently, the self-traveling robot can be formed light and compact, and power can be supplied very efficiently. In this instance, since power for the robot mechanism is supplied by a power supply circuit separate from the power supply circuit for supplying power to the ATMs 1, even if power supply interruption occurs and the ATMs 1 stop, power can be supplied separately from the power for the ATMs 1. Further, since the power for the robot mechanism is used to charge the self-traveling car power supply while the robot mechanism of the self-traveling robot is inoperative (in a waiting condition), the peak of current consumed by the self-traveling robot can be moderated.

(21) Where the arrival sensor supervision section of the station controller supervises detection conditions of the ATMs 1 by the arrival sensors in a concentrated manner and notifies the detection conditions by the arrival sensors as an operation condition of the self-traveling robot to the remaining money management apparatus 2, the operation condition of the self-traveling robot can usually be grasped by the remaining money management apparatus 2 side. Further, the staff member can control the operation condition of the self-traveling robot by manually operating the operation panel of the station controller. Furthermore, since an opening/closing condition of the rear side door of any of the ATMs 1 is supervised by the door opening/closing supervision section, the opening/closing condition of the rear side door of one of the ATMs 1 which is opened when a cash extracting or supplementing operation is to be performed for the ATM 1 by the self-traveling robot can always be grasped by the station controller side.

(22) The opening/closing condition of the rear side door of any of the ATMs 1 is controlled by the door control section so that, when a cash extracting or supplementing operation by the self-traveling robot is to be performed for the ATM 1, the rear side door is opened to provide a space sufficient to allow such cash extracting or supplementing operation to be performed therethrough.

(23) Where, when to open or close the rear side door of one of the ATMs 1 by the self-traveling robot, an optical signal for specifying the ATM 1 is emitted from the light emitting element toward the light receiving element of the ATM 1 and only when the light receiving element of the ATM 1 receives an optical signal specified for the ATM 1, the rear side door is opened by the door control section, the security against robbery required for an apparatus which handles cash is assured.

(24) Where, if a service interruption occurs while the rear side door of an ATM 1 is open and a cash extraction or supplementing operation by the self-traveling robot is proceeding, the control section of the station controller continues supply of power until the cash extraction or supplementing operation by the self-traveling robot comes to an end and the rear side door of the ATM 1 is closed, it can be prevented that the rear side door of the ATM 1 is left open, and the security against robbery required for an apparatus which handles cash is assured.

In this instance, the time supervision section supervises an elapsed time after detection of a service interruption by the service interruption detection circuit, and if the rear side door still remains in the open condition after the fixed time elapses, it is determined that some trouble has occurred, and the control section stops the backup power supply and performs trouble ending processing. Consequently, a countermeasure against the trouble can be taken.

(25) Where the robot mechanism includes a receipt paper supplementing apparatus, when a cash extraction or supplementing operation is performed by the self-traveling robot, supplementing of receipt paper to the ATM 1 can be performed at a same time, which contributes very much to reduction of the burden to the staff member.

(26) Where the remaining money management system includes a cassette station for removing or mounting the cash cassette from or onto the self-traveling robot, the staff member is required only to place the cash cassette, in which cash to be supplemented is loaded, in position into the cassette station or receive the cash cassette, in which extracted cash is held, in the cassette station.

In this instance, where removal of the cash cassette from the cassette station is restricted by the locking mechanism, the cash cassette cannot be pulled out inadvertently. Consequently, the safety against robbery is assured.

Further, where the counting apparatus of the cassette station counts an amount of cash in the cash cassette, the remaining money in the entire ATM group can be settled taking also the amount of cash in the cash cassette in the cassette station into consideration. Further, loading or extraction of cash into or from the ATM group can be performed automatically by the automatic cash loading and extracting apparatus of the cassette station.

(27) Where one of the ATMs 1 is used as a location where the cash cassette is removed from or mounted onto the self-traveling robot, there is no need of providing such a separate location as a cassette station as such location for removal or mounting of the cash cassette. In this instance, an amount of cash in the cash cassette can be counted making use of an original counting function of the ATM 1 which is used as the location for removal or mounting of the cash cassette, and where a result of the counting is notified to the remaining money management apparatus 2, the remaining money amount of the entire ATM group can be settled readily.

B. Embodiment of the Invention

An embodiment of the present invention will be described in detail below.

B-1. General Construction of the Remaining Money Management System

Figure 2:
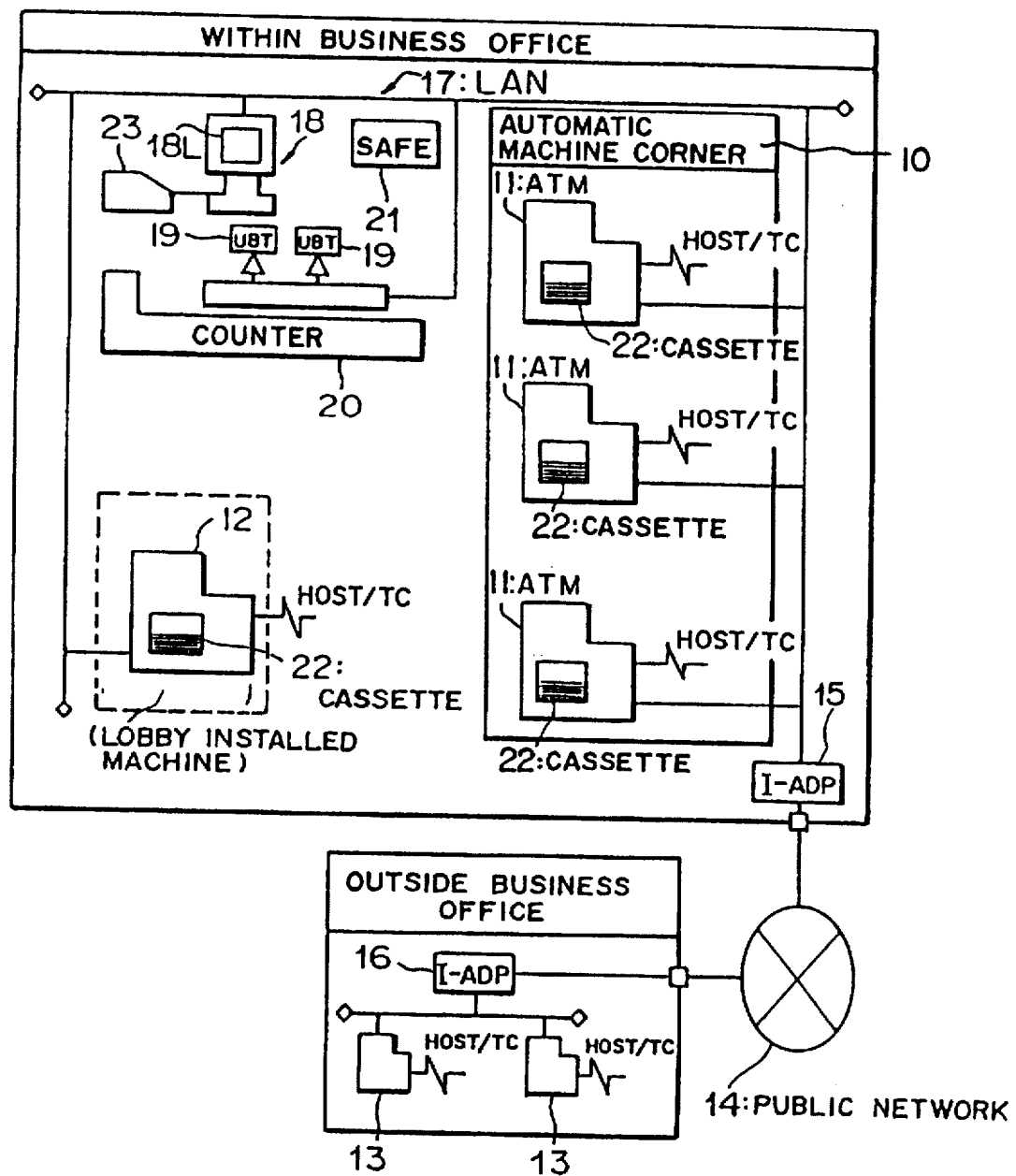
FIG. 2 is a block diagram showing a general construction of a remaining money management system to which the present invention is applied.

Referring to FIG. 2, there is shown in block diagram a general construction of a remaining money management system to which the present invention is applied. The remaining money management system shown is constructed as a remaining money management system, for example, for a branch (business office) of a bank and includes a plurality of ATMs 11 installed in an automatic machine corner 10 and an additional ATM (lobby installed machine) 12 installed in a lobby of the business office.

Further, a universal banking terminal (UBT; staff member terminal) 19 which is handled by a clerk at the window as well as a safe 21 and a remaining money management terminal 18 are installed on the inner side of a counter 20 in the business office. The remaining money management terminal 18 includes a display unit (display screen) 18L, and a printer 23 is connected to the remaining money management terminal 18.

The ATMs 11 and 12, universal banking terminal 19 and remaining money management terminal 18 are connected for communication with each other by means of a local area network (LAN) 17.

The LAN 17 is connected to a public network (for example, an ISDN) 14 via an adapter (I-ADP) 15. The LAN 17 is further connected for communication with ATMs 13, which belong to the business office but are installed outside the business office, via the public network 14 and another adapter (I-ADP) 16.

The remaining money management terminal 18 collects transaction data from the ATMs 11 to 13 via the LAN 17 or/and public network 14 and manages remaining cash amounts (here, the numbers of currencies) corresponding to amounts of cash accommodated in the ATMs 11 to 13 based on the transaction data.

Each of the ATMs 11 and 12 includes a cash cassette 22 for accommodating cash therein. Though not shown in FIG. 2, a similar cash cassette is provided also in each of the ATMs 13. Further, each of the ATMs 11 to 13 is connected to an accounting system host computer (refer to FIG. 37) in a computer center via a terminal controller (HOST/TC) and a dedicated line not shown.

B-2. Construction of the Remaining Money Management Terminal

Figure 3:
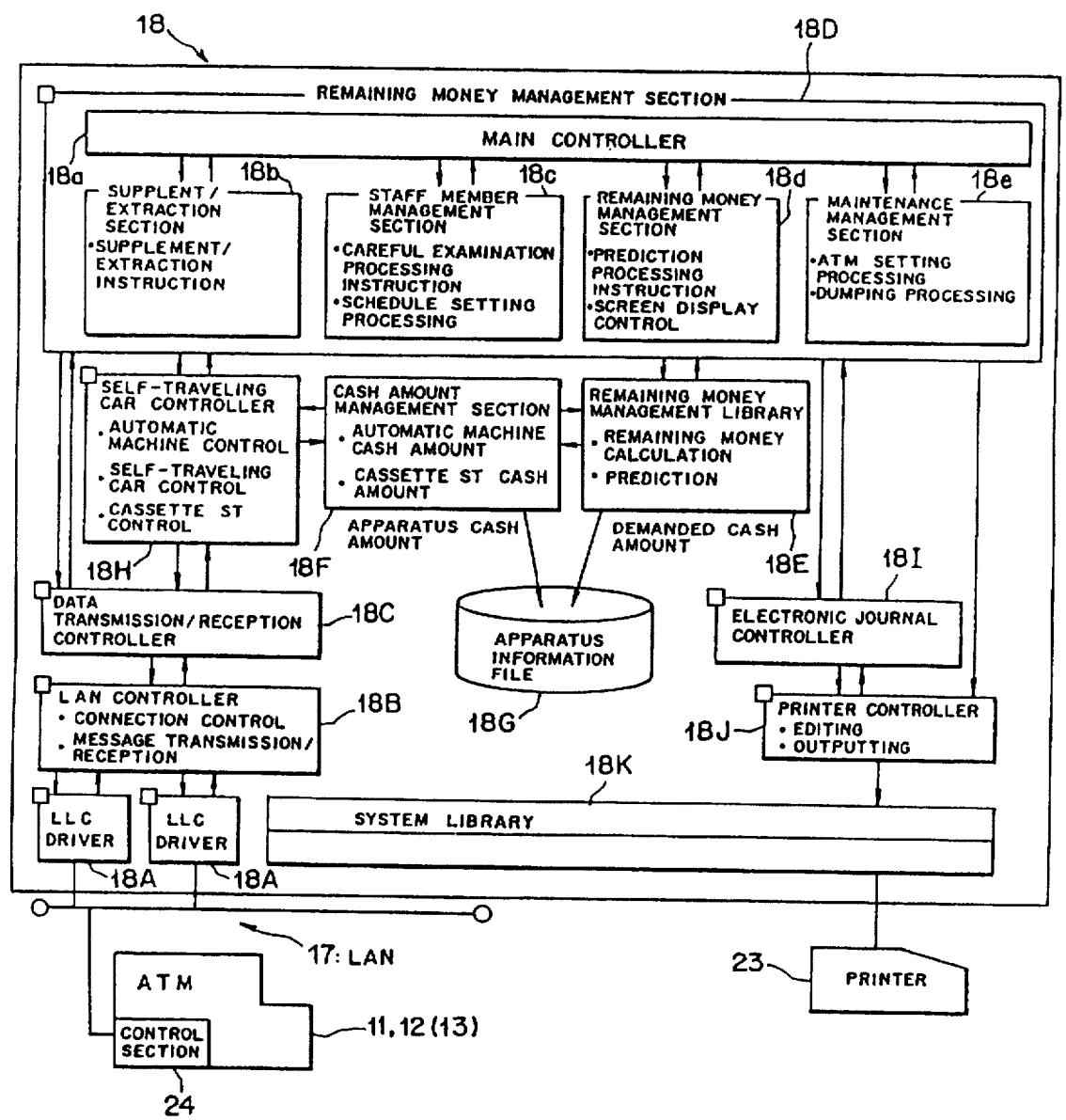
FIG. 3 is a block diagram showing a detailed functional construction of a remaining money management terminal in the remaining money management system.

Referring to FIG. 3, there is shown in block diagram a detailed functional construction (software construction) of the remaining money management terminal employed in the present embodiment. The remaining money management terminal 18 includes a pair of LLC drivers 18A, a LAN controller 18B, a data communication controller 18C, a remaining money management controller 18D, a remaining money management library 18E, a cash amount management section 18F, a hard disk 18G, a self-traveling car controller 18H, an electronic journal controller 18I, a printer controller 18J and a system library 18K.

Figure 39:
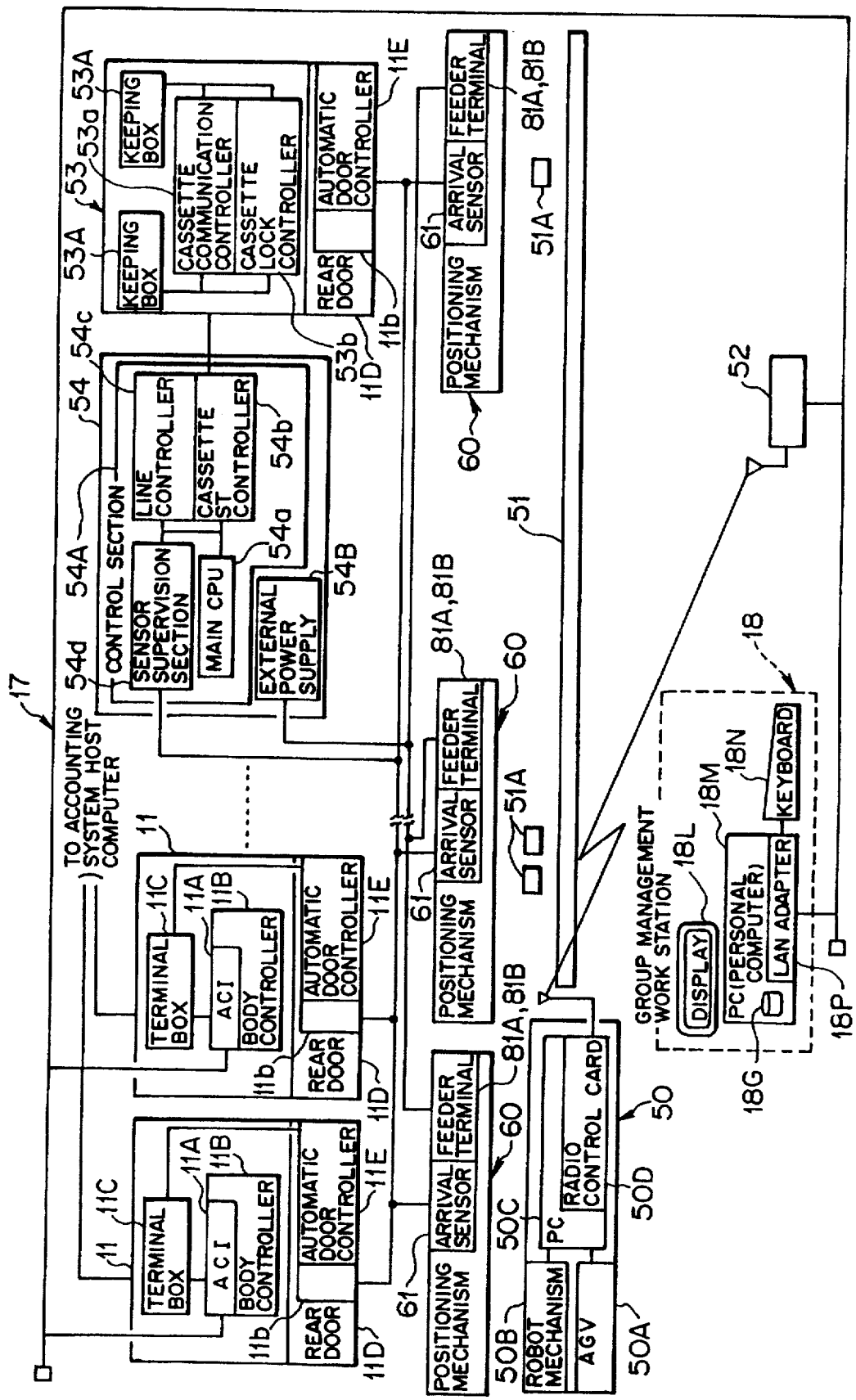
FIG. 39 is a block diagram showing a function construction of the remaining money management system where it includes a self-traveling car.

Though not shown in FIG. 3, the remaining money management terminal 18 includes a display unit 18L (refer to FIG. 2 or 39), a keyboard 18N (refer to FIG. 39) and a LAN adapter 18P (refer to FIG. 39), and the printer 23 is connected to the remaining money management terminal 18. Further, the body of the remaining money management terminal 18 is actually formed from, for example, a personal computer 18M (PC) as seen in FIG. 39. It is to be noted that, in the present embodiment described below, unless otherwise specified, the cash (or money) amount is treated as a number or quantity of a representative (highest) currency (such as a 10,000 yen bill in Japan).

The LLC drivers 18A are connected to the LAN 17 so as to transmit or receive a signal to and from the LAN 17. The LAN controller 18B controls driving of the LLC drivers 18A to perform connection control or transmission or reception control of a message to or from the LAN 17. The data communication controller 18C controls the LAN controller 18B to control transmission or reception of data.

The remaining money management controller 18D controls the entire remaining money management terminal 18 in the present embodiment. To this end, the remaining money management controller 18D includes a main controller 18a for controlling the other components described below, a supplement/extraction section 18b for delivering an instruction for supplement of cash or for extraction of cash to a staff member or the self-traveling car controller 18H in order to realize circulation of cash in an ATM group which will be hereinafter described, a staff member management section 18c for delivering an instruction for careful examination to a staff member in the bank or setting a schedule peculiar to the business office, a remaining money management section 18d for delivering an instruction for prediction to the remaining money management library 18E in response to screen inputting processing (refer to FIGS. 20 and 21) by a staff member and controlling the screen display of a result of prediction processing (display control of the display unit 18L), and a maintenance management section 18e for performing ATM setting processing (setting of a machine type, inside/outside the business office, a machine number and so forth) which is processing corresponding to maintenance by a customer engineer (CE) or dumping processing.

The remaining money management library (prediction section) 18E performs calculation of remaining money in the ATMs 11 to 13 or prediction of cash amounts demanded by the ATMs 11 to 13 in response to an instruction from the remaining money management section 18d. The remaining money management library 18E has a function of writing, after transaction data are collected from the ATMs 11 to 13, the transaction data into a predetermined area of the hard disk 18G as hereinafter described with reference to FIG. 4 and another function of calculating and predicting, after a prediction period is designated by screen inputting processing by a staff member, demanded cash amounts within the prediction period based on transaction data of the ATMs 11 to 13 in the past stored in the hard disk 18G. The remaining money management library 18E further has various functions which will be hereinafter described with reference to FIGS. 5 to 21.

The cash amount management section 18F manages the amounts of cash for different currencies currently present in the ATMs 11 to 13 and manages, where a cassette station (refer to reference numeral 53 of FIG. 38) is provided, the amounts of cash for different currencies currently present in the cassette station. Further, when necessary, the cash amount management section 18F writes the thus managed amounts of cash into an apparatus information file in the hard disk 18G.

Into the hard disk (apparatus information file, storage section) 18G, transaction data of the ATMs 11 to 13 are written by the remaining money management library 18E as described above, and also the amounts of cash in the ATMs 11 to 13 and the cassette station are written by the cash amount management section 18F.

As transaction data, for example, such data ① to ⑥ as listed below are periodically collected from control sections 24 of the ATMs 11 to 13 by the data communication controller 18C and stored into the hard disk 18G from the remaining money management library 18E or the cash amount management section 18F. It is to be noted that a detailed processing procedure of data collection will be hereinafter described with reference to FIG. 7.

① Apparatus specifying data: bank number/branch number/apparatus number

Figure 4:
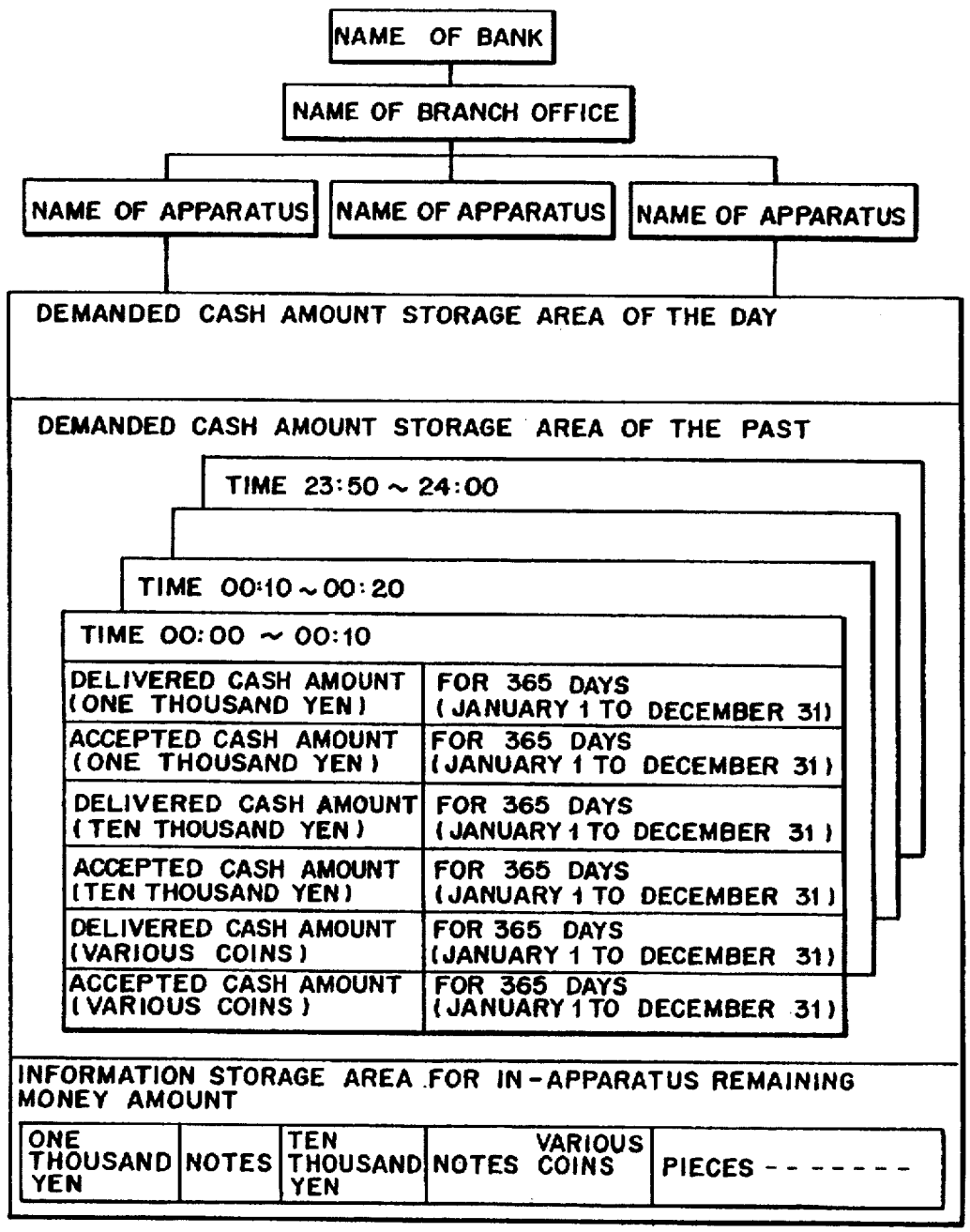
FIG. 4 is a diagrammatic view showing a directory structure of transaction data stored on a hard disk in the remaining money management system.

② Transaction date/time: year/month/day/transaction start time/transaction end time ③ Transaction type: delivery/acceptance/transfer/postal transfer/inquiry about the balance ④ Delivered transaction amounts: ten thousand yen bill/five thousand yen bill/one thousand yen bill/coins ⑤ Accepted transaction amounts: ten thousand yen bill/five thousand yen bill/one thousand yen bill/coins ⑥ Remaining amounts in the apparatus: ten thousand yen bill/five thousand yen bill/one thousand yen bill/coins Those transaction data are stored, for example, in such a directory structure as shown in FIG. 4 in the hard disk 18G. In particular, in a portion of the hard disk 18G specified by the bank name/branch name/apparatus name (apparatus number), a day demanded money amount storage area, a past demanded money amount storage area and an in-apparatus remaining money information storage area are set.

Since data of the day are not used for prediction, contents of the data of ② to ⑥ collected on the day are stored as they are into the day demanded currency number storage area, and then, after the date changes, they are saved into the past demanded currency number storage area. When the data are saved in this manner, they are converted into data of a form in which demanded money amount prediction processing which will be hereinafter described may be performed readily using the data. Thus, in the past demanded current number storage area, for example, past data of ② to ⑤ for one year (365 days) in the past taken after each 10 minutes are stored in a classified condition as seen in FIG. 4. Further, in the in-apparatus remaining money information storage area, remaining money for the individual currencies held in the ATM at present are written. It is to be noted that illustration of data for the five thousand yen bill is omitted in FIG. 4.

Figure 38:
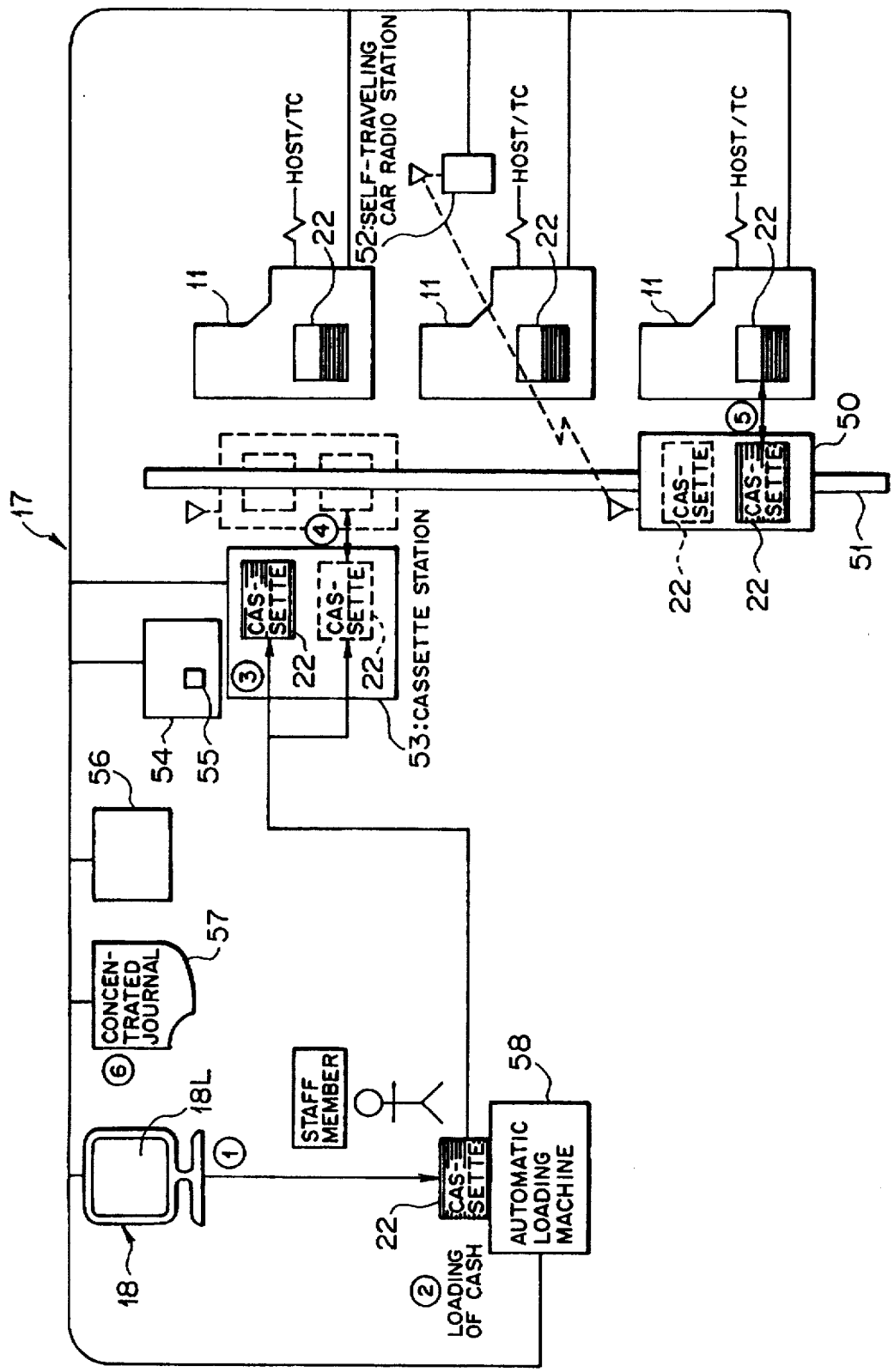
FIG. 38 is a block diagram showing a general construction of the remaining money management system where it includes a self-traveling car.

The self-traveling car controller 18H functions only where the remaining money management system includes a self-traveling car system (refer to FIG. 38). Although details are hereinafter described, the self-traveling car controller 18H has an automatic machine controlling function of controlling opening and closing movements of automatic doors (rear doors) of the ATMs 11 to 13, a self-traveling car controlling function of controlling operation of a self-traveling car (refer to reference numeral 50 in FIG. 38), and, where the remaining money management system includes a cassette station (refer to reference numeral 53 of FIG. 38), a cassette ST controlling function of controlling operation of the cassette station (cassette ST).

The electronic journal controller 18I manages the changed amounts of money for different currencies. The electronic journal controller 18I keeps the changed amounts of money for different currencies as an electronic journal on a hard disk or the like and delivers an instruction to output the electronic journal by printing.

The printer controller 18J actually controls, when a printing outputting instruction from the remaining money management controller 18D or an instruction to output an electronic journal by printing from the electronic journal controller 18I is received, operation of the printer 23 using the system library 18K to perform printing outputting in accordance with the printing outputting instruction.

It is to be noted that, in FIG. 3, reference numeral 24 denotes a control section provided in each of the ATMs 11 and 12, and the ATMs 11 and 12 are connected to the LAN 17 via the control sections 24. Also the ATMs 13 outside the business office are connected to a communication network via a similar control section 24.

B-3. Prediction Method for Demanded Amounts of Money

A method of predicting demanded amounts of money executed by the remaining money management library 18E will be described with reference to FIGS. 5 to 21.

The remaining money management library 18E in the present embodiment predicts the demanded amounts of bills (demanded amounts of money) which are predicted to be consumed by customers using a prediction method called Hayashi's quantization theory.

Figure 5:
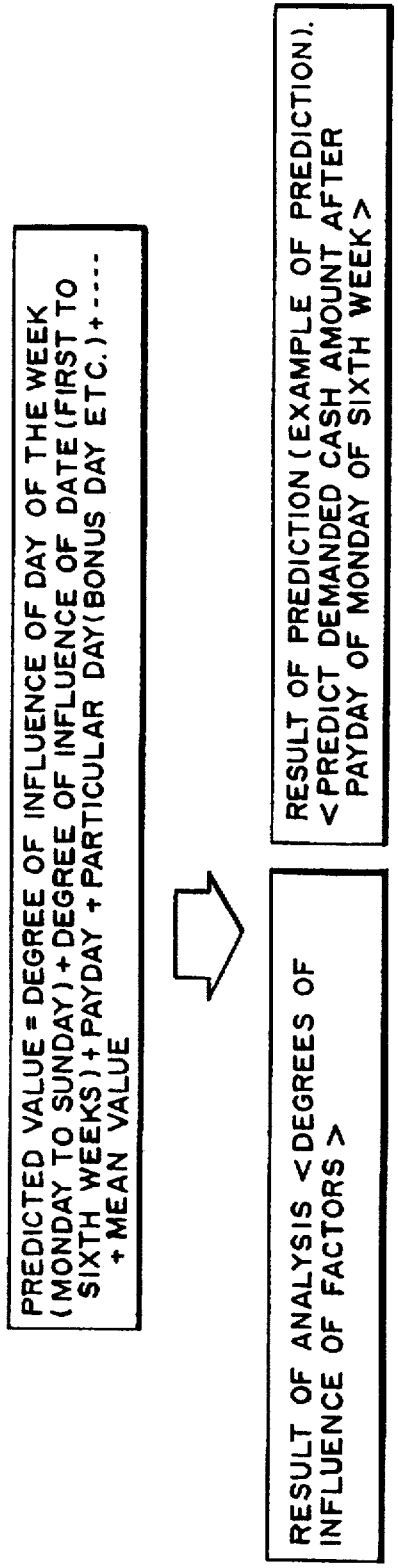
FIG. 5 is a diagrammatic view illustrating a concept of a prediction method for a demanded cash amount employed in the remaining money management system.

The concept of the prediction method will be described with reference to FIGS. 5 and 6. Basically, the prediction method predicts quantitative data (demanded amounts of money) from qualitative data (qualitative factors) such as a day of the week, the date or the like. In particular, as seen from FIG. 5, a total average value of demanded amounts of money in the past are calculated based on transaction data in the past stored on the hard disk 18G, and for each qualitative factor (day of the week, date, a specific day or the like) which may have an influence on the demanded amounts of money, a degree of influence of the qualitative factor on the demanded amounts of money is converted into a numerical value in advance. Then, a sum value of the average value and the numerical value data (a detailed calculation process will be hereinafter described) of the degrees in influence of the qualitative factors are calculated as a predicted value of the demanded amounts of money.

Figure 6:
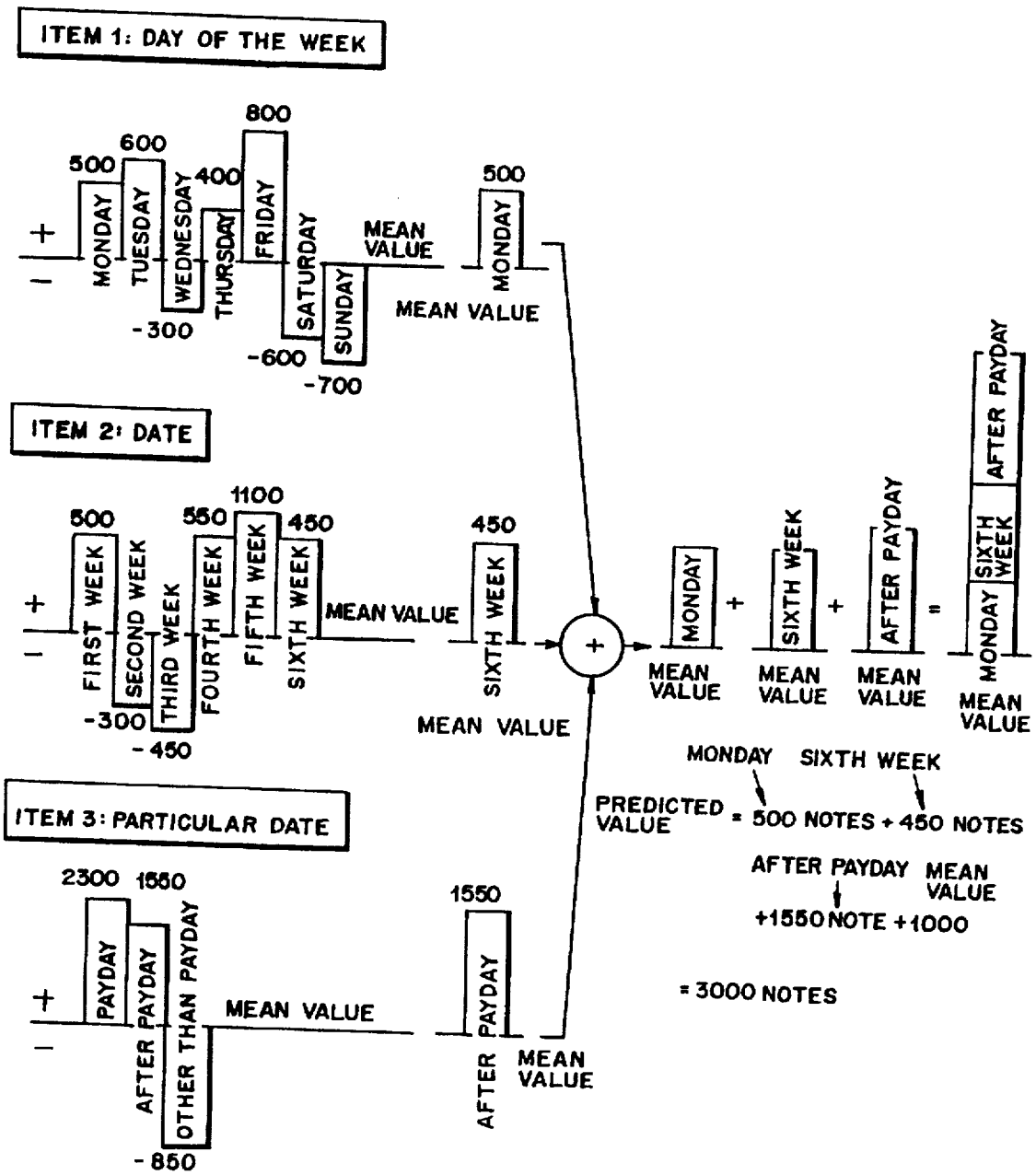
FIG. 6 is a diagrammatic view illustrating details of the concept of FIG. 5 using exemplary numerical values.

An example of exemplary values is illustrated in FIG. 6. Referring to FIG. 6, as items of the qualitative factors, a day of the week, the date and a specific date (payday, bonus day and so forth) are set. Then, for the day of the week of the item 1, numerical value data of the degrees in influence of the individual days of the week from Monday to Sunday are calculated (500, 600, −300, 400, 800, −600, and −700), and for the date of the item 2, numerical value data of the degrees in influence, for example, of different weeks (first to sixth weeks in a month) are calculated (500, −300, −450, 550, 1,100, 450). Further, for the specific date of the item 3, numerical value data of the degrees in influence of the payday, a day or days following the payday (the next day or days to the payday) and the other days are calculated (2,300, 1,550, −850). Then, when it is intended to predict the demanded amounts of money in a day or days following the payday of Monday in the six week, the numerical value data 500 of Monday, the numerical value data 450 of the sixth week, the numerical value data 1,550 of a day or days after the payday and the average value are added as seen in FIG. 6. Consequently, the predicted value of 3,000 for the demanded number of currencies for Monday in the sixth week after the payday is obtained.

The prediction processing for the demanded amounts of money will be described in more detail with reference to FIGS. 7 to 16.

Figure 7:
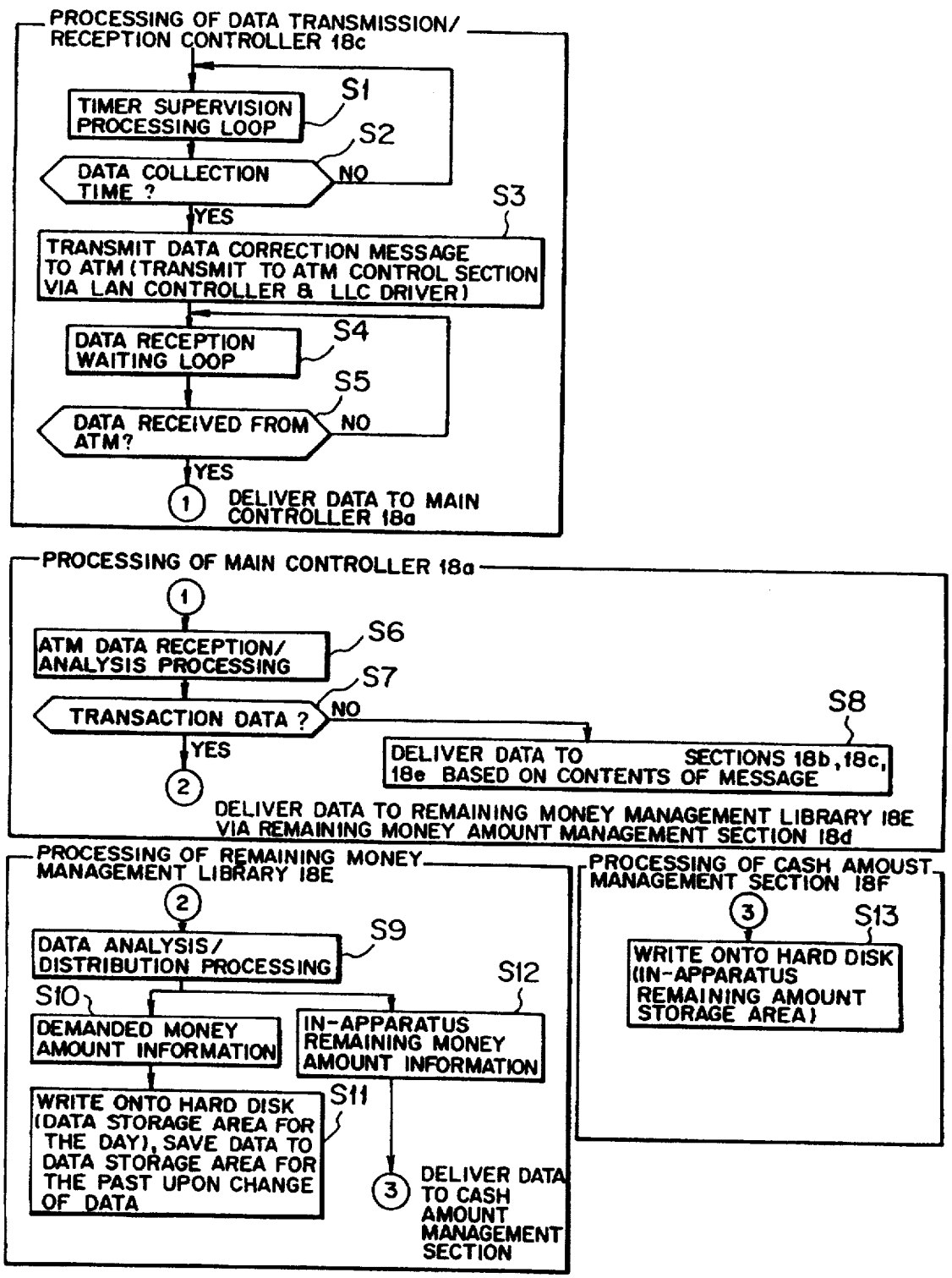
FIG. 7 is a flow chart illustrating data collection processing of the remaining money management system.

A procedure of collection processing of transaction data prior to prediction will first be described with reference to the flow chart (steps S1 to S13) shown in FIG. 7.

The data communication controller 18C of the remaining money management terminal 18 normally operates in a timer monitor processing loop (step S1) and discriminates whether or not a data collection time comes (step S2). If a data collection time which comes, for example, after each 10 minutes comes, the data communication controller 18C transmits a data collection inquiry to the ATMs 11 to 13 (step S3). The data collection inquiry is transmitted via the LAN controller 18B and one of the LLC drivers 18A to the ATM control section 24 of each of the ATMs 11 to 13. Then, the data communication controller 18C enters into a data reception waiting loop operating condition (step S4). After the data communication controller 18C receives data from the ATMs 11 to 13 (YES at step S5), it passes over the data to the main controller 18a.

The main controller 18a analyzes the data received from each of the ATMs 11 to 13 (step S6) and discriminates whether or not the received data is transaction data (step S7). When the received data is not transaction data (NO at step S7), the main controller 18a passes over the data to the supplement/extraction section 18b, the staff member management section 18c or the maintenance management section 18e in accordance with the contents of the received data (step S8). On the contrary when the received data is transaction data (YES at step S7), the main controller 18a passes over the transaction data to the remaining money management library 18E via the remaining money management section 18d.

The remaining money management library 18E analyzes the received transaction data and distributes the transaction data in accordance with a result of the analysis (step S9). When the received transaction data is demanded money amount information (step S10), the transaction data is written into the day data storage area (day demanded money amount storage area in FIG. 4) of the hard disk 18G from the remaining money management library 18E, and after the date changes, the transaction data is saved into the past data storage area (past demanded money amount storage area of FIG. 4) (step S11). On the other hand, when the received transaction data is apparatus remaining money information (step S12), the transaction data is passed over to the cash amount management section 18F. Consequently, the transaction data is written into the in-apparatus remaining money information storage area (refer to FIG. 4) of the hard disk 18G by the cash amount management section 18F (step S13).

Based on the transaction data in the past collected by such data collection processing as described above, in the present embodiment, a demanded amount of money within a designated period in each of the ATMs 11 to 13 is predicted basically by the following procedures 1 to 3.

[Procedure 1]

First, the transaction data in the past stored on the hard disk 18G are first tabulated for the individual qualitative factors, and an average value of the demanded money amounts in the past is calculated. Here, as items of the qualitative factors, for example, as seen in FIG. 8, ① a day of the week (Monday to Sunday), ② the date (first to sixth week in a month), ③ a particular date (a day at the end or the beginning of a month/fifth/10th day/payday/day or days before and after the payday/a bonus day or the like), ④ a date (first to 30th day/ever 3rd day/every fifth day), ⑤ the end or the beginning of a year/summer vacation/Christmas holidays and so forth, ⑥ the season (spring, summer, autumn, winter), ⑦ the weather (fine/rain/snow or the like) and so forth may be used. It is to be noted that the following description relates to a case wherein the factors ① to ③ are selected as items of the qualitative factors. Further, for the particular date ③ the payday/a day or days following the payday (after the payday)/any other day are used as the qualitative factors.

Figure 9:
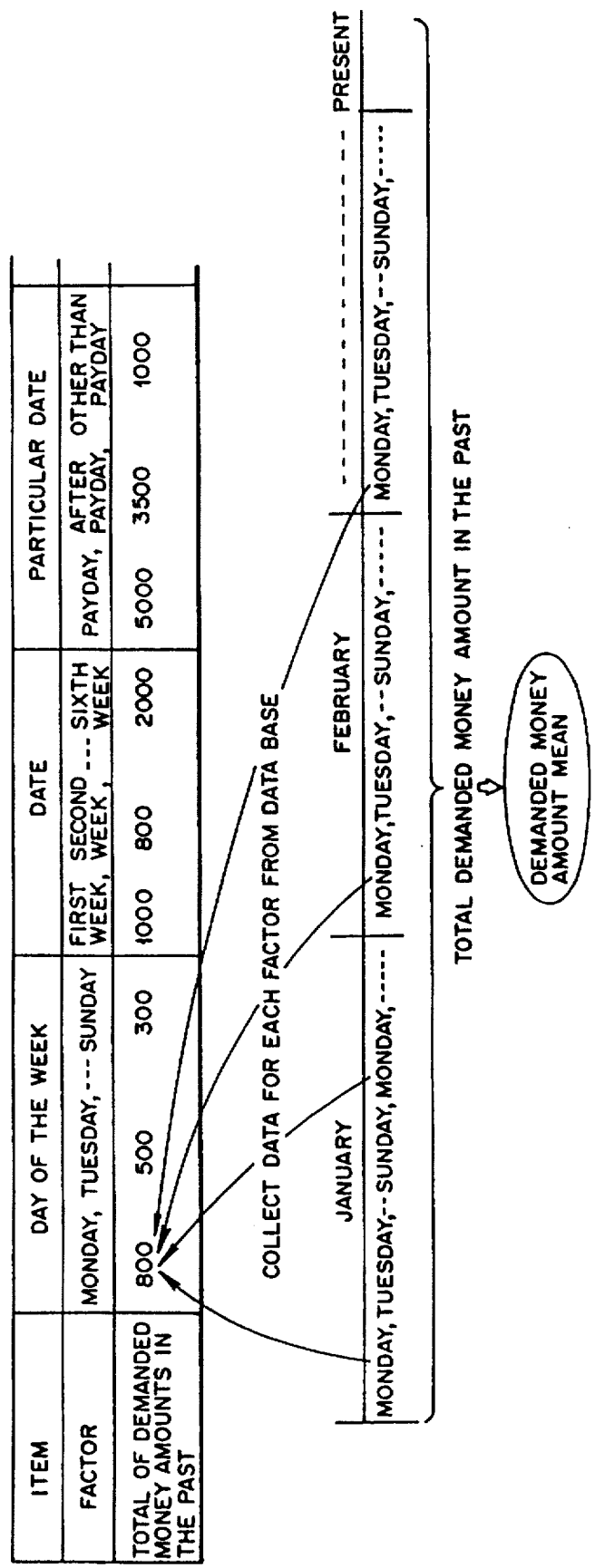
FIG. 9 is a diagrammatic view illustrating an example of acquisition of data for each qualitative factor upon prediction of a demanded cash amount in the remaining money management system.
Figure 12:
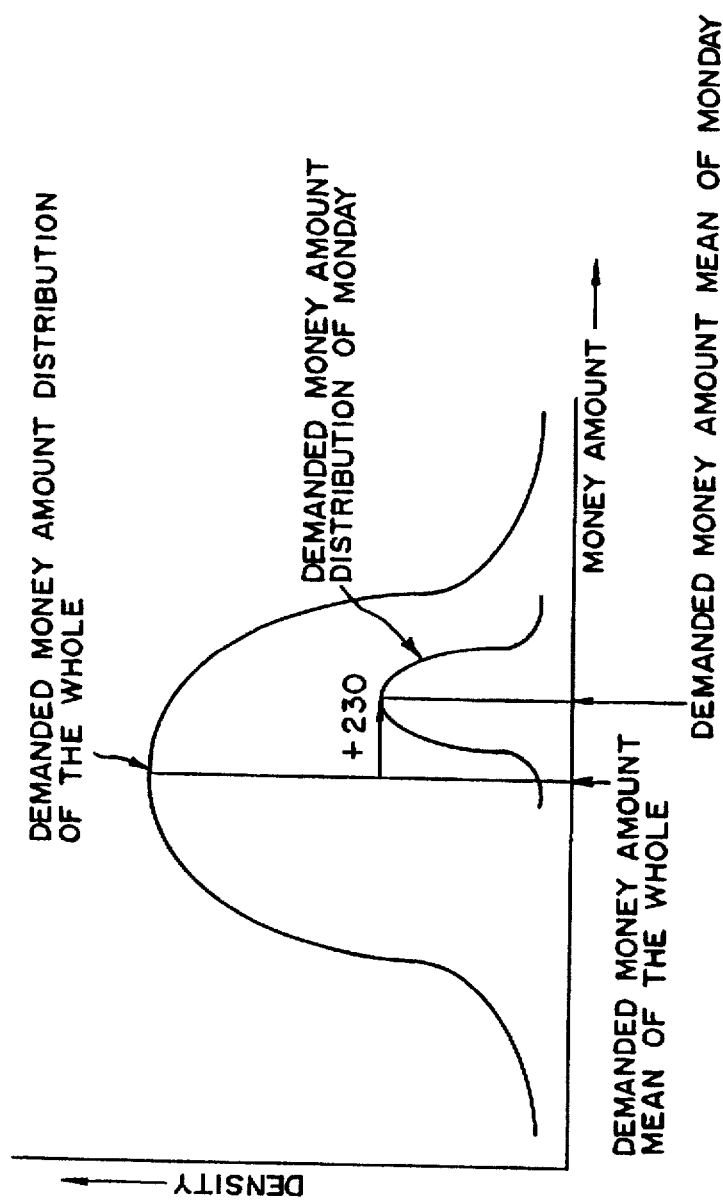
FIG. 12 is a graph illustrating significance of a value of a factor obtained upon prediction of a demanded cash amount in the remaining money management system.

Then, as seen from FIG. 9, data of those items corresponding to the individual qualitative factors are collected from among the transaction data in the past of the hard disk 18G (all data from the starting date of data collection to yesterday), and for each qualitative factor, totals of demanded amounts of money are calculated (if the day is Monday, then totals of demanded amounts of money in Mondays in the past are calculated). Or, simultaneously, an average value (total average value) of the demanded amounts of money in the past is calculated.

[Procedure 2]

Then, such a cross tabulation table of qualitative factors as shown in FIG. 10 is produced. The table shown in FIG. 10 indicates a result of tabulation of how many times two different qualitative factors have been satisfied simultaneously in the past. For example, with regard to Monday, from FIG. 10, it can be seen that the two factors that the day is Monday and that the date belongs to the first week have been satisfied three times in the past, that the two factors that the day is Monday and that the date belongs to the sixth week have been satisfied three times in the past, and that the two factors that the day is Monday and the specific date is the payday have been satisfied once in the past. Also the other numbers of times have similar meanings.

Then, the values (category scores) of the individual factors are defined, for example, in such a manner as illustrated in FIG. 11, and those values are applied to the values tabulated in the cross tabulation table shown in FIG. 10 to produce such simultaneous equations as given below.

$$5x_{11} + \ldots + 0x_{17} + 3x_{21} + \ldots + 3x_{26} + 1x_{31} \ldots = 800$$

$$\ldots$$

$$0x_{11} + \ldots + 5x_{17} + 5x_{21} + \ldots + 5x_{26} + 0x_{31} \ldots = 300$$

$$3x_{11} + \ldots + 5x_{17} + 6x_{21} + \ldots + 0x_{26} + 0x_{31} \ldots = 1,000$$

$$\ldots$$

$$3x_{11} + \ldots + 5x_{17} + 0x_{21} + \ldots + 6x_{26} + 5x_{31} \ldots = 2,000$$

$$1x_{11} + \ldots + 0x_{17} + 0x_{21} + \ldots + 5x_{26} + 3x_{31} \ldots = 5,000$$

$$\ldots$$

The simultaneous equations above are solved and a weighted mean is calculated for each item (the day of the week, the data, the specific date). The difference between the weighted mean and the corresponding qualitative factor makes numerical value data of the degree of influence of the qualitative factor. As a result, qualitative data is converted into quantitative data for each factor. For example, the numerical value data $x_{11}$ of the degree of influence regarding Monday is calculated as +230, and the numerical value data $x_{17}$ of the degree of influence regarding Sunday is calculated as −200. The significance of $x_{11}$=+230 calculated in this manner will be considered. From FIG. 12, it can be seen that Monday has a positive action of increasing the demanded amount of money by 230 from an average value of the entire demanded money amount. It is to be noted that, in FIG. 12, an entire distribution of demanded money amounts and a distribution of demanded money amounts of Monday are shown, and the position of a peak of each distribution is an average value of the distribution. Accordingly, the result of calculation of $X_{17}$=−200 indicates that the Sunday has a negative action of decreasing the demanded money amount by 200 from the entire average value of demanded money amount.

Numerical value data of the degrees of influence for the individual factors (values of the factors, scores of the factors) are calculated for each of the ATMs 11 to 13, and such a prediction table as shown in FIG. 13 is produced. Where n ATMs of the first to nth machines are involved, a prediction table is produced for each ATM, that is, totaling n prediction tables are produced as seen in FIG. 13.

[Procedure 3]

Figure 14:
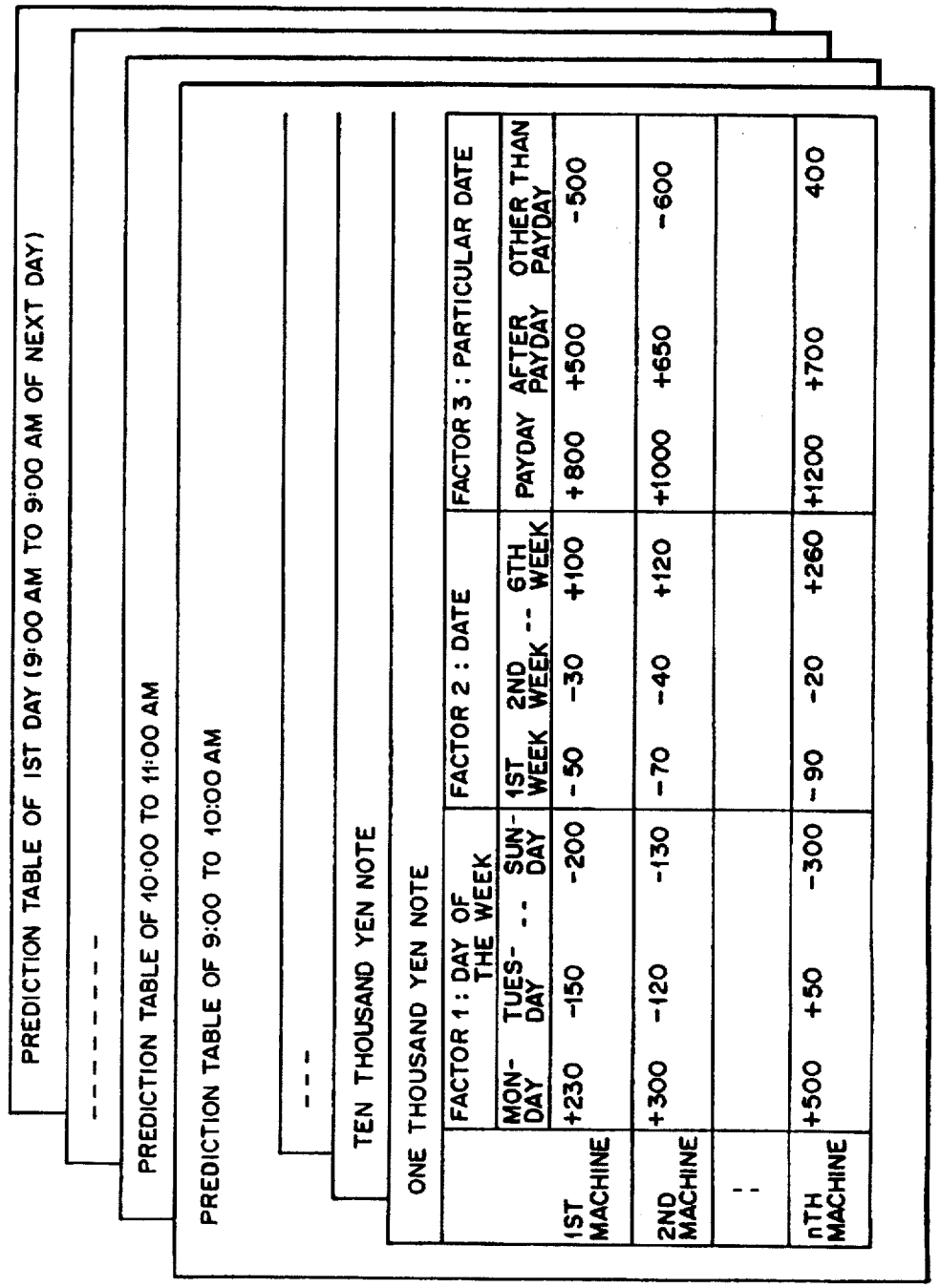
FIG. 14 is a similar view but illustrating an example of details of the forecast tables illustrated in FIG. 13.

Then, demanded money amount prediction is performed by collecting, from among the scores of the individual factors of such a prediction table as shown in FIG. 13, scores of a factor corresponding to the day or the time which makes an object of prediction. For example, in order to predict the demanded money amount of one thousand yen bills within a period from 9:00 am to 10:00 am on the sixth day of February (Monday, second week, other than the payday) for the No. 1 ATM, such a prediction table for the period of 9:00 am to 10:00 am as shown in FIG. 14 is obtained, and from an area of the prediction table for the one thousand yen bill and the No. 1 machine, the score +230 of Monday, the score −30 of the second week and the score −500 of a day other than the payday (those scores are netted in FIG. 14) are read out. In this instance, if the result of calculation of the average demanded money amount in the past is 2,000, then the demanded money amount predicted value to be obtained is given by the following equation:

[demanded money amount predicted value] = 230 + (−30) + (−500) + 2,000
= 1,700

Figure 15:
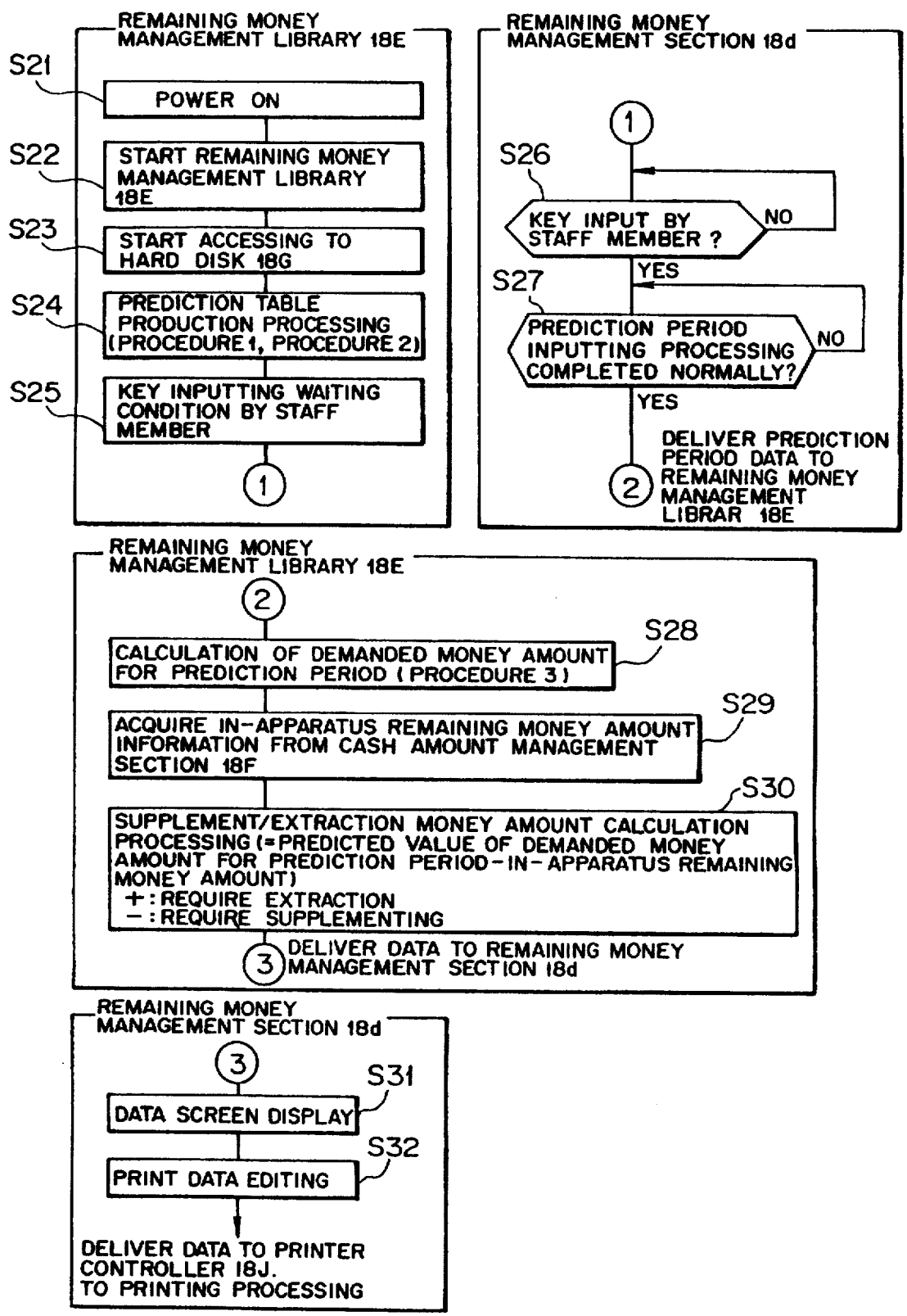
FIG. 15 is a flow chart illustrating demanded cash amount prediction processing of the remaining money management system.

In the following, a flow of the demanded money amount prediction processing will be described with reference to the flow chart (steps S21 to S32) shown in FIG. 15.

After the system of the present embodiment is rendered operative by turning on of power (power on) (step S21), the remaining money management library 18E is started (step S22). Then, accessing of the remaining money management library 18E to the hard disk 18G is started (step S23). After the remaining money management library 18E reads out transaction data in the past up to yesterday from the hard disk 18G, it produces a prediction table through the procedure 1 and the procedure 2 described above (step S24), and then waits for key inputting by a staff member (inputting of an instruction to predict a demanded cash amount) (step S25).

Then, if the remaining money management section 18d discriminates that key inputting has been performed by a staff member (YES at step S26), the remaining money management section 18d discriminates whether or not inputting processing of a prediction period has been completed regularly (step S27). When inputting processing of a prediction period has been completed regularly (YES at step S27), the remaining money management section 18d delivers the prediction period data to the remaining money management library 18E.

Upon reception of the prediction period data, the remaining money management library 18E first calculates a predicted value of the demanded cash amount for the prediction period in accordance with the procedure 3 described hereinabove (step S28) and then acquires current in-apparatus remaining money information from the cash amount management section 18F (step S29), whereafter it executes calculation processing of a supplement or collection money amount (step S30). In particular, at step S30, the value of [predicted value of the demanded money amount for the prediction period (result of the calculation at step S28)]−[in-apparatus remaining money at present] is calculated. If the value is in the positive (+), then this signifies that extraction is required, but if the value is in the negative (−), then this signifies that supplement is required. After the calculation processing at step S30, the remaining money management library 18E delivers the result of prediction by step S28 and the result of calculation of the supplement or extraction money amount by step S30 to the remaining money management section 18d.

Upon reception of the data from the remaining money management library 18E, the remaining money management section 18d causes the data to be displayed on the screen of the display unit 18L of the remaining money management terminal 18 (step S31) and, when necessary, edits print data (step S32). Then, the remaining money management library 18E sends the print data to the printer controller 18J so as to execute printing processing.

Figure 20:
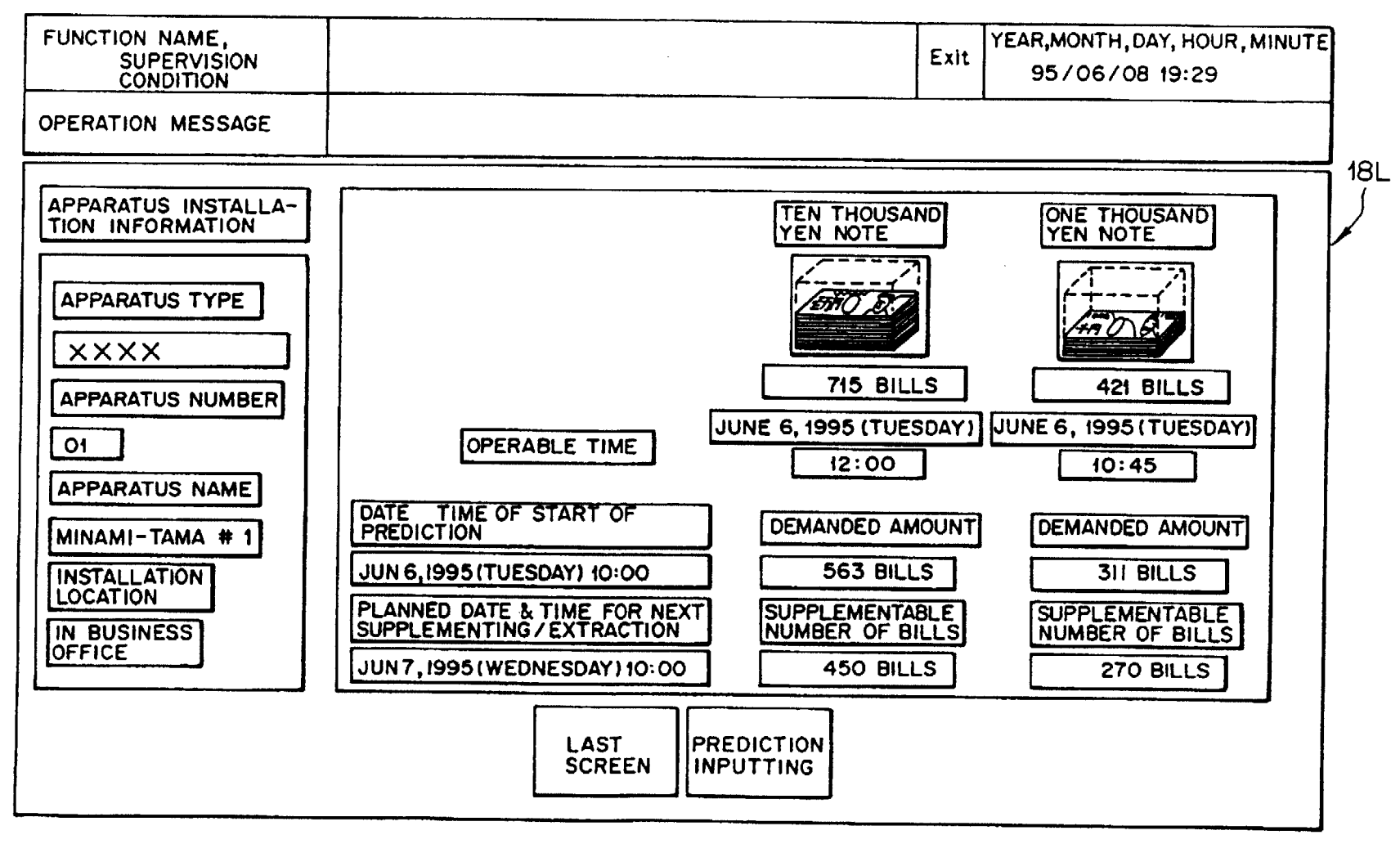
Figure 21:
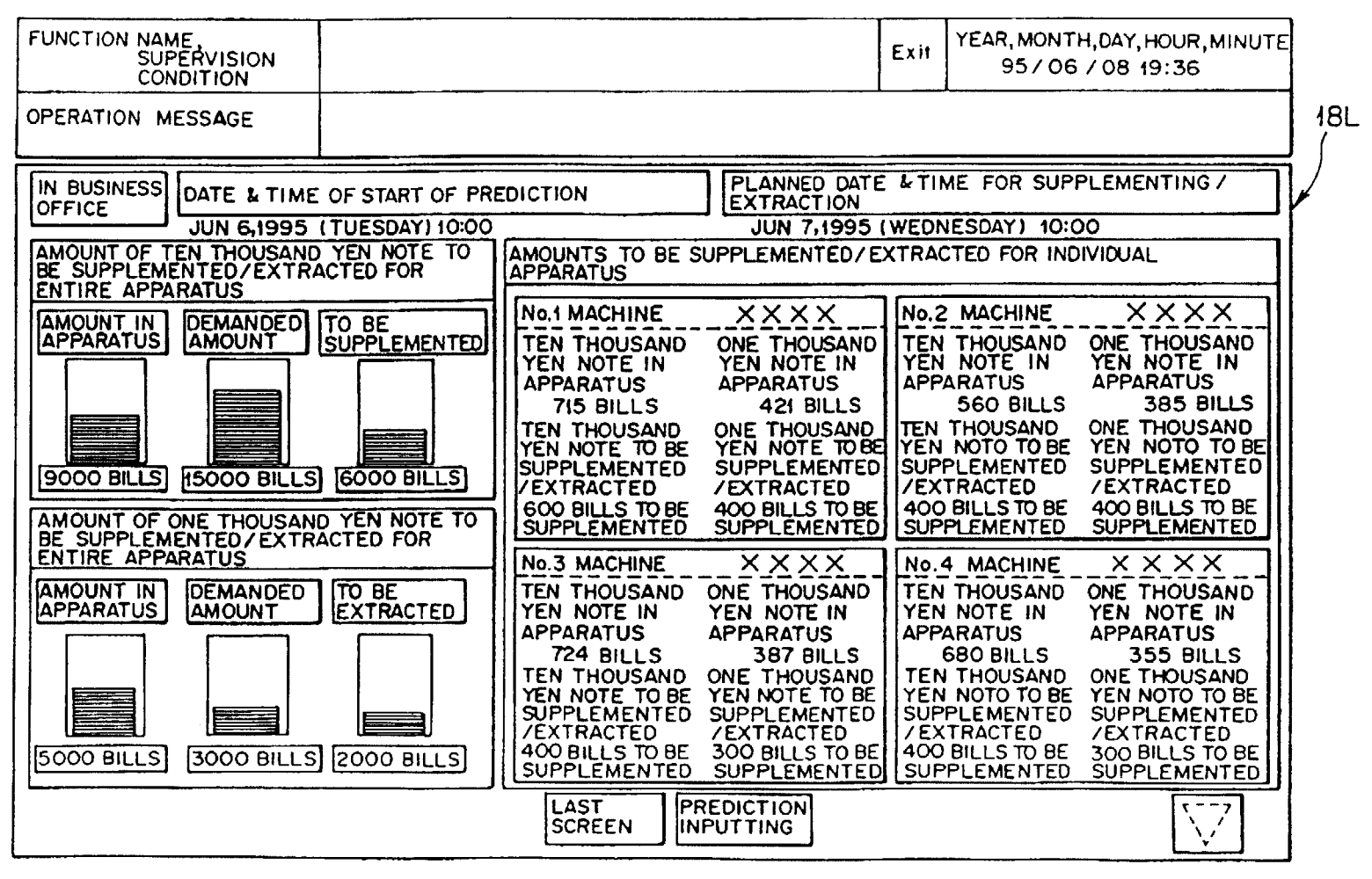

As a result of the screen display processing at step S31, such a screen display as shown, for example, in FIG. 20 or 21 is provided on the display unit 18L (display screen). In particular, on the display unit 18L shown in FIG. 20, information of a particular ATM is displayed, and particularly, for example, remaining money information at present for the individual currencies, operable times for the individual currencies (which will be hereinafter described with reference to FIGS. 26 and 27), a result of prediction from the date and hour of the start of prediction to the date and hour of next supplement/extraction and so forth are displayed. On the other hand, on the display unit 18L shown in FIG. 21, information regarding four ATMs (the No. 1 to No. 4 machines) is displayed. For each of the ATMs, remaining money information at present for the individual currencies, a result of prediction from the date and hour of the start of prediction to the date and hour of next supplement/extract and so forth are displayed, and also a result of prediction for all of the four ATMs is displayed for the individual currencies.

Figure 16:
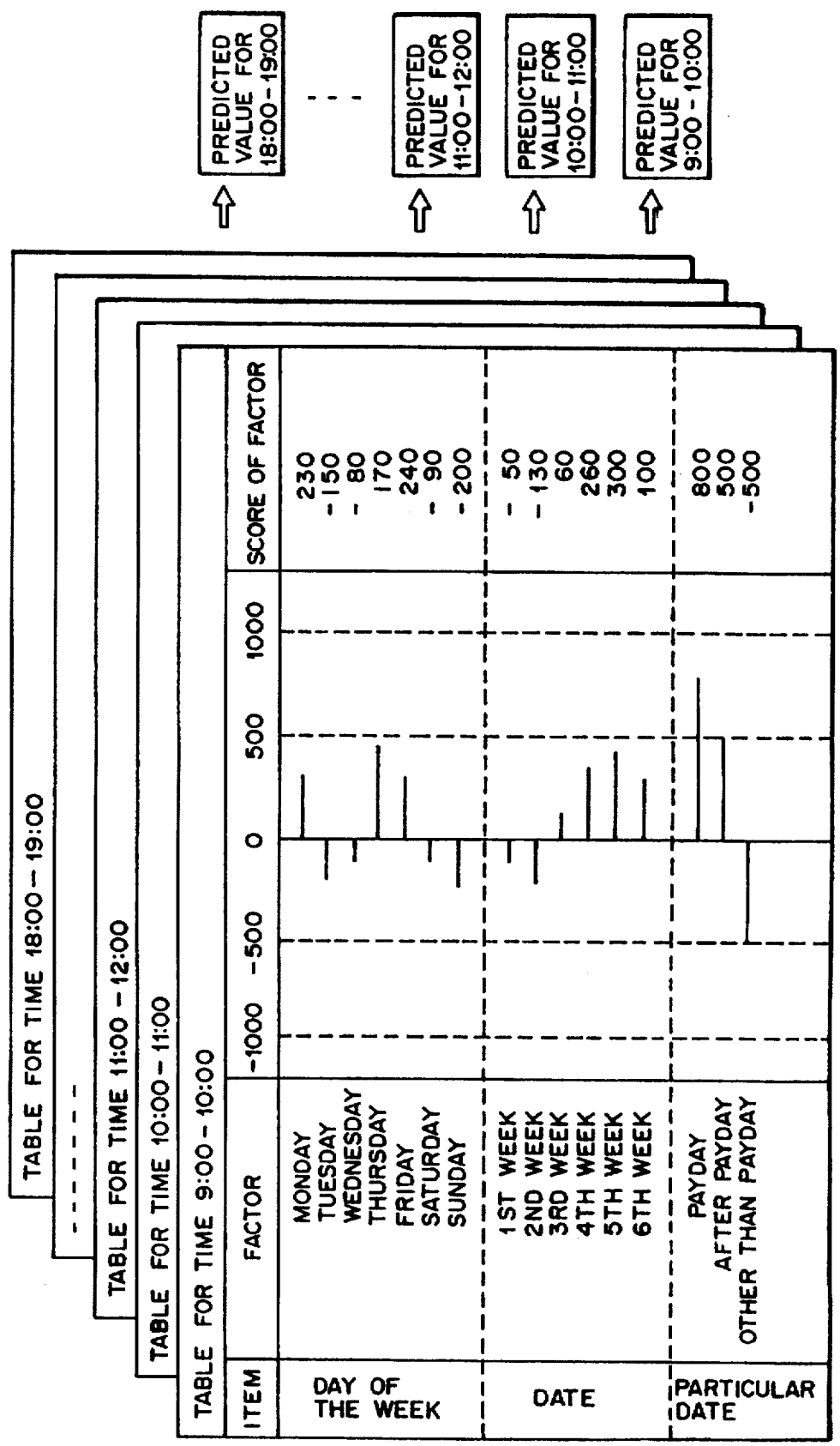
FIG. 16 is a diagrammatic view illustrating a technique of calculating predicted values for a designated period of time based on the forecast tables of FIGS. 13 and 14 in the remaining money management system.
Figure 17:
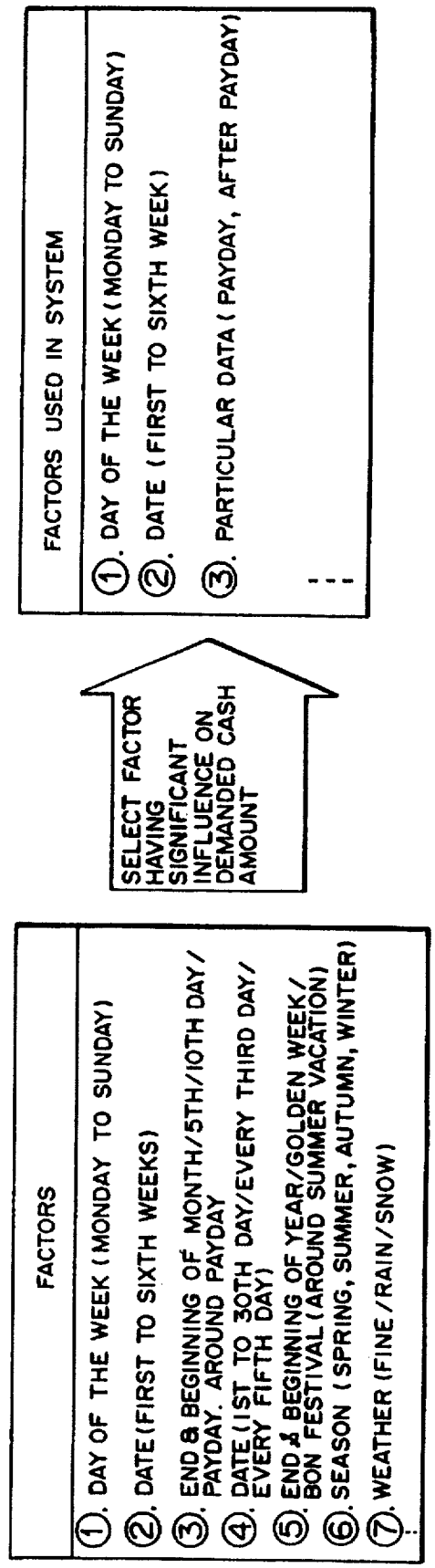
FIG. 17 is a diagrammatic view illustrating an automatic selection function for a qualitative factor in the remaining money management system.

Here, a process of calculating a predicted value within a designated period (designated time) based on a prediction table will be described. FIG. 16 shows a prediction table produced after each predetermined time interval (after each one hour) for each currency, and how to calculate a predicted value within the designated period based on a predicted value of a demanded money amount calculated using the prediction table will be described below.

Here, it is assumed that a linear prediction method is adopted and, if predicted values of individual prediction tables for a certain designated period are totaled, then predicted values of the demanded cash amounts for the entire designated period are obtained.

Accordingly, in the prediction method of the remaining money management system in the present embodiment, prediction of the demanded money amounts within a designated period is performed in accordance with the following procedure.

First, a predicted value for each prediction table corresponding to a prediction factor (determined based on a designated year, month and day) is calculated. In particular, if the time interval between the prediction tables is one hour as seen in FIG. 16, then predicted values at time intervals of one hour are calculated in advance.

Then, when the magnitude of the designated period and the magnitude of the time zone (predetermined time interval) of the prediction tables coincide with each other, predicted values for all of the prediction tables included in the designated period are totaled to calculate a predictive value within the designated period. For example, if the designated period is 9:00 to 11:00, then

|predicted value for 9:00 to 11:00|=|predicted value for 9:00 to 10:00|+|predicted value for 10:00 to 11:00|

On the other hand, when the magnitude of the designated period and the magnitude of the time zone (predetermined time interval) of the prediction tables do not coincide with each other, a ratio at which the designated period occupies in the predetermined time interval between the prediction tables is calculated, and then a predicted value corresponding to the ratio is added to calculate a predicted value within the designated period. For example, if the designated period is 10:45 to 11:30, then

|predicted value for 10:45 to 11:30|=|predicted value for 10:00 to 11:00|/4+|predicted value for 11:00 to 12:00|/2

In the equation above, [predicted value for 10:00 to 11:00]/4 is a predicted value for the period of 10:45 to 11:00, and |predicted value for 11:00 to 12:00|/2 is a predicted value for the period of 11:00 to 11:30. By adding them, a predicted value within the designated period of 10:45 to 11:30 can be calculated.

Since the demanded money amounts within a designated period for the ATMs 11 to 13 are calculated and predicted based on the transaction data in the past stored on the hard disk 18G by the remaining money management library 18E and the demanded money amounts for the ATMs 11 to 13 can be managed based on the predicted values as described above, the amounts of money to be loaded can be compressed without depending upon a staff member and the burden to the staff member can be reduced remarkably. In this instance, in the present embodiment, since a qualitative factor such as a day of the week, the date or the like can be converted into a numerical value as a degree of influence, demanded amounts of money can be predicted taking various qualitative factors into consideration, and consequently, prediction with a high degree of accuracy can be achieved.

The remaining money management terminal 18 in the present embodiment is further provided with such various functions as described below.

[Automatic Factor Selection Function]

The automatic factor selection function is a function of automatically selecting the most effective factor or factors and a combination of such factors. Particularly, while various qualitative factors are available as described hereinabove with reference to FIG. 17, the automatic factor selection function automatically selects, as types of qualitative factors to be used for calculation of predicted values of demanded money amounts by the remaining money management library 18E, types of qualitative factors with which errors between actual values of demanded money amounts and predicted values of demanded money amounts obtained by the remaining money management library 18E may be in the minimum (types of qualitative factors which have a significant influence on the demanded cash amount; for example, ① to ③ and so forth in FIG. 17). Consequently, the errors between actual values of demanded money amounts and predicted values of demanded money amounts obtained by the remaining money management library 18E can be minimized, and prediction of demanded money amounts can be performed with a higher degree of accuracy.

[Initial Value Prediction Function]

The remaining money management terminal 18 has an initial value prediction function of predicting, before money is supplemented to the ATMs 11 to 13, demanded cash amounts for a period from a present money supplementing time (prediction starting time) to a next money supplementing time and outputting the predicted values as initial charge currency amounts to the ATMs 11 to 13.

Figure 18:
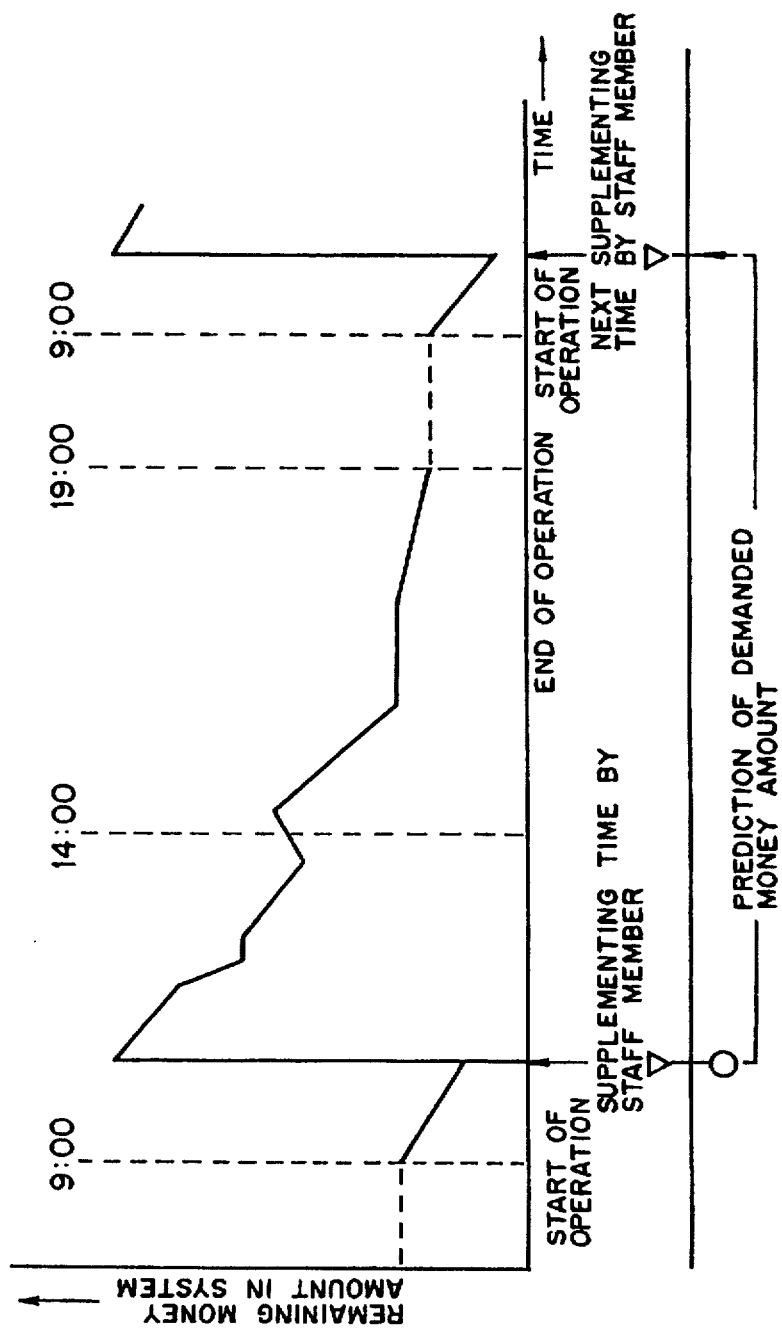
FIG. 18 is a graph illustrating an initial prediction function of the remaining money management system.

FIG. 18 is a graph illustrating an example of a variation of the remaining money amount of an ATM. As seen from FIG. 18, after operation of the system is started (after the business of the business office is started), demanded money amounts for a period after a supplementing time by a staff member of the day till a next supplementing time by a staff member (usually the same hour of the next day) are predicted by the remaining money management library 18E. Then, a staff member uses the predicted values by the remaining money management library 18E as aimed values of initial load money amounts to the ATMs 11 to 13 of the day.

Consequently, the staff member can determine an initial load money amount upon starting of operation or a like case without relying upon the experience or the sixth sense of the staff member and may supplementally load cash according to the initial load money amount into the ATMs 11 to 13. Accordingly, the burden to the staff member can be reduced remarkably

[Remaining Money Amount Variation Prediction Function]

The remaining money management terminal 18 has a remaining money amount variation prediction function of predicting demanded amounts of money for the ATMs 11 to 13 per unit time to predict demanded money amounts till a next collective supplementing time on the real time basis, normally supervising errors between actual remaining amounts and real time predicted values, calculating amounts of cash to be supplemented or collected with which the errors are to be minimized and displaying the thus calculated money amounts on the display unit 18L.

Figure 19:
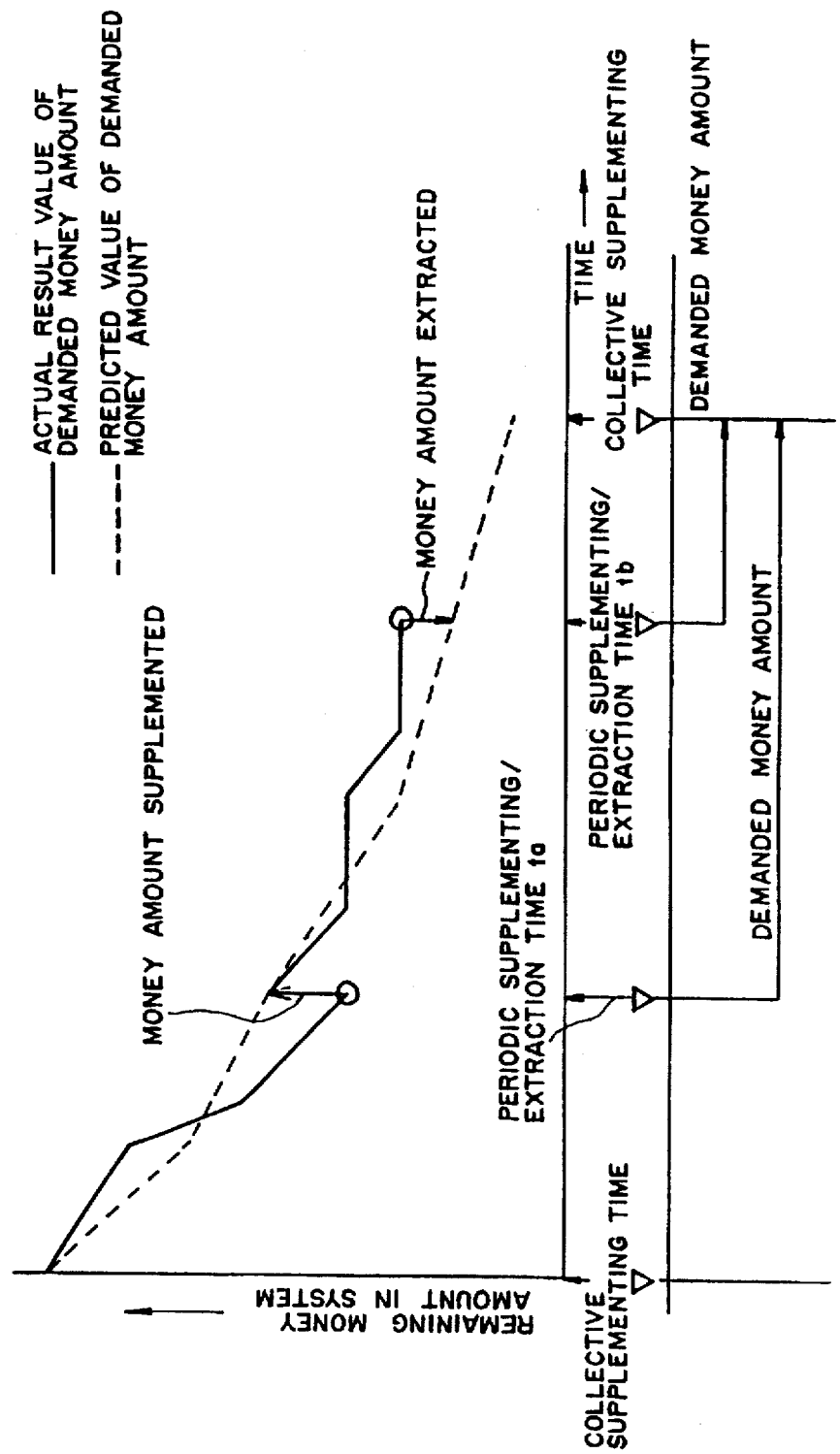
FIG. 19 is a similar view but illustrating a remaining money variation prediction function of the remaining money management system.

For example, each time a periodical supplement/extraction time ta or tb comes as shown in FIG. 19, a supplement/extraction money amount which is to minimize the error between a real time predicted value (predicted demanded money amount till a next collective supplementing time) and an actual remaining money amount by the remaining money management library 18E is calculated by the remaining money management library 18E and displayed on the display unit 18L. At the periodical supplement/extraction time ta, the error has a negative value, and an instruction to supplement the cash of an amount equal to an absolute value of the error (money amount to be supplemented) into the ATM is displayed on the display unit 18L. On the other hand, at the periodical supplement/extraction time tb, the error has a positive value, and an instruction to extract cash of an amount equal to the error (money amount to be extracted) is displayed on the display unit 18L. From the display, a staff member can discriminate any ATM in which the remaining money is short or excessive and can discriminate such short or excessive amount of money at a glance.

Consequently, if the demanded cash amount is varied by the weather or a like factor after the cash of an initial load money amount predicted by the initial prediction function is loaded, a staff member can correct the money amount readily based on the variation. In other words, the staff member can cope with a variation of the remaining money amount only by supplementing or extracting the cash of the instructed amount. Consequently, the burden to the staff member is reduced remarkably.

B-4. Safety Money Amount Determination Method

While prediction of a demanded cash amount is performed in such a manner as described above by the remaining money management system of the present embodiment, when cash is to be supplemented or extracted actually using the predicted value, a safety money amount is added to a predicted value of a demanded cash amount in order to prevent occurrence of inadvertent stoppage of operation of an ATM by consumption of cash which arises from an error of prediction taking the accuracy in prediction into consideration. In other words, a cash amount obtained by adding a safety cash amount to a predicted value of a demanded cash amount calculated by the remaining money management library 18E is used as an appropriate cash amount adapted upon actual supplement or extraction of cash.

Such a safety cash amount is determined, in ordinary operation of a bank, based on the experience of a staff member in the past. Where the determination relies upon the experience of a staff member in this manner, the value of the safety cash amount exhibits a variation among different staff members, and this makes a problem in accuracy. Besides, since some experience is required for the determination, a heavy burden is applied to the staff member.

Therefore, in the present embodiment, an appropriate safety cash amount can be calculated and determined using the remaining money management library 18E and the hard disk 18G of the remaining money management terminal 18 as described below with reference to FIGS. 22 to 25.

Figure 22:
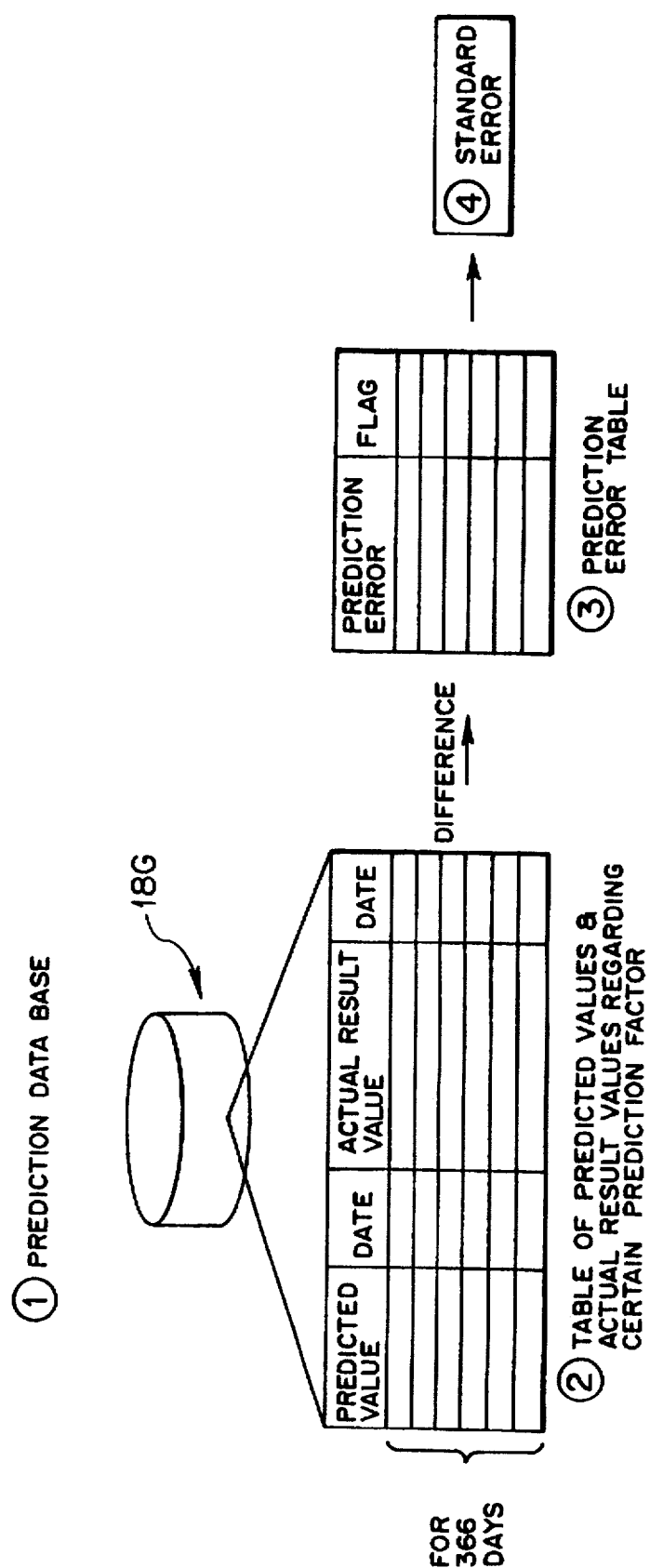
FIG. 22 is a diagrammatic view illustrating a safe money amount determination method employed in the remaining money management system.

As shown in FIG. 22, a prediction data base (refer to ① of FIG. 22) is stored on the hard disk 18C, and the remaining money management library 18E reads out a table (refer to ② of FIG. 22) between a predicted value and an actual value of a certain prediction factor. Here, in the present embodiment, a minimum unit of prediction designated by three items of an ATM, a currency type and a time zone is used as a prediction factor, and a required prediction value is calculated as a sum total of the prediction factors. It is to be noted that FIG. 22 illustrates a case wherein a safety coefficient of a certain prediction factor is calculated and determined. Further, the table ② has, for example, predicted values for 366 days and actual values corresponding to the predicted values stored in pair therein.

When an actual value is not stored in the table ② or the storage date of an actual value is later than the storage date of a corresponding predicted value, a new predicted value is calculated and stored into the table ②.

Then, errors between predicted values and actual values stored in pair in the table ② are calculated, and a prediction error table (refer to ③ in FIG. 22) in which the errors are set is produced. In this instance, flags of the individual prediction errors are written into the prediction error table ③ in accordance with the following rule. In particular, "0" is placed as the value of a flag where an actual value is absent because of a holiday and consequently a prediction error cannot be calculated whereas "1" is placed as the value of a flag where an actual value has been calculated.

A standard deviation of those of prediction errors stored in the prediction error table ③ produced in this manner whose flags have the value of "1" is calculated, and the standard deviation thus calculated is determined as a standard error (refer to ④ in FIG. 22).

It is assumed that the frequency distribution of prediction errors exhibits a normal distribution centered at the position of the "prediction error=0", and a safety cash amount which corresponds to a probability in which an ATM does not suffer from stoppage because of consumption of cash is calculated in accordance with the following equation:

[safety cash amount]=[standard error]×[safety coefficient]

For example, in order to suppress the cash consumption stoppage probability to a value lower than 1%, the safety coefficient is set to "3" from a normal distribution-table, and 3×[standard error] is added as a safety cash amount to the demanded cash amount.

While a case wherein a safety coefficient is calculated for a certain one prediction factor is described in the foregoing, another case wherein a safety coefficient for two or more prediction factors or for two or more designated ATMs will be described below.

In the present embodiment, a predicted value of a demanded cash amount for a plurality of prediction factors or for a plurality of ATMs is calculated as a sum value of predicted values for the individual prediction factors (|predicted value of demanded cash amount within designated period|=Σ|predicted values of individual prediction factors within designated period|) or a sum value of predicted values for the individual designated ATMs (|predicted value of total demanded cash amount of two or more designated ATMs|=Σ|predicted values of individual designated ATMs|).

Then, when $X=x_1+x_2+\ldots+x_n$, from a statistical formula of a dispersion $V(X)=V(x_1)+V(x_2)+\ldots+V(x_n)$, also the square of a standard error of each of the individual predicted values can be calculated readily from

[square of standard error of predicted value of each prediction factor within designated period]=Σ[square of standard error of predicted value of each predicted error within designated period]

or

[square of standard error of predicted value of total demanded cash amount of two or more designated ATMS]=Σ[square of standard error of predicted error of each designated ATM]

Also a safety cash amount of a predicted value of a demanded cash amount for a plurality of prediction factors or for a plurality of ATMs (=[safety coefficient]×[standard error]) can be calculated readily.

In this manner, in the present embodiment, since a standard error for each prediction factor (qualitative factor described hereinabove) which can be designated by a parameter such as, for example, an ATM, a currency type or a time zone is calculated in advance, a safety money amount for a predicted value for an arbitrary period or for a total predicted value for arbitrary ATMs can be calculated readily.

Accordingly, since the safety money amount which is required for operation of the system can be calculated and determined quantitatively and besides such calculation and determination does not rely upon the experience, the sixth sense or the like of a staff member, it can be suppressed to a minimum level, and this contributes to reduction in burden to a staff member and to compression of money. Further, since the safety money amount can be determined based on a probability in accordance with an operation condition, stoppage of an ATM because of consumption of cash can be prevented with certainty. Furthermore, since also a safety cash amount for a total demanded money amount of two or more ATMs can be calculated readily, the safety money amount can be determined quantitatively when a plurality of ATMs are managed as a group using a self traveling car (self traveling robot) or the like which will be hereinafter described. In addition, also a safety cash amount for a time width of a designated prediction period can be calculated and determined readily.

By the way, in order to determine a safety money amount for two or more ATMs, a safety money amount is calculated for each of the ATMs in the process described above. However, from reasons hereinafter described with reference to FIGS. 23(a) to 25, when a safety money amount is determined for two or more ATMs, further compression of required money can be achieved by using the following method.

In particular, in the present embodiment, the remaining money management library 18E predicts, for example, regarding all of the ATMs 11 of the automatic machine corner 10 as a single ATM (group control), a total demanded cash amount, and produces a table ② shown in FIG. 22 wherein the predicted value and a sum total of actual values of demanded cash amounts of all of the ATMs 11 are included in pair. Then, regarding all of the ATMs 11 of the automatic machine corner 10 as a single ATM, a prediction error table ③ is produced and a standard deviation of the error set in the prediction error table ③ is calculated as a standard error ④ in a similar manner as in the method described hereinabove with reference to FIG. 22. The safety cash amount for all of the ATMs 11 calculated in this manner is distributed to the ATMs 11 at a predetermined distribution ratio.

In this instance, the distribution method can be selected from among three methods including (i) a method wherein the calculated safety money amount is distributed equally to all of the ATMs 11, (ii) another method wherein the safety money amount is distributed to the ATMs 11 at ratios of safety cash amounts calculated for the individual ATMs 11, and (iii) a further method wherein the safety money amount is distributed at ratios of the squares of safety cash amounts calculated for the individual ATMs 11.

Subsequently, a difference between a case wherein a safety coefficient is determined regarding all of the ATMs 11 of the automatic machine corner 10 as a single ATM (that is, a case wherein group control is performed; refer to FIGS. 23(a) and 23(b)) and another case wherein a safety coefficient is determined based on predicted values for the individual ATMs 11 (that is, a case wherein no group control is performed; refer to FIGS. 24(a) and 24(b)) will be described with reference to FIGS. 23(a) to 25.

When such group control as described above is performed for n ATMs 11 as seen in FIG. 23(a) (in FIG. 23(a), n=10), where the standard error of the entire group is represented by $\pi_G$ and the standard errors of the individual ATMs 11 are represented by $\sigma_1, \sigma_2, \ldots, \sigma_n$, $$\sigma_G^2 = \sigma_1^2 + \sigma_2^2 + \ldots + \sigma_n^2$$

By the way, if it is assumed that the standard errors $\sigma_1, \sigma_2, \ldots, \sigma_n$ of the ATMs 11 are all equal to each other, then $$\sigma_G^2 = n\sigma^2$$

and the standard error $\sigma_G$ of the entire group is given by $$\sigma_G = \sqrt{n} \times \sigma$$

If the safety coefficient is set to 3 as seen in FIG. 23(b), then the safety money amount of the entire group is given by $$[\text{safety cash amount of entire group}] = 3\sigma_G = 3\sqrt{n} \times \sigma$$

Figure 24A:
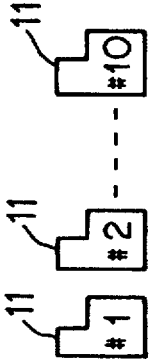
FIGS. 24(a) and 24(b) are a diagrammatic view and a graph, respectively, illustrating processing when group control is not performed upon determination of a safe money amount in the remaining money management system.

On the other hand, when no group control is performed for the n ATMs 11 as seen in FIG. 24(a) (in FIG. 24(a), n=10), where the standard errors of the ATMs 11 are represented by $\sigma_1, \sigma_2, \ldots \sigma_n$ and the sum total of the standard errors is represented by $\sigma_N$, $$\sigma_N = \sigma_1 + \sigma_2 + \ldots + \sigma_n$$

Figure 24B:
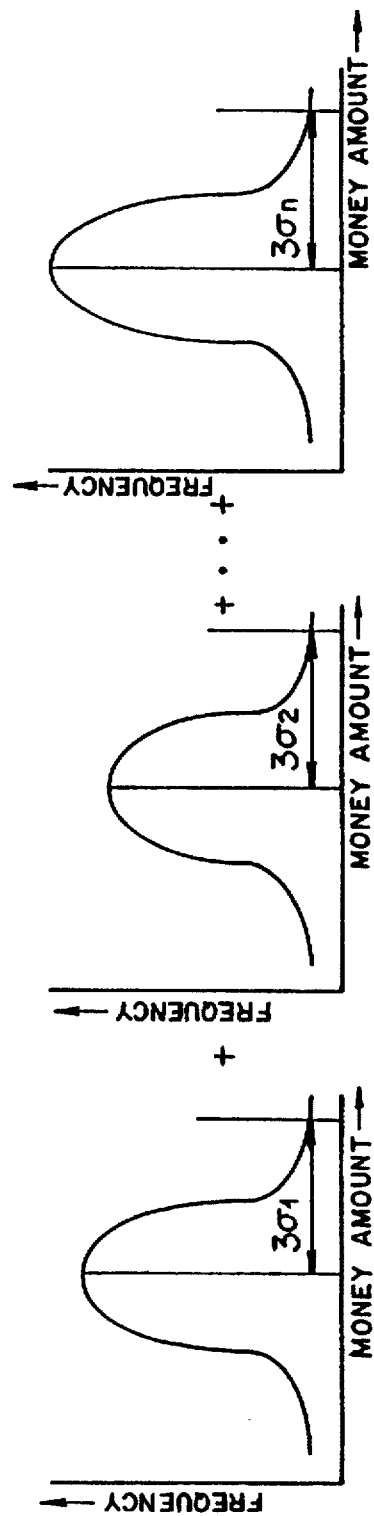

Then, if it is assumed that all of the standard errors $\sigma_1, \sigma_2, \ldots, \sigma_n$ of the ATMs 11 have an equal value $\sigma$ similarly as described above, then the sum total $\sigma_N$ of the ATMs 11 is given by $\sigma_N = n \times \sigma$ If the safety coefficient of the ATMs 11 is set to 3 as seen in FIG. 24(b), then the sum of the safety cash amounts of the n ATMs 11 is given by

|sum of safety cash amounts of n ATMs| = $3n \times \sigma$

Figure 25:
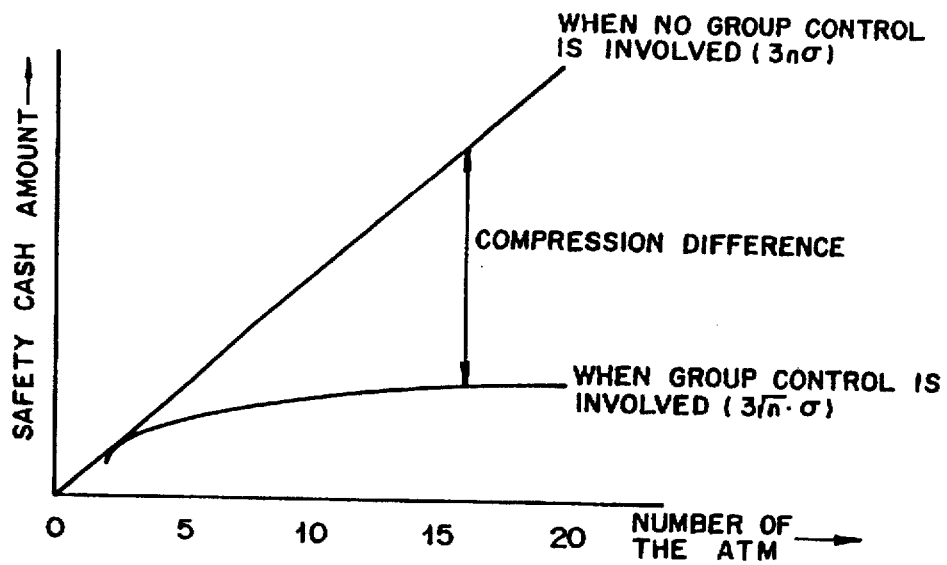
FIG. 25 is a graph illustrating an effect which is achieved when group control is performed upon determination of safe currency numbers in the remaining money management system.

Accordingly, comparison between the total safety cash amount $3\sqrt{n} \times \sigma$ a when group control is performed and the total safety cash amount $3n \times \sigma$ when no group control is performed apparently proves that, as seen in FIG. 25, as the number of the ATMs 11 increases, the total safety cash amount $3\sqrt{n} \times \sigma$ when group control is performed becomes lower and the difference between the compressed cash amounts increases. For example, where n=10 as seen in FIGS. 23(a), 23(b) and 24(a), 24(b), the compression difference is given by the following expression:

$$
\begin{aligned}
\text{[compression difference]} &= 3\sigma(n - \sqrt{n}) \\
&\simeq 3\sigma(10 - 3.2) \\
&\simeq 20\sigma
\end{aligned}
$$

In short, where 10 ATMs 11 are provided, save in cash amount by about $2_\sigma$ can be achieved by group control comparing with the cash amount required when no group control is performed.

In this manner, when a safety coefficient is to be determined for two or more ATMs, a necessary minimum safety money amount can be determined quantitatively by performing such group control as described above and handling a plurality of ATMs regarding them as a single ATM, and the required cash amount for the ATM group can be compressed with a higher degree of certainty.

B-5. Operable Time Prediction Function

In the remaining money management system of the present embodiment, the remaining money management library 18E has also such an operable time prediction function as described below. The operable time prediction function will be described below with reference to FIGS. 26 and 27.

Figure 26:
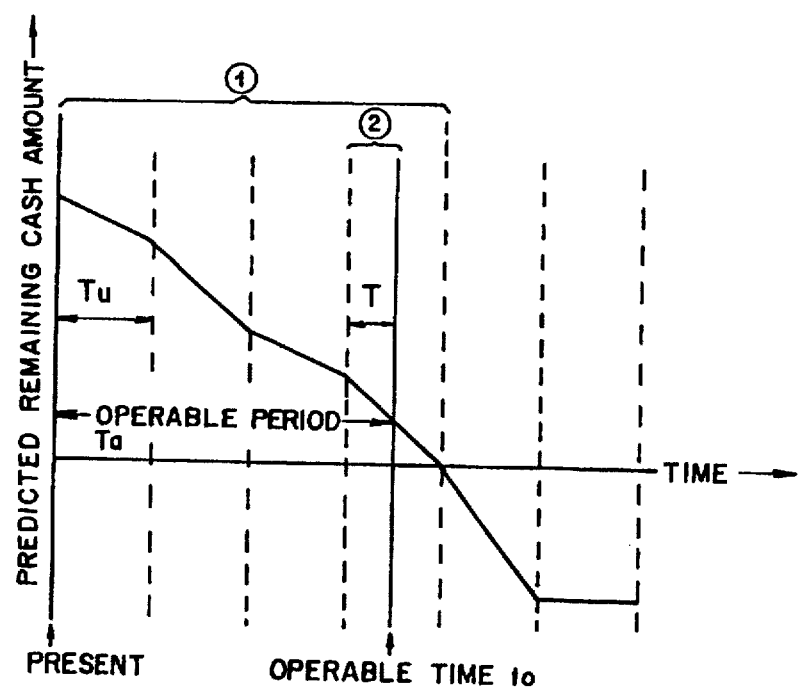
FIG. 26 is a graph illustrating an operable time prediction function of the remaining money management system.

The operable time prediction function of the remaining money management library 18E predicts, as seen in FIG. 26, a predicted value of a demanded cash amount of each of the ATMs 11 to 13 after each predetermined time interval Tu from the present point of time and determines a time, at which the predicted value and a present remaining cash amount of the ATM 11, 12 or 13 coincide with each other, as an operable time t0.

Figure 27:
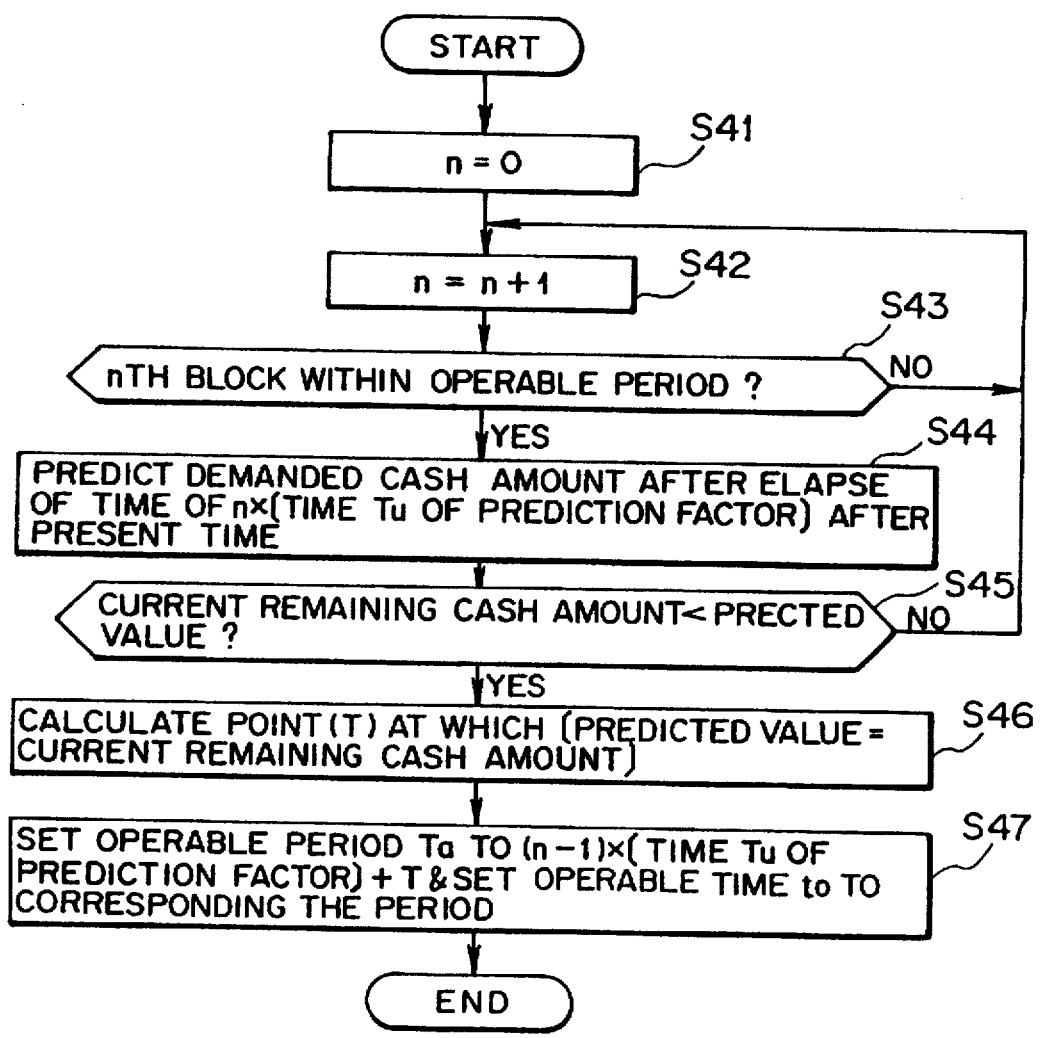
FIG. 27 is a flow chart illustrating the operable time forecasting function of FIG. 26.

Prediction of an operable time of a certain ATM 11 will be described in detail with reference to a flow chart (steps S41 to S47) shown in FIG. 27.

First, the value n for setting the number of predetermined time intervals Tu mentioned hereinabove (prediction factors, blocks; a unit of prediction time, for example, 10 minutes) is set to 0 (step S41), and the value n is incremented by one at next step S42. Thereafter, the following processing is performed for n=1.

It is discriminated whether the nth (n=1 at first) block is within an operation time of the system (step S43), and if the nth block is not within an operation time, the block setting value n is further incremented by one at step S42. On the contrary, if the nth block is within an operation time, then a demanded cash amount after lapse of time of n×Tu after the present point of time is predicted by the remaining money management library 18E (step S44).

Then, the value predicted at step S44 and a remaining cash amount at present in the ATM 11 are compared with each other to discriminate whether or not |remaining money amount|<|predicted value| (step S45). If the remaining cash amount is equal to or higher than the predicted value (NO at step S45), then the control sequence returns to step S42. But if the remaining cash amount is lower than the predicted value (YES at step S45), then a point at which |predicted value|=|remaining money amount at present| stands (time interval T in FIG. 26) is calculated (step S46). Consequently, as seen in FIG. 26, the operable time Ta is calculated as (n−1)×Tu+T, and the corresponding operable time to is calculated as |present point of time|+(n−1)×Tu+T (step S47).

Such processing as described above will be described more simply with reference to FIG. 26. First, in a section ① shown in FIG. 26 (at steps S41 to S45 of FIG. 27), a predicted value for each prediction factor is successively added from the current point of time and a prediction factor (value of n) with which the sum value first exceeds the remaining cash amount of the ATM 11 at present is detected. Then, in another section ② shown in FIG. 26 (at step S46 of FIG. 27), it is detected by calculation at which point of time of the nth prediction factor the predicted value and the remaining money amount at present coincide with each other. Consequently, the operable time point $t_0$ and the operable time period Ta are calculated.

The operable time point $t_0$ calculated in such a manner as described above is displayed together with other prediction results on the display unit 18L of the remaining money management terminal 18 as shown in FIG. 20 by the function of the remaining money management section 18d.

By the way, in a usual case, when stoppage of operation of any of the ATMs 11 to 13 because of consumption of cash occurs, an alarm is developed, and every time an alarm is developed, a staff member supplements cash into the stopping ATM. Accordingly, in order to supplement cash into each of the ATMs 11 to 13 before stoppage of it because of consumption of cash occurs, the remaining money amounts in the ATMs 11 to 13 must be supervised periodically, which makes a heavy burden to a staff member. Further, since the operation schedule is different among different days of the week or the like, it is difficult to grasp till which hour of which day each of the ATMs 11 to 13 can operate with the remaining money amount at present in it.

However, where the operable time point prediction function in the present embodiment described above is used, a staff member can readily grasp, only by referring to the display unit 18L of the remaining money management terminal 18, until when each ATM can operate with the remaining money amount at present, and can grasp an ATM which may possibly suffer from stoppage of operation because of consumption of cash before next periodical supplement of cash. Consequently, the staff member can perform supplement of money with certainty without the necessity for periodical supervision and need not take a countermeasure every time stoppage of operation because of consumption of cash occurs, resulting in significant reduction in burden to the staff member. Further, since an operable time point according to an operation schedule can be predicted and calculated, the staff member can know the operable time point immediately even if it does not know the operation schedule.

B-6. Initial Transaction Data Setting Technique

In the remaining money management system described above, in order to accurately predict the demanded cash numbers for the ATMs 11 to 13, transaction data of the ATMs 11 to 13 must be collected and stored by some amounts. However, when it is tried to introduce a remaining money management system into a business office to be opened newly, since no transaction data in the past are accumulated at all as yet, a data collection apparatus is connected to ATMs of the business office and data are collected actually for a certain period of time (for example, for three to six months). Unless the data collected in an actual operating condition are used, accurate prediction, and consequently, accurate operation of the remaining money management system, cannot be anticipated. Since the transaction of a bank has different characteristics among different business offices, particular data cannot be applied as data for an arbitrary business office.

Therefore, in the present embodiment, transaction data of a plurality of business offices in the past are analyzed to set a plurality of different transaction patterns to which the individual business offices may belong (such as, for example, of a bedroom town type, a terminal type, an office type, a rural district type, a general type and so forth) in advance.

Then, for a business office to be established newly, that is, for a business office with which transaction data in the past to be used for prediction of the demanded money amount by the remaining money management library 18E are not stored on the hard disk 18G, transaction data in the past of another business office which belongs to the same transaction form pattern as that of the new business office (that is, existing data collected in advance) are installed, upon shipment of the system, as default data into the hard disk 18G. This allows operation of the remaining money management system immediately after establishment of the business office.

Figure 28:
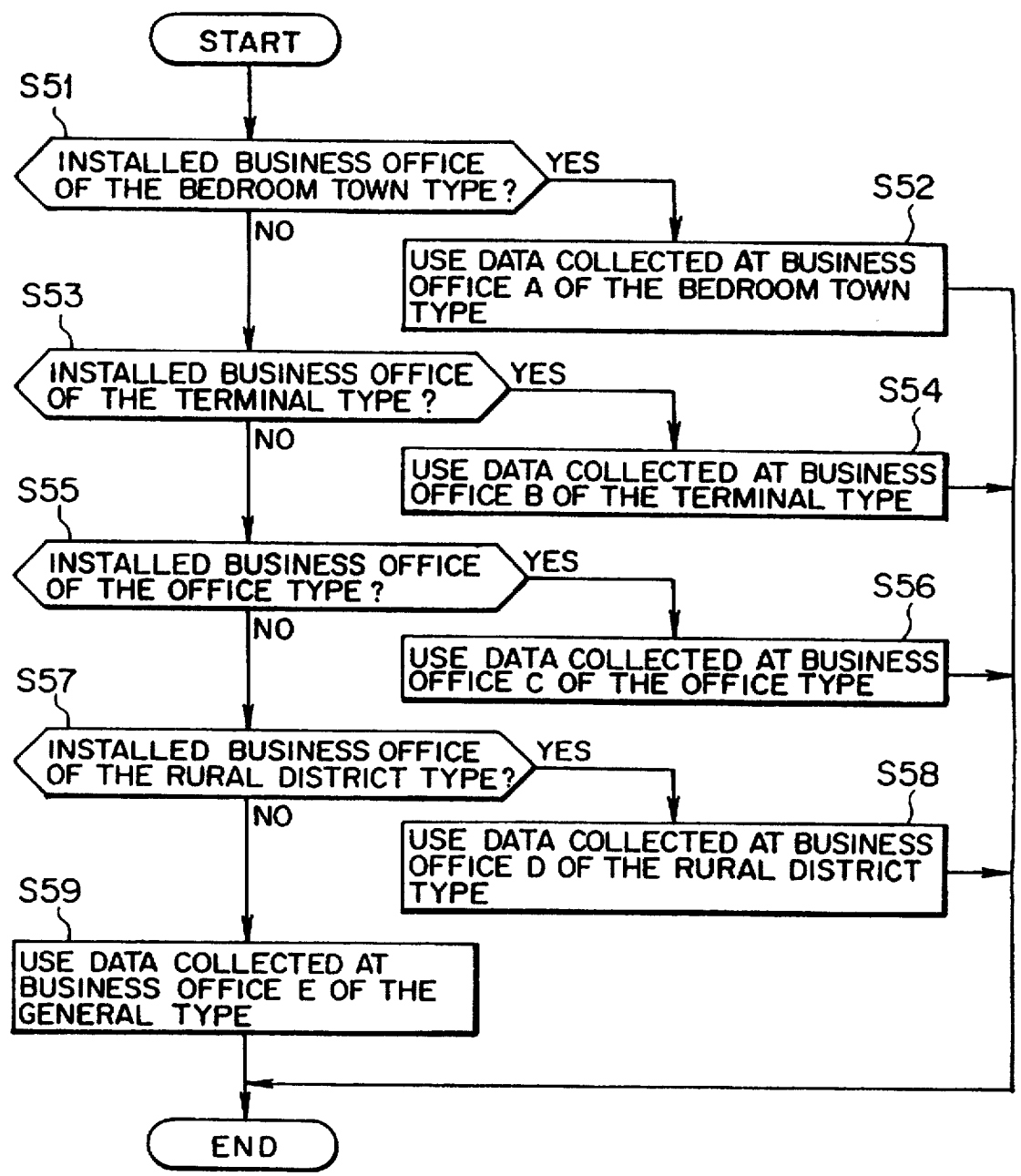
FIG. 28 is a flow chart illustrating an initial transaction data setting method employed in the remaining money management system.

In the following, a detailed method of setting initial transaction data to a business office to be established newly will be described with reference to the flow chart (steps S51 to S59) shown in FIG. 28.

If the business office to be established newly is of the bedroom town type (YES at step S51), then upon shipment of the system, data of a business office A of the bedroom town type collected already are set and stored as initial transaction data onto the hard disk 18G (step S52). Or, if the business office to be established newly is of the terminal type (YES at step S53), then upon shipment of the system, data of another business office B of the terminal type collected already are set and stored as initial transaction data onto the hard disk 18G (step S54) in a similar manner as described above.

Or, if the business office to be established newly is of the office type (YES at step S55), then upon shipment of the system, collected data of a further business office C of the office type are set and stored as initial transaction data onto the hard disk 18G (step 356).

Further, if the business office to be established newly is of the rural district type (YES at step S55), then upon shipment of the system, collected data of a still further business office D are set and stored as initial transaction data onto the hard disk 18G (step S58).

If the judgments at steps S51, S53, S55 and S57 are all NO, it is determined that the business office to be established newly is of the general type, and upon shipment of the system, collected data of a yet further business office E of the general type are set and stored as initial transaction data onto the hard disk 18G (step S59).

It is to be noted that, when data of a transaction form pattern are to be installed at step S52, S54, S56, S58 or S59, if the installed data are corrected based on the number of ATMs to be installed in the new business office, then the initial transaction data can be set so as to conform with a form of the transaction of the new business office.

In this manner, even where transaction data in the past are not stored at all on the hard disk 18G because a business office is to be opened newly or by some other reason, since transaction data in the past of another business office having a transaction form pattern similar to that of the business office in question are used as initial transaction data, the demanded money number can be predicted with a certain degree of accuracy until transaction data of the business office in question are accumulated. Consequently, after a new business office is established, the remaining money management system can be used immediately.

B-7. Technique of Setting Predicted Value of Demanded Money Amount When ATM Environment Changes After the remaining money management system of the present embodiment is installed and used, when the ATM installation environment conditions such as the layout of the automatic machine corner 10, the entrance and the number of the installed ATMs 11 change in the business office into which the system has been installed, if transaction data in the past (data base) accumulated for the individual ATMs 11 are used as they are to predict the demanded money amount, then there is the possibility that the predicted value may be displaced by a great value from an actual value.

Therefore, in the present embodiment, when the installation environment conditions of the ATMs 11 are changed as described above, a total value of predicted values of the demanded money amounts obtained by the remaining money management library 18E for the individual ATMs 11 prior to the change of the installation environment conditions is distributed at a predetermined distribution ratio to the ATMs 11 after the change of the installation environment conditions, and the thus distributed values are used as predicted values (demanded money amounts) of the ATMs 11 after the change of the installation environment conditions.

Figure 29:
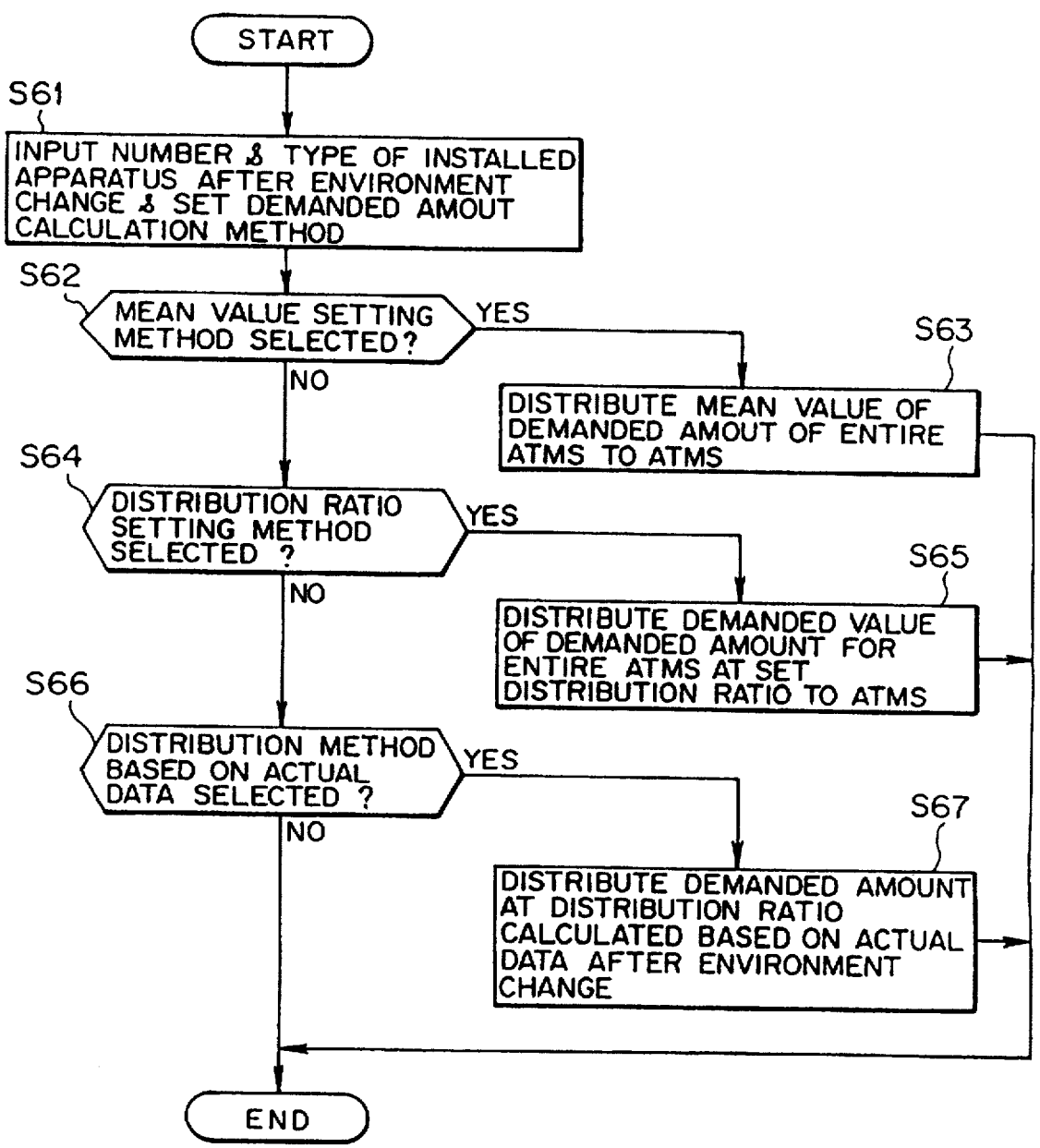
FIG. 29 is a flow chart illustrating a demanded cash amount predicted value setting method when an ATM environment varies in the remaining money management system.

The demanded money amount predicted value setting technique in this instance will be described with reference to the flow chart (steps S61 to S67) shown in FIG. 29.

First, a staff member inputs the installation number and the type of ATMs after a change of the ATM environment to the remaining money management terminal 18 and sets a demanded amount calculation method (step S61).

Then, when a mean value setting method is selectively set as the demanded amount calculation method (YES at step S62), a sum total of predicted values of the demanded money amounts obtained by the remaining money management library 18E for the individual ATMs 11 prior to the change of the installation environment conditions is distributed equally to the ATMs 11 after the change of the installation environment conditions. In short, a mean value of the demanded money amounts for all of the ATMs is distributed to each of the ATMs 11 (step S63).

Or, when a distribution ratio setting method is selectively set as the demanded amount calculation method (YES at step S64), a sum total of predicted values of the demanded money amounts obtained by the remaining money management library 18E for the ATMs 11 prior to the change of the installation environment conditions is distributed at a distribution ratio set by the staff member to the ATMs 11 after the change of the installation environment conditions. In short, the demanded money amount for all of the ATMs is distributed at the distribution ratio set by the staff member to the ATMs 11 (step S65).

Else, when a distribution method based on actual data is selectively set as the demanded amount calculation method (YES at step S66), a sum total of predicted values of the demanded money amounts obtained by the remaining money management library 18E for the ATMs 11 prior to the change of the installation environment conditions is distributed at a distribution ratio automatically calculated based on actual data accumulated for the ATMs 11 after the change of the installation environment conditions to the ATMs 11 after the change of the installation environment conditions (step S67).

While the cash for each of the ATMs 11 is loaded based on predicted values distributed to the individual ATMs 11 as described above, loading of the cash of the predicted money amount into each of the ATMs 11 is performed, where a self-traveling car is provided, fully automatically by the self-traveling car, but where the system does not include a self-traveling car, the money amount to be loaded is displayed on the display unit 18L of the remaining money management terminal 18, and loading of the cash is performed by a staff member referring to the display.

In this manner, when the installation environment conditions of the ATMs 11 are changed, by distributing a sum total of predicted values of the demanded money amounts obtained by the remaining money management library 18E for the individual ATMs 11 prior to the change of the installation environment conditions at a predetermined distribution ratio to the ATMs 11 after the change of the installation environment conditions, the demanded money amounts for the ATMs 11 after the change of the installation environment conditions can be predicted with a high degree of accuracy while using the data base produced on the hard disk 18G by accumulation of data for the individual ATMs 11.

B-8. Cash Circulation Technique in ATM Group

When consumption of cash occurs with any of the ATMs 11 installed in the automatic machine corner 10, supplementary loading of cash into the ATMs 11 with which the consumption of cash has occurred is usually performed by a staff member called from the ATM 11, and even if any other of the ATMs 11 has a surplus amount of cash, the surplus cash is not passed on to the ATM 11 with which the cash is short.

Such circulation of cash is not performed from the following two problems.

Problem 1: It is difficult to determine which ATM 11 has a surplus amount of cash, how much cash should be extracted, and so forth.

Problem 2: When to extract a surplus amount of cash from any ATM 11, the ATM 11 from which cash should be extracted must be rendered inoperative. Extraction of cash is performed by a staff member stopping the ATM 11 and manually inputting an amount of money to be extracted to the ATM 11. Then, the staff member must wait until an extraction operation of counting and extracting the designated money amount in and from the ATM 11 is completed.

In the remaining money management system of the present embodiment, circulation of cash in an ATM group can be realized eliminating the problems 1 and 2 described above by making use of the function of predicting a demanded cash amount by the remaining money management library 18E described hereinabove and managing, by the remaining money management terminal 18, a plurality of ATMs 11 installed in the automatic machine corner 10 as a large ATM group.

Figure 30:
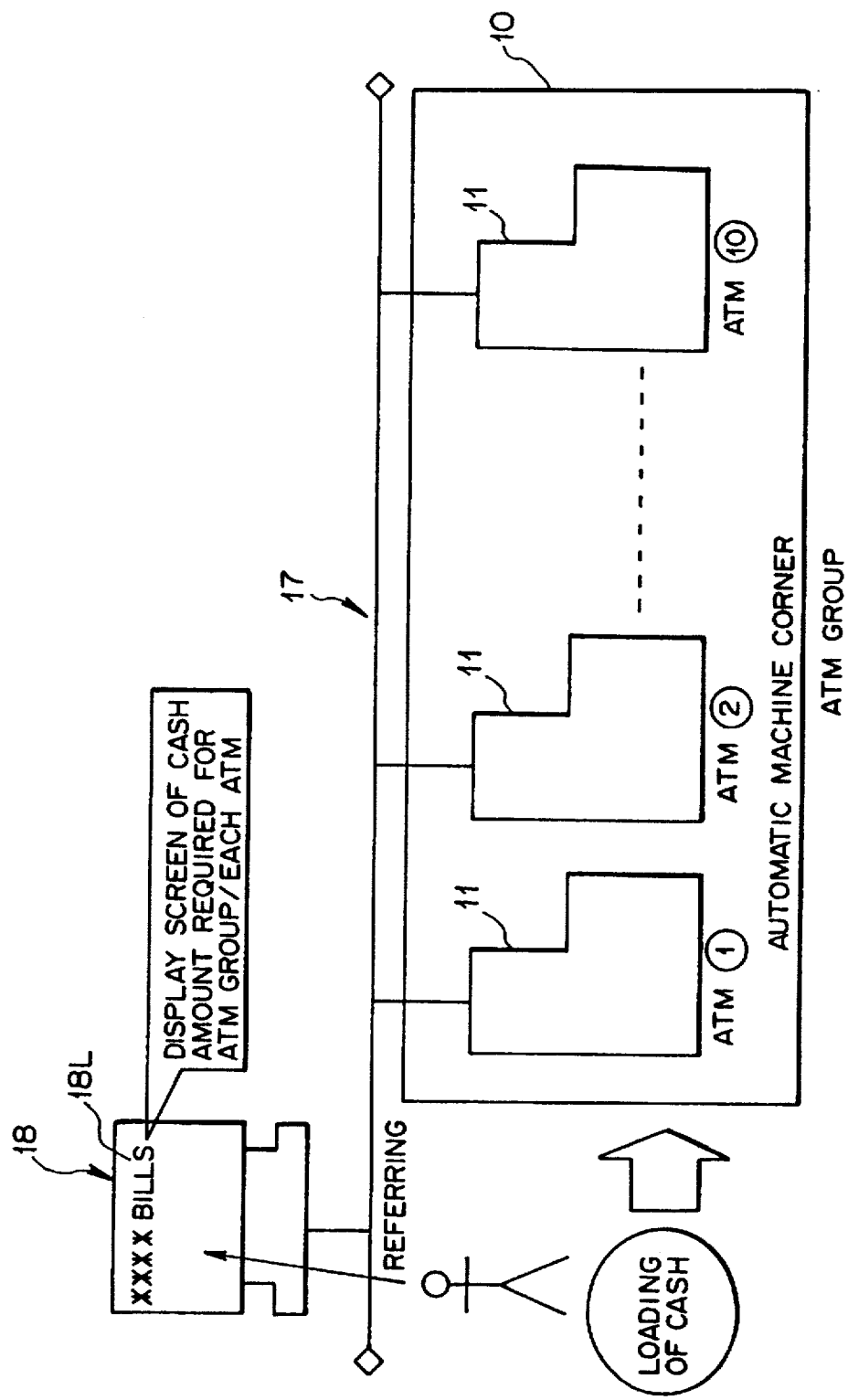
FIG. 30 is a diagrammatic view illustrating initial cash loading of the remaining money management system.

First, regarding, for example, 10 ATMs 11 in the automatic machine corner 10 as one ATM group as seen in FIG. 30, a required amount of cash is loaded. The initial loading amount in this instance may be predicted and determined using the initial prediction function described hereinabove with reference to FIG. 18 regarding the 10 ATMs 11 as a single ATM or may be determined by summing initial loading amounts predicted by the initial prediction function for the individual ATMs 11. A result of the prediction is displayed as a cash amounted required for the ATM group or for each ATM on the display unit 18L of the remaining money management terminal 18.

After a staff member refers to the screen display on the display unit 18L and loads the required amount of cash, the cash in the ATM group is circulated within the ATM group so that a surplus amount of cash may not be loaded into the ATM group except when the entire ATM group suffers from shortage of cash.

When, for example, a large difference is produced between an actual value and a predicted value by a situation of transaction on a day of operation, an indication to move cash from an ATM ① which has a comparatively large amount of cash to another ATM ② whose amount of cash is reduced to almost render the ATM inoperative as seen in FIG. 31 is displayed on the display unit 18L of the remaining money management terminal 18. Then, a staff member refers to the screen display on the display unit 18L, removes the cash cassette 22 (actually a rear safe 37 which will be hereinafter described) of the ATM ①, and carries and loads the cash cassette 22 to and into the ATM ②. In this instance, the staff member need not count the amount of cash to be extracted, and since the amount of cash to be extracted is counted and accommodated in the cash cassette 22 of the ATM ① in advance, the staff member must only remove, carry and load the cash cassette 22. A detailed processing operation in this instance will be hereinafter described with reference to FIGS. 34 and 35.

Figure 32A:
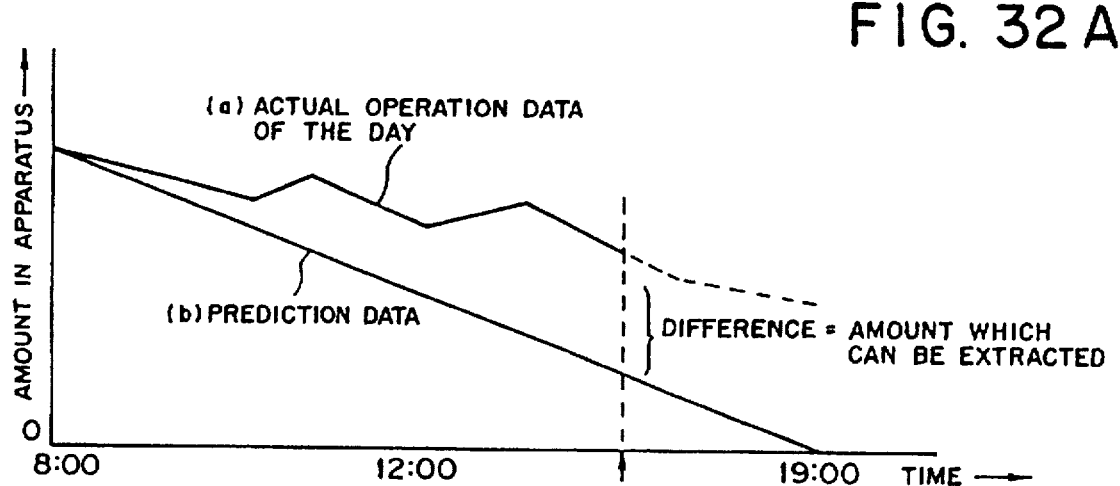
FIG. 32 is a graph illustrating an extraction money amount determination method upon money circulation in an ATM group by the remaining money management system.
Figure 32B:
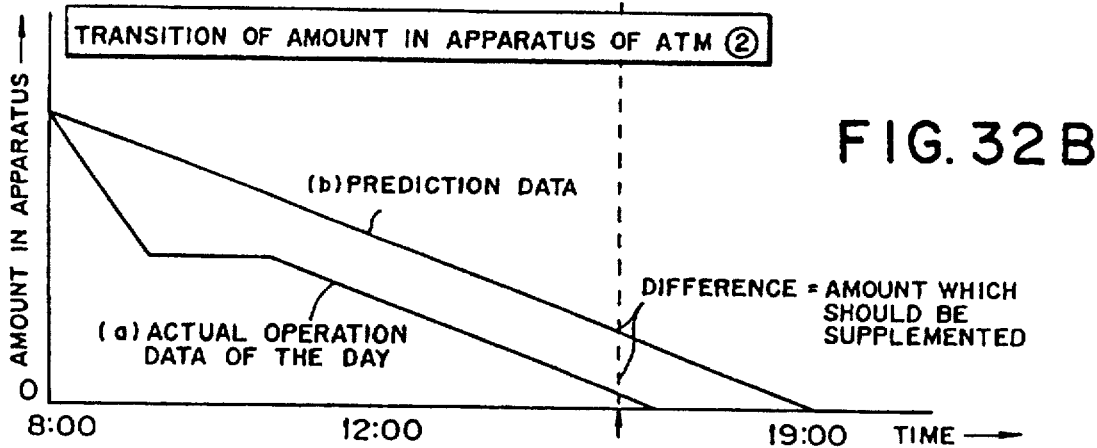

Here, an extraction amount determination technique upon circulation of cash in the ATM group will be described with reference to FIG. 32. The remaining money management terminal 18 supervises the conditions of the ATMs 11 and, when the cash amount of the ATM ② becomes so small that it approaches an inoperative condition, the remaining money management terminal 18 selects another ATM ① which has a surplus amount of cash. In this instance, the remaining money amount transition prediction function of the remaining money management library 18E described hereinabove with reference to FIG. 19 is utilized for the selection.

Then, the remaining money management terminal 18 calculates, as an amount of cash which can be extracted, an amount of cash except for an amount of cash required for the ATM ① until the operation comes to an end (or till a time at which cash should be supplemented to the ATM group). When the amount of cash to be supplemented to the ATM ② is greater than the amount of cash which can be extracted from the ATM ①, or in other words, when the short amount with the ATM ② cannot be made up for only by the surplus amount of cash in the ATM ①, the remaining money management terminal 18 selects another ATM 11 which has a surplus amount of cash and adds the surplus amount of cash from the selected ATM 11.

Figure 33:
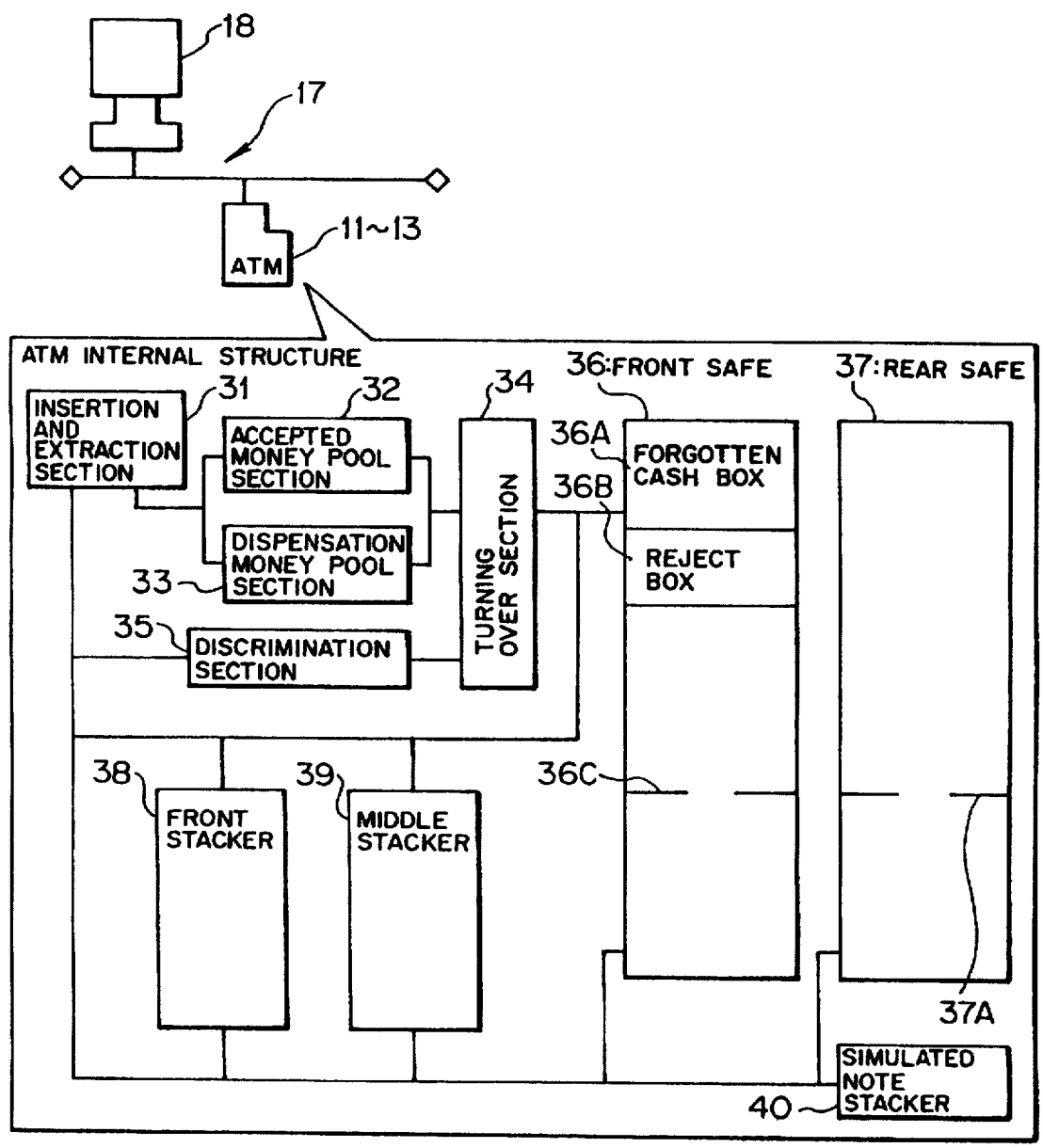
FIG. 33 is a block diagram schematically showing an internal structure of an ATM employed in the remaining money management system.

Here, an internal structure of each of the ATMs 11 will be described with reference to FIG. 33. Each of the ATMs 11 includes an insertion and extraction section 31 through which a customer inserts or extracts cash, an accepted money pool section 32 for temporarily holding cash accepted therein, a dispensation money pool section 33 for temporarily holding cash to be dispensed, a turning over section 34 for turning over a bill, a discrimination section 35 for discriminating cash in the ATM 11, a front safe (F safe) 36 including a forgotten cash box 36A, a reject box 36B and a separator 36C, a rear safe (R safe; cash cassette) 37 having a separator 37A, a front stacker (F stacker) 38, a middle stacker (M stacker) 39, and a simulated note stacker 40.

The remaining money management terminal 18 outputs, after it selects an ATM 11 having surplus cash as described hereinabove, an extraction instruction to the ATM 11 designating an amount of cash to be extracted.

Upon reception of the extraction instruction, the ATM 11 extracts cash of the designated amount and places it into the rear safe 37 which can be removably mounted at any time. Further, since it is required, as a requirement when extraction of money is to be performed, that the rear safe 37 is empty, if the rear safe 37 is not in an empty condition, then the cash in the rear safe 37 is stored into the front safe 36 or the stacker 38 or 39 before extraction is performed. Since such extraction operation can be performed even while a customer is operating the ATM 11, the ATM 11 need not be rendered inoperative.

After the extraction operation of the ATM 11 comes to an end, this is notified to the staff member by sound generated from a buzzer or like means. The staff member refers to the display on the display unit 18L of the remaining money management terminal 18, removes the rear safe 37 from the designated ATM 11 in accordance with the displayed instruction (refer to, for example, FIG. 31), and loads the rear safe 37 into the ATM 11 for which supplement of cash is required.

Figure 34:
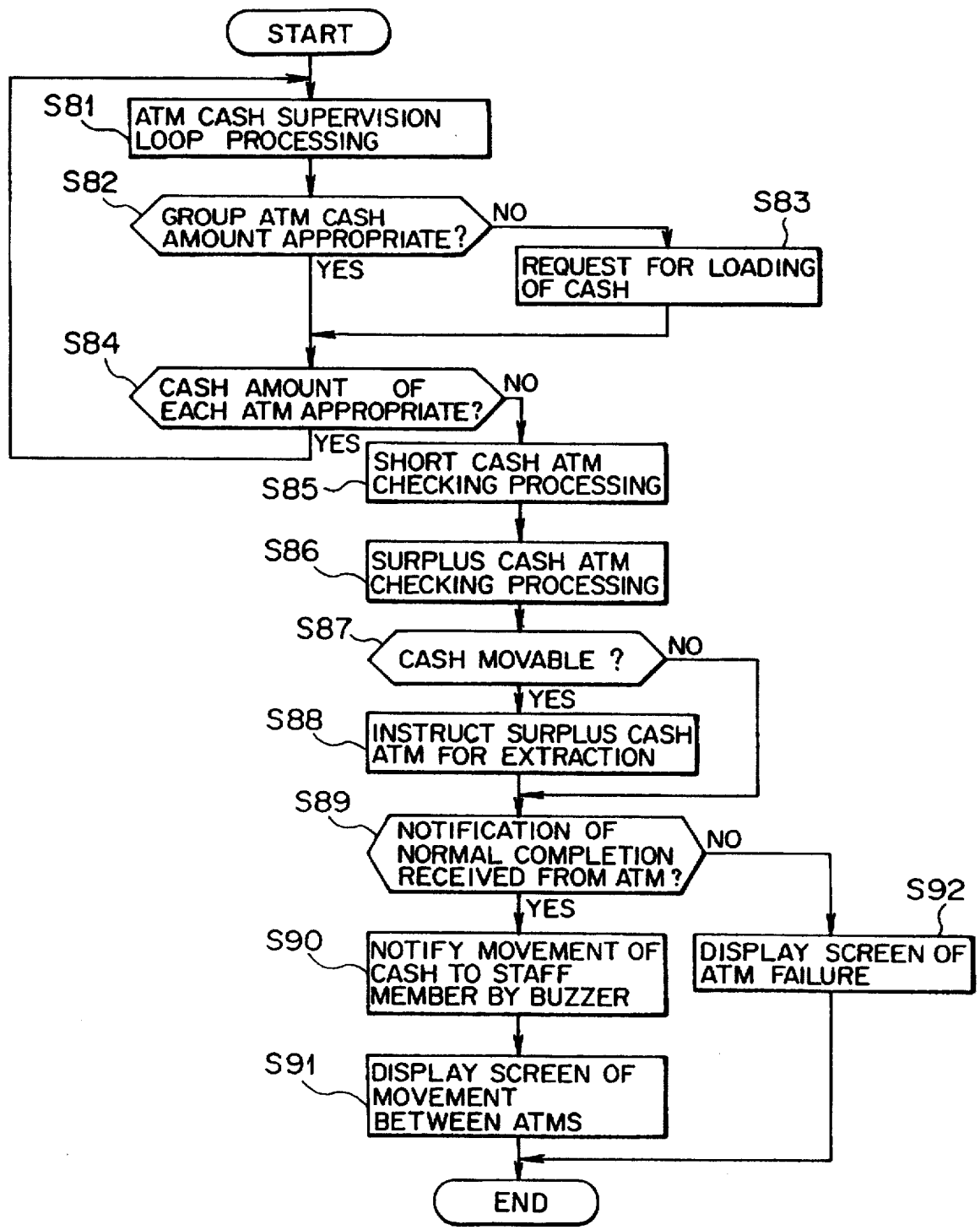
FIG. 34 is a flow chart illustrating operation of a remaining money management terminal when money circulation processing is performed in the remaining money management system.
Figure 35:
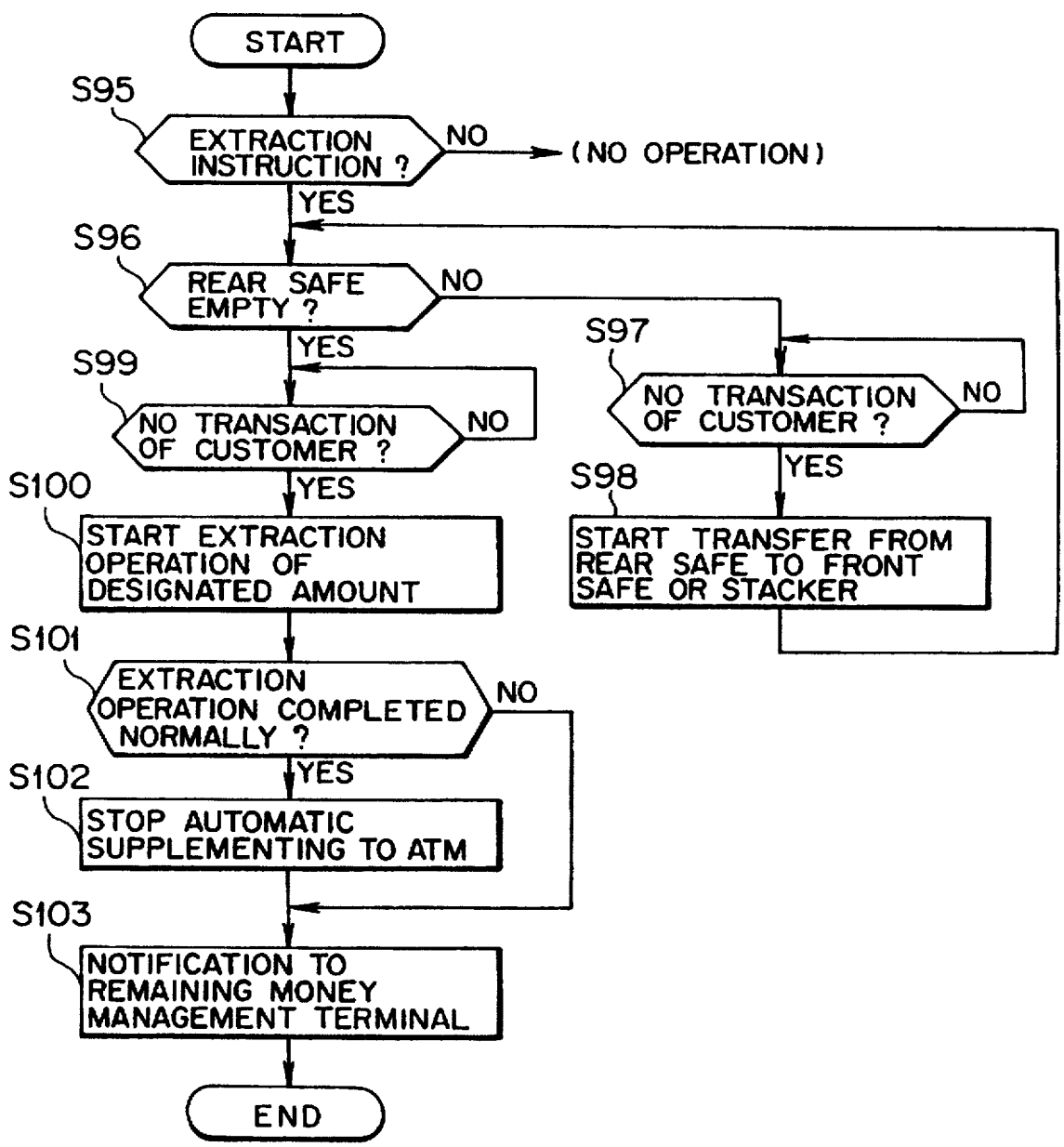
FIG. 35 is a flow chart illustrating operation in the inside of an ATM when money circulator processing is performed in the remaining money arrangement system.

The cash circulation processing operation described above will be described in more detail with reference to the flow chart shown in FIG. 34 (steps S81 to S91) and the flow chart shown in FIG. 35 (steps S95 to S103).

First, operation of the remaining money management terminal 18 where cash circulation processing is performed will be described with reference to FIG. 34. The remaining money management terminal 18 normally executes ATM supervision loop processing (step S81) and discriminates whether or not the amount of cash in the group of ATMs is appropriate (step S82).

When the amount of cash in the entire ATM group is not appropriate (NO at step S82), it is discriminated that the amount of cash of the entire ATM group is insufficient, and a request to load a necessary amount of cash is developed by means of a display on the display unit 18L or the like (step S83). On the contrary, when the amount of cash of the entire ATM group is appropriate (YES at step S82), it is subsequently discriminated whether or not the amount of cash in each of the ATMs 11 is appropriate (step S84).

When the amount of cash in each of the ATMs 11 is appropriate (YES at step S84), the control sequence returns to step S81. However, when the amount of cash in any of the ATMs 11 is insufficient (NO at step S84), the processing of checking that ATM 11 (②) with which cash is insufficient is performed (step S85), and then the processing of checking one of the ATMs 11 (①) which has a surplus amount of cash is performed (step S86), as described hereinabove with reference to FIG. 32.

Then, it is discriminated whether or not movement of cash from the ATM 11 which has a surplus amount of cash to the ATM 11 which has an insufficient amount of cash is possible (step S87), and if movement of cash is not possible, then the control sequence advances to step S89, but if movement of cash is possible, then an extraction instruction is sent to the ATM 11 which has a surplus amount of cash designating an amount of cash to be extracted (step S88).

Thereafter, it is discriminated whether or not the notification that extraction of cash has been completed normally is received from the ATM 11 which has surplus cash (step S89). If no notification of normal completion is received, then an ATM failure is displayed on the display unit 18L (step S92). Also when it is discriminated at step S87 that movement of cash is impossible, a failure display is provided at step S92.

When a normal completion notification is received from the ATMs 11 which has a surplus amount of cash, an instruction to move cash is notified to the staff member by means of the buzzer (step S90), and it is displayed on the display unit 18L from which ATM 11 (①) and to which ATM 11 (②) cash should be moved (step S91).

Subsequently, operation in the inside of each of the ATMs 11 when cash circulation processing is performed will be described with reference to FIG. 35. Each of the ATMs 11 discriminates whether or not an extraction instruction has been received from the remaining money management terminal 18 (step S95), and when no extraction instruction has been received, no particular operation is performed, but when an extraction instruction has been received, it is discriminated whether or not the rear safe 37 is in an empty condition (step S96).

When the rear safe 37 is not in an empty condition, it is discriminated whether or not transaction with a customer is proceeding (step S97), and if no transaction with a customer is proceeding, then cash in the rear safe 37 is extracted from the same and placed into the front safe 36 or the stacker 38 or 39 (step S98). However, if transaction with a customer is proceeding (YES at step S97), it is waited that the transaction comes to an end, and after the transaction comes to an end, the control sequence advances to step S98, at which an operation of extracting cash from the rear safe 37 and placing the cash into the front safe 36 or the stacker 38 or 39 is performed.

On the other hand, if it is discriminated at step S96 that the rear safe 37 is in an empty condition, then it is discriminated whether or not transaction with a customer is proceeding (step S99). If no transaction with a customer is proceeding, an operation of extracting cash of the amount designated from the remaining money management terminal 18 is performed (step S100). If transaction with a customer is proceeding (YES at step S99), then it is waited that the transaction comes to an end, and after the transaction comes to an end, the control sequence advances to step S100, at which an operation of extracting cash of the amount designated by the remaining money management terminal 18 is performed.

Then, it is discriminated whether or not the extraction operation comes to an end normally (step S101). When the extraction operation does not normally come to an end, the control sequence advances to step S103, at which the abnormal ending is notified to the remaining money management terminal 18. However, when the extraction operation comes to an end normally, the automatic supplementing function of the ATM 11 (supplementing function into the rear safe 37) is stopped temporarily (step S102), and it is notified to the remaining money management terminal 18 that the extraction operation has come to an end normally (step S103).

In this manner, in the present embodiment, since an ATM 11 (②) which requires supplementing of cash and another ATM 11 (①) which holds surplus cash are discriminated and it is instructed to perform extraction of cash from the ATM 11 (①) having surplus cash and supplementing of the cash into the ATM 11 (②) which requires supplementing of cash, the staff member is only required to perform extraction and supplementing of cash in accordance with the instruction. Consequently, the burden to the staff member can be reduced further.

Further, after required amounts of cash are loaded first into the plurality of ATMs 11, since the cash in the ATM group can be circulated and additional cash need not be loaded except when the cash in the entire ATM group becomes short, the amount of money for the ATM group can be compressed with a higher degree of certainty.

By the way, while, in the cash circulation processing described above, an instruction to circulate cash is displayed on the display unit 18L of the remaining money management terminal 18 and circulation of cash in the ATM group is performed manually by a staff member referring to the display, where a self-traveling car system (refer to, for example, FIG. 38) which can automatically move a cash cassette 22 (rear safe 37) between the ATMs 11 is provided, circulation of cash can be performed by means of a self-traveling car (refer to reference numeral 50 in FIG. 38). In this instance, such an instruction to circulate cash as described above need not be displayed on the display unit 18L, but is sent to the self-traveling car controller (robot control section) 18H shown in FIG. 3 so that the self-traveling car 50 is controlled to perform cash circulation processing (carrying between and removal from and mounting into the ATMs 11 of a cash cassette 22) by the self-traveling car controller 18H.

However, even where a self-traveling car system is provided, circulation of cash may be performed by both of processing by means of a self traveling car and processing by a staff member or only by processing of a staff member.

Figure 36:
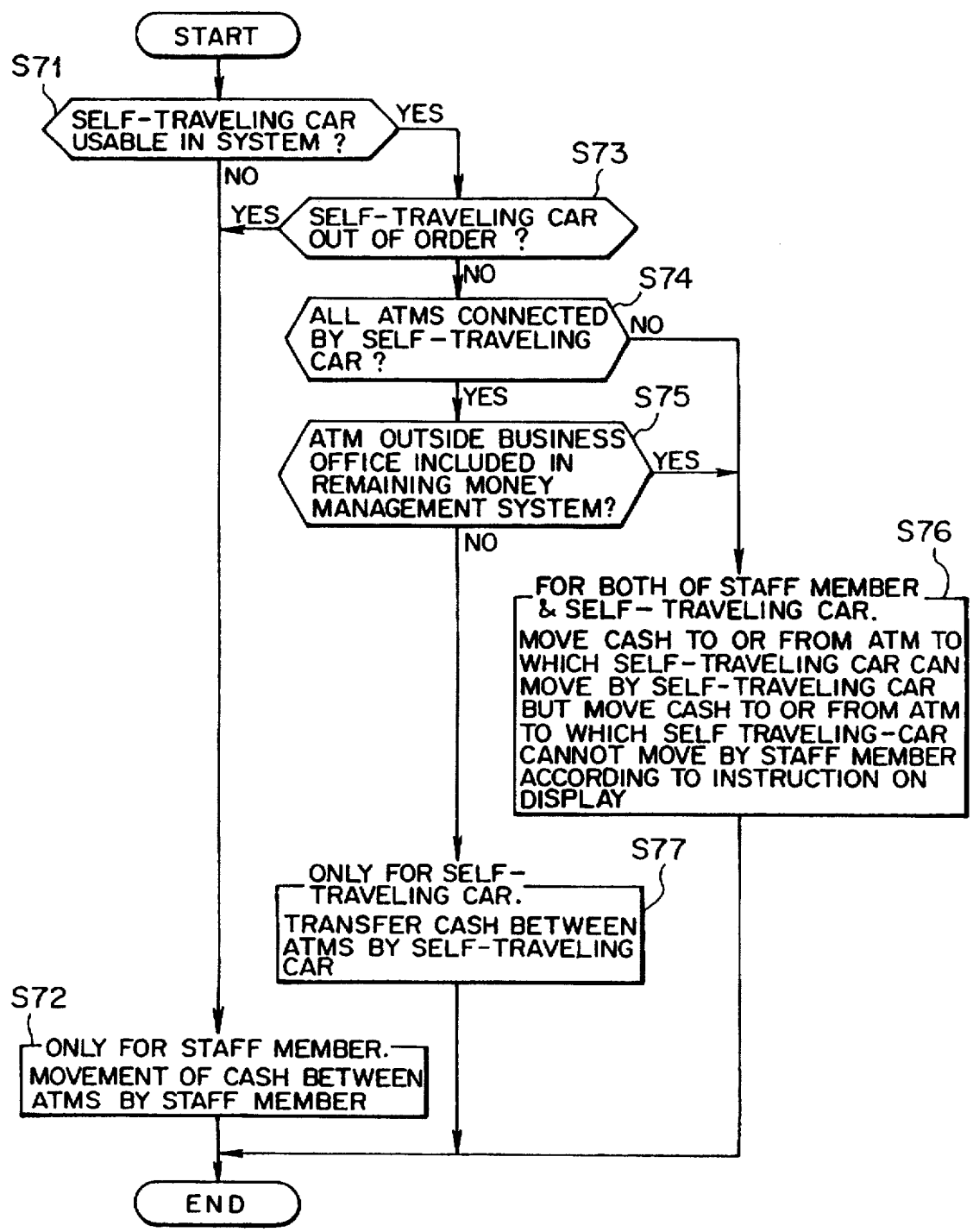
FIG. 36 is a flow chart illustrating cash circulation processing of the remaining money arrangement system where it includes a self-traveling car.

Thus, in the remaining money management terminal 18 in the present embodiment, by performing discrimination processing, for example, in accordance with a flow chart shown in FIG. 36 (steps S71 to S77), cash circulation processing (step S72) only by a staff member, cash circulation processing (step S77) only by the self-traveling car or cash circulation processing (step S76) by both of a staff member and the self-traveling car is selectively performed to instruct circulation of cash.

In particular, referring to FIG. 36, it is first discriminated whether or not the system can use a self-traveling car (step S71), and if the system cannot use a self-traveling car, cash circulation processing only by a staff member is performed (step S72).

When the system can use a self-traveling car, it is discriminated whether or not the self-traveling car is out of order (step S73), and if the self-traveling car is out of order, the control-sequence advances to step S72, at which cash circulation processing only by a staff member is performed.

When the self-traveling car is not out of order (NO at step S73), it is discriminated whether or not all of the ATMs are connected by means of the self-traveling car (step S74). If it is discriminated that all of the ATMs are not connected, cash circulation processing by both of a staff member and the self-traveling car is performed (step S76). In short, for those ATMs to which the self-traveling car can move, cash circulation processing is performed for the ATMs using the self-traveling car, but for those ATMs to which the self-traveling car cannot move, an instruction is displayed on the screen of the display unit 18L and cash circulation processing is performed manually by a staff member.

On the other hand, when it is discriminated that all of the ATMs are connected by means of the self-traveling car, it is discriminated whether or not an ATM or ATMs outside the business office (refer to reference numeral 13 in FIG. 2) are included in the remaining money management system (step S75).

When an ATM or ATMs outside the business office are present (YES at step S75), cash circulation processing by both of a staff member and the self-traveling car is performed (step S76). In this instance, for example, the processing for the ATMs 11 in the business office (in the automatic machine corner 10) is performed by the self-traveling car 50 while the processing for the ATMs 13 outside the business office or for the ATM 12 installed in the lobby is performed by a staff member.

On the other hand, when no ATM outside the business office is present (NO at step S75), cash circulation processing only by the self-traveling car is performed (step S77).

In this manner, where cash circulation processing can be performed using a self-traveling car, extraction/supplementing of cash from and to the ATMs 11 is performed automatically by the self-traveling car, and the necessity for a staff member to manually perform extraction/supplementing of cash from and to the ATMs 11 can be eliminated completely. Consequently, the burden to the staff member can be reduced remarkably. However, when the self-traveling car is out of order or extraction/supplementing of cash by the self-traveling cannot be performed, this is displayed on the display unit 18L. Then, extraction/supplementing processing of cash from and to the ATMs 11 is performed manually by a staff member referring to the display.

B-9. Modification to Arrangement of Remaining Money Management Terminals

In the embodiment described above, the remaining money management terminal 18 is provided for each business office, and the remaining money management system is complete in units of one business office. Accordingly, although transition of the remaining money in units of one business office, the remaining money of the entire bank is not grasped.

Figure 37:
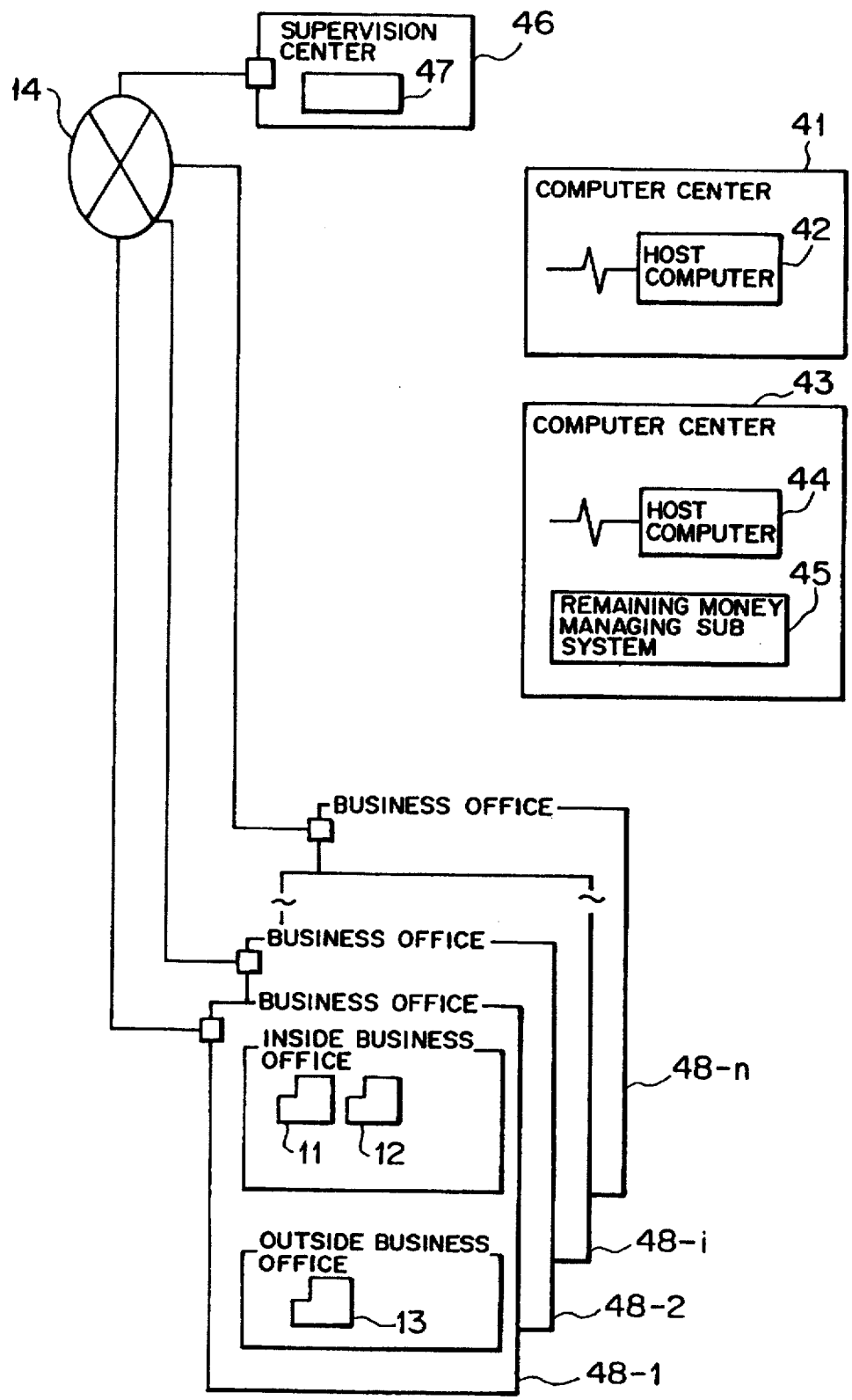
FIG. 37 is a block diagram of the remaining money arrangement system wherein a host computer or a remote control apparatus has a function as a remaining money management terminal.

In an actual system, the ATMs 11 to 13 in different business offices 48-1, 48-2, . . . , 48-i, . . . , and 48-n are, as shown in FIG. 37, connected to an accounting system host computer 42 (or 44) in a computer center 41 (or 43) via respective dedicated lines (not shown).

Therefore, the accounting system host computer 42 itself may be provided with functions similar to those of the remaining money management terminal 18 described hereinabove, or a remaining money amount managing sub system 45 which operates in response to an instruction from the accounting system host computer 44 may be provided with functions similar to those of the remaining money management terminal 18 described hereinabove.

Further, in an actual system, the ATMs 11 to 13 in the business offices 48-1, 48-2, . . . , 48-i, . . . , and 48-n are, as shown in FIG. 37, connected to a remote supervision apparatus (CCMS) 47 in a supervision center 46 via the LAN 17 or the public network 14 described hereinabove.

Therefore, the remote supervision apparatus 47 itself may be provided with functions similar to those of the remaining money management terminal 18 described hereinabove.

Where functions similar to those of the remaining money management terminal 18 are provided in the accounting system host computer 42, the remaining money amount managing sub system 45 or the remote supervision apparatus 47 as described above, the amount of money can be managed over the plurality of business offices 48-1, 48-2, . . . , 48-i, . . . , and 48-n, and it is possible to predict a demanded amount with respect to the total money of the bank and manage the remaining money in units of a bank. Consequently, the money reduction effect can be improved remarkably.

It is to be noted that the functions of the remaining money management terminal 18 may be provided in the universal banking terminal (staff member terminal) 19 provided at the window of the business office, and in this instance, the remaining money management terminal 18 need not be provided separately. Further, since the universal banking terminal 19 is always used at the window by a staff member referring to its display, when some instruction to any of the ATMs 11 to 13 is received, the instruction can be notified immediately to a staff member.

Further, while, in the embodiment described above, transaction data of the ATMs 11 to 13 are accumulated on the hard disk 18G, by accumulating also transaction data of staff member terminals such as the universal banking terminal 19 provided at the window of the business office on the hard disk 18G, also the demanded money amounts for the individual staff member terminals in a designated period of time can be calculated and predicted by the remaining money management library 18E based on transaction data in the past of the staff member terminals such as the universal banking terminal 19 accumulated on the hard disk 18G. In this instance, remaining money management for the total money amount in the business office including the staff member terminals such as the ATMs 11 to 13 and the universal banking terminal 19 can be realized.

B-10. Remaining Money Management System with Self-Traveling Car System

Subsequently, an embodiment of the present invention wherein the remaining money management system described above is provided with a self-traveling car system will be described in detail with reference to FIGS. 38 to 63.

First, a general construction and a general flow of processing of the remaining money management system provided with a self-traveling car system will be described with reference to FIG. 38.

The system shown in FIG. 38 includes a self-traveling car (self-traveling robot) 50 located behind a plurality of ATMs 11 in an automatic machine corner 10 (for example, in a machine room 85 shown in FIG. 47) for automatically extracting and supplementing cash from or into any of the ATMs 11.

The self-traveling car 50 communicates by radio waves with a self-traveling car radio station (radio communication base station) 52 connected to a LAN 17 and receives instructions from the traveling-car control section (self-traveling car controller 18H) of the remaining money management terminal 18 (an instruction to move to an ATM 11 of an object of operation and an instruction to supplement or extract cash to or from the ATM 11 (including an opening or closing instruction for an automatic door 11D which will be hereinafter described) via a radio communication channel through the LAN 17 and the self-traveling car radio station 52. Thus, operations of the self-traveling car 50 for the ATMs 11 are controlled in accordance with the instructions. Consequently, an instruction from the remaining money management terminal 18 is notified with certainty to the self-traveling car 50 which moves to a desired location in the area (for example, the machine room 85 shown in FIG. 47) on the rear face side of the automatic machine corner 10 or the like in which ATMs are located.

Further, a free track for the self-traveling car 50 is formed from a magnetic tape 51 applied to the floor on the rear face side of the ATMs 11. As hereinafter described, the self-traveling car 50 travels along the magnetic tape (free track) 51 while detecting the magnetic tape 51, and removes a cash cassette 22 from an ATM 11 and mounts the cash cassette 22 to another ATM 11 from the rear face side of the ATM 11 to perform a cash extraction/supplementing operation.

Further, in the present system, a cassette station 53 which defines a location at which a cash cassette 22 is removed from or mounted into the self-traveling car 50 is provided. Thus, the self-traveling car 50 removes and mounts a cash cassette 22 from or into the cassette station 53 in a similar manner as in an operation performed for a cash cassette 22 of any ATM 11.

The cassette station 53 includes locking mechanisms 53C and 112 which will be hereinafter described with reference to FIGS. 61 to 63 in order to prevent inadvertent removal of the cash cassette 22, and a counting mechanism (not shown) for counting the amount of cash in a cash cassette 22. A result of the counting (remaining money information) is transmitted to the remaining money management terminal 18 via the LAN 17 so that the remaining money management terminal 18 can settle the remaining amount of the entire ATM group taking also the amount of cash in a cash cassette or cash cassettes 22 at the cassette station 53. Consequently, remaining money management can be performed with a higher degree of accuracy.

It is to be noted that the cassette station 53 may include an automatic cash loading and extraction mechanism (not shown) which automatically performs loading of cash into a cash cassette 22 and extraction of cash from a cash cassette 22. In this instance, loading and extraction of cash into and from the ATM group can be performed automatically by the automatic cash loading and extraction mechanism. In this instance, operation of the cassette station 53 itself or operation of the automatic cash loading and extraction mechanism is controlled in accordance with an instruction (via the LAN 17) from the self-traveling car controller 18H of the remaining money management terminal 18.

However, the system shown in FIG. 38 includes an automatic loading machine 58, which is connected for communication with the remaining money management terminal 18 via the LAN 17 and automatically loads a predetermined amount of cash from the safe 21 into a cash cassette 22 in response to an instruction from the remaining money management terminal 18.

Further, a station controller 54 is connected to the LAN 17. The station controller 54 has, in addition to functions as a cassette station controller 54b and a sensor supervision section 54d which will be hereinafter described with reference to FIG. 39, a power supply section (external power supply) 54B which will be hereinafter described with reference to FIGS. 39 and 52 as well as an operation panel 55 for inputting an instruction to control the operation condition of the self-traveling car 50. A staff member can control the operation condition of the self-traveling car 50 (such as emergency stopping) by manually operating the operation panel 55 of the station controller 54.

Further, a supervision apparatus 56 for supervising the condition of the system and a concentrated journal outputting section 57 for collectively printing an automatic machine journal are connected to the LAN 17.

A general flow of processing of the remaining money management system provided with such a self-traveling car system as described above will be described with reference to reference characters ① to ⑥ in FIG. 38.

First, the remaining money management terminal 18 detects amounts of cash to be supplemented into the individual ATMs 11 and so forth using the technique described hereinabove with reference to FIGS. 3 to 36, and when supplementing of cash is required, the remaining money management terminal 18 controls the automatic loading machine 58 via the LAN 17 (①) to automatically load the predetermined amount of cash from the safe 21 into a cash cassette 22 (②).

A staff member refers to the display on the display unit 18L of the remaining money management terminal 18, conveys the cash cassette 22, into which the predetermined amount of cash has been loaded in response to the display, from the automatic loading machine 58 to the cassette station 53 and places the cash cassette 22 in position into the cassette station (③).

Thereafter, the self-traveling car 50 having received an instruction from the self-traveling car controller 18H of the remaining money management terminal 18 removes the cash cassette 22 from the cassette station 53 (④), travels along the free track 51 to the position of an ATM 11 for which supplementing of cash or the like is required, and loads the cash cassette 22 into the ATM 11. Thus, supplementing of cash (or extraction of cash) is performed automatically (⑤). After supplementing of cash is completed in such a manner as described above, an automatic machine journal of the present processing is printed collectively by the concentrated journal outputting section 57 (⑥).

Subsequently, a functional construction particularly of a portion of the system described hereinabove with reference to FIG. 38 which relates to the self-traveling car system will be described with reference to FIG. 39.

As seen in FIG. 39, each of the ATMs 11 includes a communication interface (ACI) 11A having an interface function with the LAN 17 as a communication line for an automatic supervision system, a body controller 11B for controlling operation of the ATM 11, a terminal box 11C, an automatic door (rear door or rear face side door) 11D of the slide type provided on the rear face side of the ATM 11, an automatic door controller (door opening/closing control processor) 11E for controlling the opening/closing condition of the automatic door 11D, and a door close detection switch (open/closed door detection sensor) 11b for detecting and notifying an open or closed condition of the automatic door 11D to the station controller.

The terminal box 11C connects the communication interface 11A and the automatic door controller 11E to each other so that a controlled condition of the automatic door 11D by the automatic door controller 11E may be transmitted to the station controller 54 via the terminal box 11C, the communication interface 11A and the LAN 17.

The automatic door 11D of each of the ATMs 11 is automatically driven to open or close by a door opening/closing motor 11a (refer to FIG. 52; not shown in FIG. 39) under the control of the automatic door controller 11E. The door opening/closing motor 11a for driving the automatic door 11D to slidably move operates with power supplied thereto from the power supply section 54B of the station controller 54 as hereinafter described with reference to FIG. 52.

When a cash extraction or supplementing operation by the self-traveling car 50 is to be performed, the automatic door 11D is driven to open to provide a space necessary to remove or mount a cash cassette 22 under the control of the automatic door controller 11E which receives an instruction from the self-traveling car 50. After completion of removal or mounting of the cash cassette 22, the automatic door 11D is driven to close under the automatic door controller 11E.

In the condition wherein the automatic door 11D is open to provide the space necessary to remove or mount a cash cassette 22, a cassette holder 11F on which the cash cassette 22 can be held can be tilted through the open space provided by the automatic door 11D so as to expose the cash cassette 22 to the outside. In this condition, removal or mounting of the cash cassette 22 is performed in a procedure hereinafter described with reference to FIGS. 57 and 58 by a robot mechanism 50B of the self-traveling car 50.

The cassette station 53 includes a keeping box 53A (hereinafter described with reference to FIGS. 61 to 63) for keeping a cash cassette 22 therein, a cassette communication controller 53a for receiving an instruction and so forth from a cassette station (ST) controller 54b of the station controller 54 which will be hereinafter described, and a cassette lock controller 53b for controlling the locked condition of the keeping box 53A (cash cassette 22) in response to an instruction and so forth received by the cassette communication controller 53a. It is to be noted that, in the present embodiment, for example, two keeping boxes 53A are provided in one cassette station 53, and an automatic door (rear door) 11D and a door close detection switch 11b similar to those of the ATMs 11 described hereinabove are provided for each of the keeping boxes 53A.

Meanwhile, the remaining money management terminal (group management work station) 18 is formed from a personal computer (PC) 18M including the hard disk 18G, the display unit 18L, the keyboard 18N and so forth. The personal computer 18M is connected for communication to the LAN 17 via the LAN adapter 18P. The functional construction described hereinabove with reference to FIG. 3 is realized by the personal computer 18M.

Figure 40:
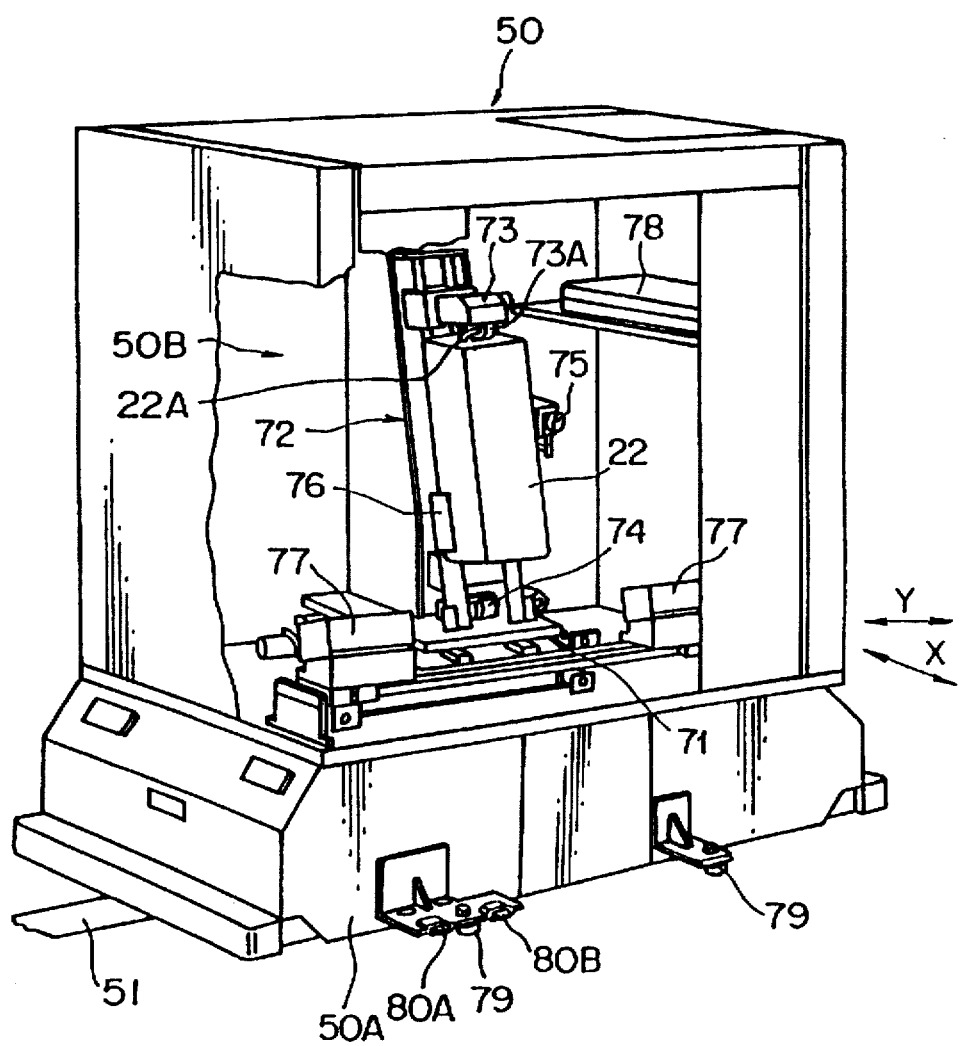
FIG. 40 is a schematic perspective view, partly broken, showing a self-traveling car (self-traveling robot) employed in the remaining money management system.

The self-traveling car (self-traveling robot) 50 includes a self-traveling truck (AGV) 50A which travels along the magnetic tape 51, which serves as a free track, while detecting the magnetic tape 51 by means of a guiding magnetic sensor 82 (refer to FIG. 42), and a robot mechanism 50B located on the self-traveling truck 50A as seen in FIG. 40 for removing or mounting a cash cassette 22 from or onto any of the ATMs 11 from the rear face side of the ATM 11 to perform a cash extracting or supplementing operation.

The self-traveling car 50 further includes a personal computer (PC) 50C for controlling operation of the self-traveling truck 50A and the robot mechanism 50B described above. The personal computer 50C can communicate by radio waves with the self-traveling car radio station (radio communication base station) 52 via a radio control card 50D and can communicate with the remaining money management terminal 18 as described hereinabove.

Figure 42:
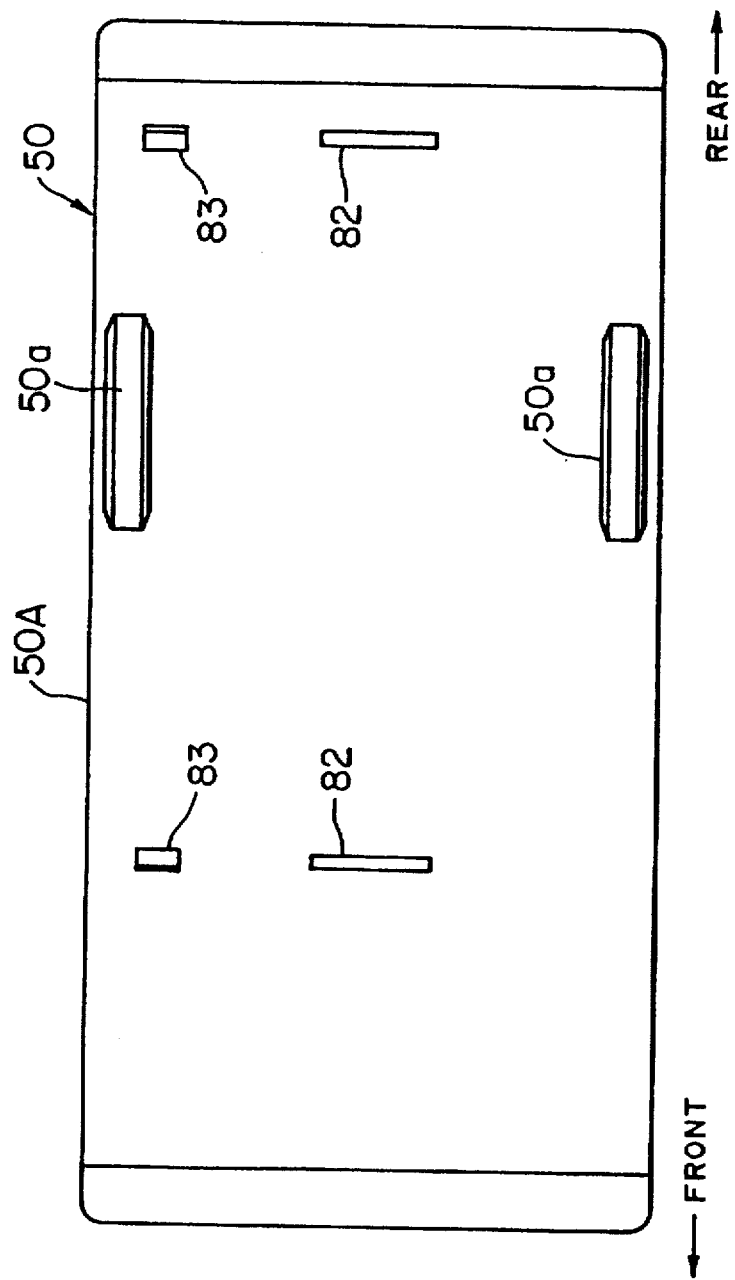
FIG. 42 is a bottom plan view of the self-traveling car of FIG. 40.
Figure 43:
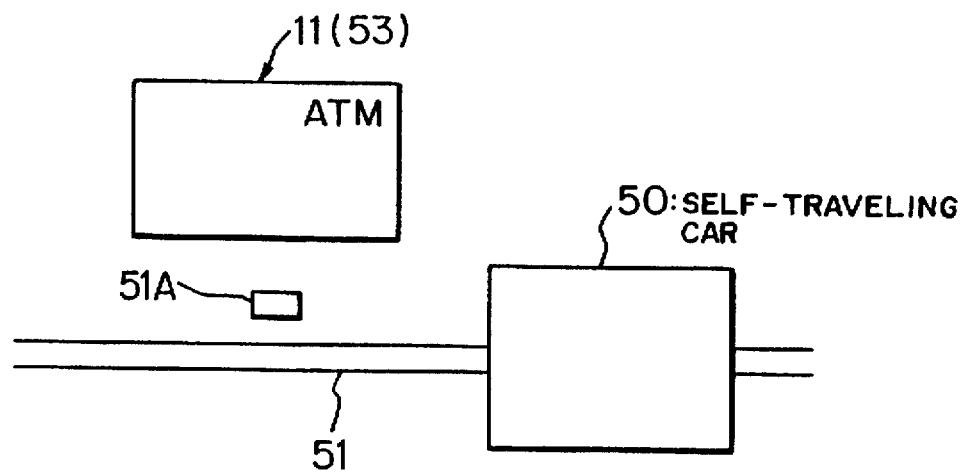
FIG. 43 is a schematic plan view showing a marking magnetic tape for cooperating with the self-traveling car of FIG. 40.
Figure 47:
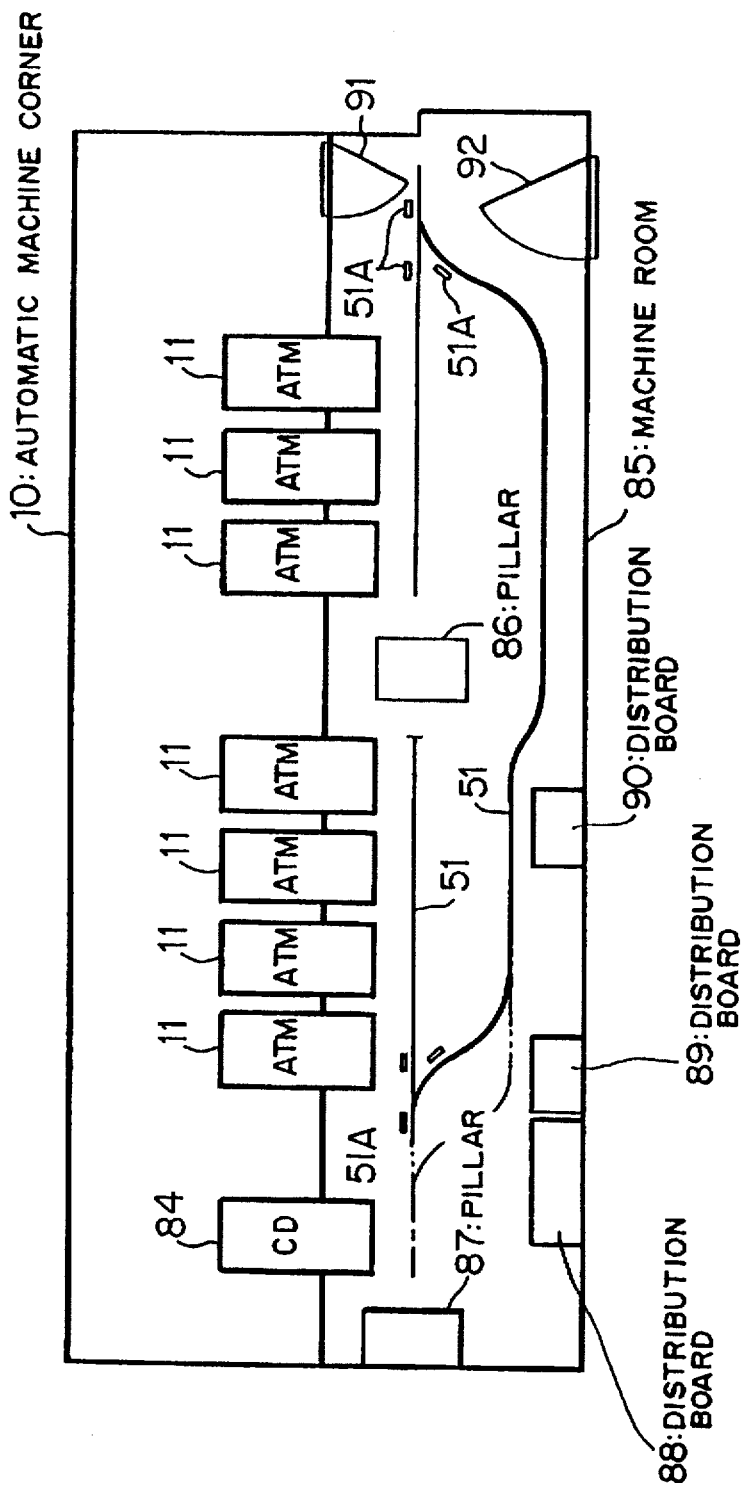
FIG. 47 is a schematic plan view of the remaining money management system illustrating an effect achieved by employment of a free track in the form of a magnetic tape.

On the floor on which the self-traveling car 50 travels, the magnetic tape (free track) 51 for the self-traveling car 50 is formed as shown, for example, in FIG. 39, 43 or 47, and marking magnetic tape segments 51A each for specifying a stopping position of the self-traveling car 50 (refer to FIG. 43) at each of the ATMs 11 (or the cassette station 53) or for specifying a branching location (refer to FIG. 47) at which the self-traveling car 50 should make a switching back operation are applied to the floor. Not only the position at which the self-traveling car 50 should stop at an ATM 11 (or the cassette station 53) or a branching location of the free track is specified, but also an ATM 11 (or the cassette station 53) instructed to perform a cash extracting or supplementing operation from the self-traveling car controller 18H of the remaining money management terminal 18 is specified, by a marking magnetic tape segment S5A detected by a mark magnetic sensor 83 (refer to FIG. 42).

It is to be noted that a pair of left and right drive wheels 50a are provided on the bottom face of the self-traveling car 50 as shown in FIG. 42 so that the self-traveling car 50 may be driven to travel by the turning force of the drive wheels 50a. Further, a pair of front and rear guiding magnetic sensors 82 are provided on the center line of the bottom face of the self-traveling car 50, and a pair of front and rear mark magnetic sensors 83 are provided on a straight line of the bottom face spaced by a fixed distance from the center line of the bottom face.

During traveling of the self-traveling car 50, the personal computer 50C controls operation of the self-traveling truck 50A (traveling direction of the self-traveling car 50) so that the magnetic tape 51 may always be detected by the guiding magnetic sensors 82. Further, the personal computer 50C discriminates, in response to detection signals from the mark magnetic sensors 83, whether or not the self-traveling car 50 arrives at the position of an ATM 11 or the cassette station 53 instructed from the self-traveling car controller 18H of the remaining money management terminal 18 or whether or not the self-traveling car 50 arrives at a branching location at which a switching back operation should be performed.

As described hereinabove, in the present embodiment, the magnetic tape 51 is applied to the floor to form a free track for the self-traveling car 50, and a particular position along the free tack can be detected from a marking magnetic tape segment 51A by the self-traveling car 50 side. Consequently, there is no necessity of installing a rail or the like. Further, even if the layout of the ATMs 11 (or the cassette station 53) is changed such as removal of the ATMs 11 (or the cassette station 53) to a different location or provision of additional ATMs or an obstacle such as a pillar is present between ATMs 11 (or between an ATM 11 and the cassette station 53), the traveling track for the self-traveling car 50 can be arranged or changed very readily.

For example, where seven ATMs 11 and one cash dispenser (CD) 84 are located in the automatic machine corner 10 as seen in FIG. 47, a machine room 85 is formed behind the ATMs 11 and the cash dispenser 84, and the self-traveling car 50 (not shown in FIG. 47) which performs cash extraction/supplementing operations from and to the ATMs 11 travels in the machine room 85.

The free track for the self-traveling car 50 is formed by the magnetic tape 51 applied to the floor in the machine room 85. In this instance, pillars 86 and 87 are present in the machine room 85, and two doors 91 and 92 through which a staff member goes into and out of the machine room 85 and distribution boards 88 to 90 are located in the magnetic tape 51. Particularly, the pillar 86, the door 92 or the distribution board 90 makes an obstacle to traveling of the self-traveling car 50.

However, in the present embodiment, since the free track can be formed not by installing a rail but only by applying the magnetic tape 51, the free track can be formed very readily bypassing those obstacles (the pillar 86, door 92 and distribution board 90). Further, the self-traveling car 50 can detect a branching position for a switching back operation from a marking magnetic tape segment 51A applied to the floor.

Further, where, for example, the cash dispenser 84 is replaced by an ATM 11, the self-traveling car 50 must be able to perform an operation to extract or supplement cash from or into the ATM 11. In such an instance, since a free track conforming to the changed layout (the added ATM) can be formed only by changing the position of the magnetic tape 51, a countermeasure against the change in layout or the like can be taken rapidly.

Figure 44:
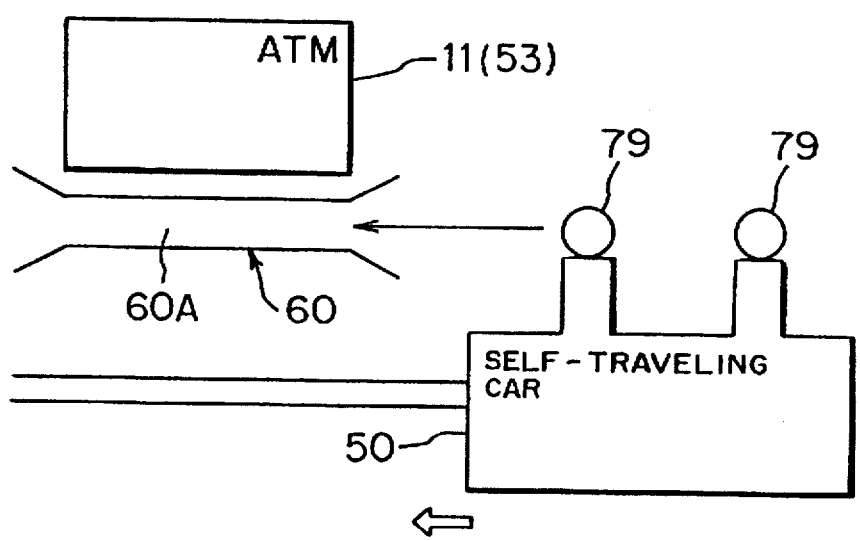
FIG. 44 is a schematic plan view showing a positioning mechanism for the self-traveling car of FIG. 40.
Figure 45:
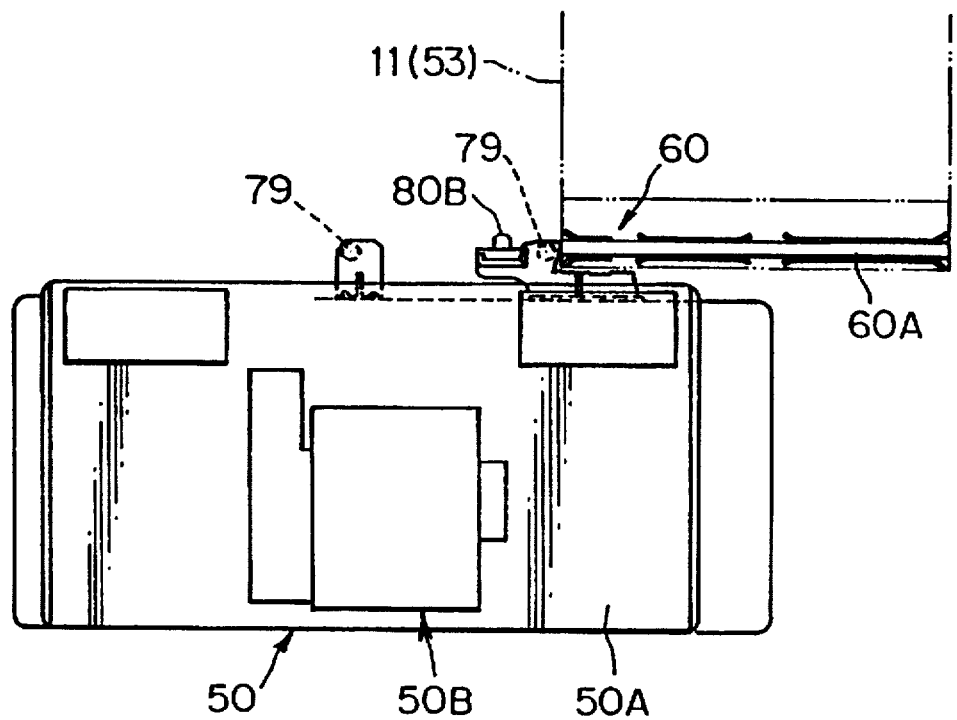
FIG. 45 is a plan view showing details of the positioning mechanism of FIG. 44.
Figure 46:
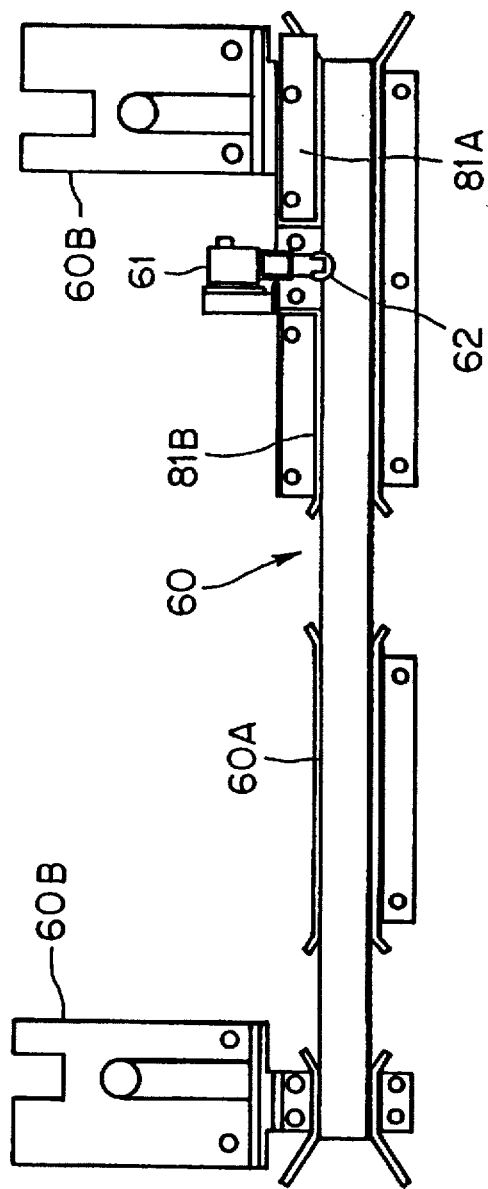
FIG. 46 is a plan view showing a guide rail of the positioning mechanism shown in FIG. 44.

As shown in FIG. 39, a positioning mechanism 60 having a structure which will be hereinafter described in detail with reference to FIGS. 44 to 46 is provided on the rear face side of each of the ATMs 11 and the cassette station 53. The positioning mechanism 60 includes an arrival sensor 61 for detecting that the self-traveling car 50 arrives and stops at the corresponding one of the ATMs 11 and the cassette station 53 in order to perform an operation to extract or supplement cash from or to the ATM 11 or the cassette station 53. The positioning mechanism 60 has a pair of feeder terminals 81A and 81B for supplying power for operating the robot mechanism 50B while the self-traveling car 50 stops.

Meanwhile, as shown in FIG. 39 (or as hereinafter described with reference to FIG. 52), the station controller 54 includes a control section 54A and an external power supply (power supply section) 54B.

The control section 54A of the station controller 54 in the present embodiment includes a main CPU 54a, a cassette station controller 54b, a line control section 54c and a sensor supervision section (arrival sensor supervision section, door opening/closing supervision section) 54d. The control section 54A has a function as a time supervision section 54e which will be hereinafter described with reference to FIG. 52.

The main CPU 54a controls the station controller 54. The cassette station controller 54b controls the cassette station 53. The line control section 54c has an interface function with the LAN 17.

The sensor supervision section 54d receives a detection condition of the arrival sensor 61 at an ATM 11 or the cassette station 53, and has a function of supervising the detection conditions of the ATMs 11 and the cassette station 53 by the arrival sensor 61 in a concentrated manner and notifying the detection condition by the arrival sensor 61 as an operation condition of the self-traveling car 50 to the remaining money management terminal 18 via the line control section 54c and the LAN 17. Owing to this function, the operation condition of the self-traveling car 50 (the stopping position and information regarding from or to which one of the ATMs 11 and the cassette station 53 an operation to extract or supplement cash is proceeding) can always be grasped by the remaining money management terminal 18 side.

Further, the sensor supervision section 54d has a function also as a door open/close supervision section for supervising an open or closed condition of the automatic door 11D of an ATM 11 or the cassette station 53 which is opened when a cash extracting or supplementing operation by the self-traveling car 50 is to be performed. Since the open or closed condition of the automatic door 11D of any of the ATMs 11 and the cassette station 53 is supervised by the function of the sensor supervision section 54d as a door open/close supervision section, the open or closed condition of the automatic door 11D of the ATM 11 or the cassette station 53 which is opened for a cash extracting or supplementing operation by the self-traveling car 50 can always be grasped by the station controller 54 side.

The external power supply 54B supplies power for the robot mechanism 50B to the feeder terminals 81A and 81B of the positioning mechanism 60 for each of the ATMs 11. As hereinafter described with reference to FIG. 52, the power is used to drive the automatic door 11D of the ATM 11 to open or close. In short, the power supply circuit for supplying power for the robot mechanism is provided separately from the power supply circuit (not shown) for supplying power to the ATMs 11.

Subsequently, a structure of the self-traveling car 50 in the present embodiment will be described in more detail with reference to FIGS. 40 and 41. In FIG. 40, the self-traveling car 50 in a condition wherein a cash cassette 22 is held by the robot mechanism 50B is shown partly in section, and in FIG. 41, only the robot mechanism 50B placed on the self-traveling truck 50A is shown in a separated condition.

As shown in FIG. 40, the robot mechanism 50B is placed on the self-traveling truck (AGV) 50A of the self-traveling car 50 which travels along the magnetic tape 51.

Figure 41:
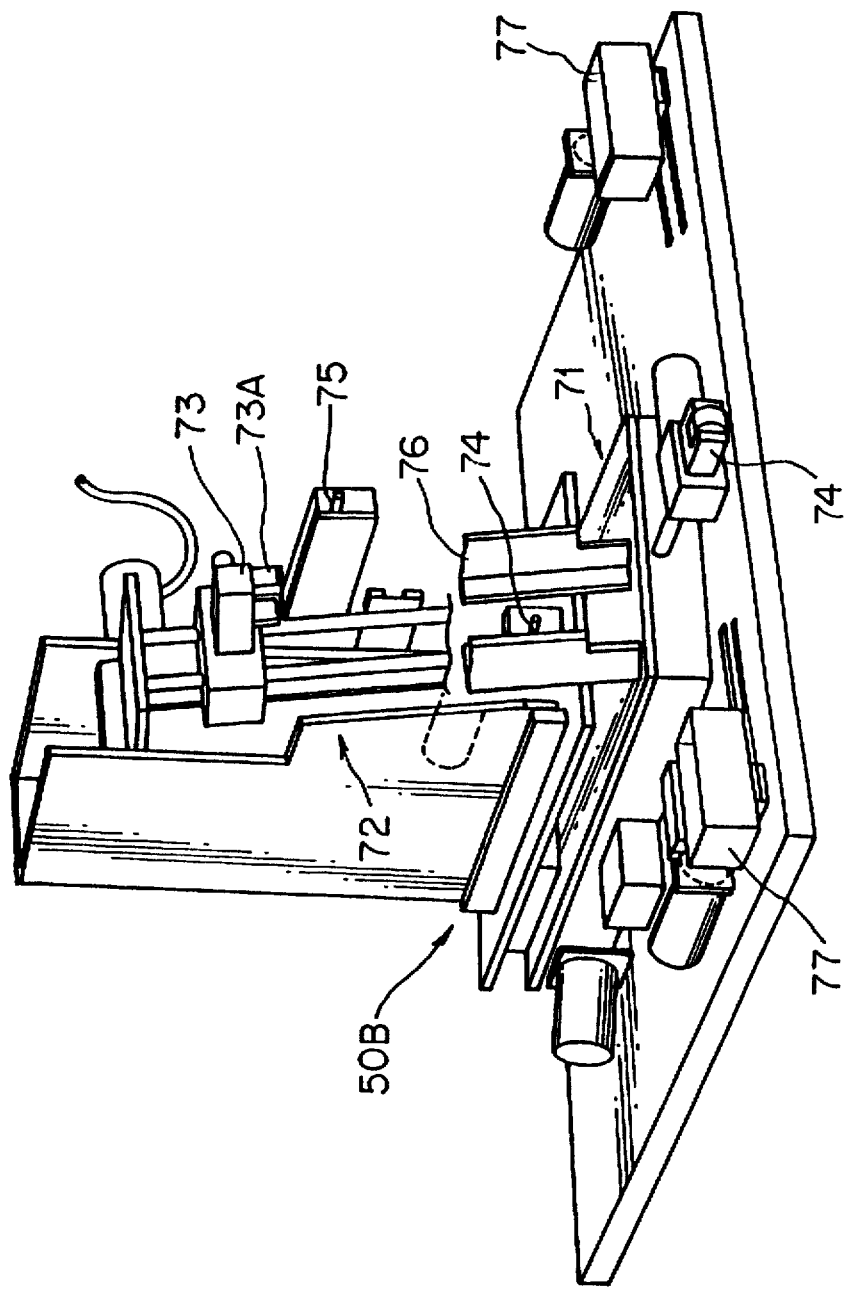
FIG. 41 is a perspective view showing a robot mechanism of the self-traveling car of FIG. 40.

As shown in FIGS. 40 and 41, the robot mechanism 50B includes, roughly speaking, two components including an X-Y stage section 71 placed directly on the self-traveling truck 50A, and a handler section 72 installed on the X-Y stage section 71.

The X-Y stage section 71 moves the entire handler section 72 in a two-dimensional plane of an X direction (forward and backward direction of the self-traveling car 50) and a Y direction (leftward and rightward direction of the self-traveling car 50) to position the handler section 72 with respect to an ATM 11.

The handler section 72 includes a cassette pullout-insertion unit 73 which moves substantially in upward and downward directions. The cassette pullout-insertion unit 73 includes a chuck unit 73A for grasping a handle 22A (refer to FIG. 40 or 61) at an upper portion of a cash cassette 22.

Figure 49:
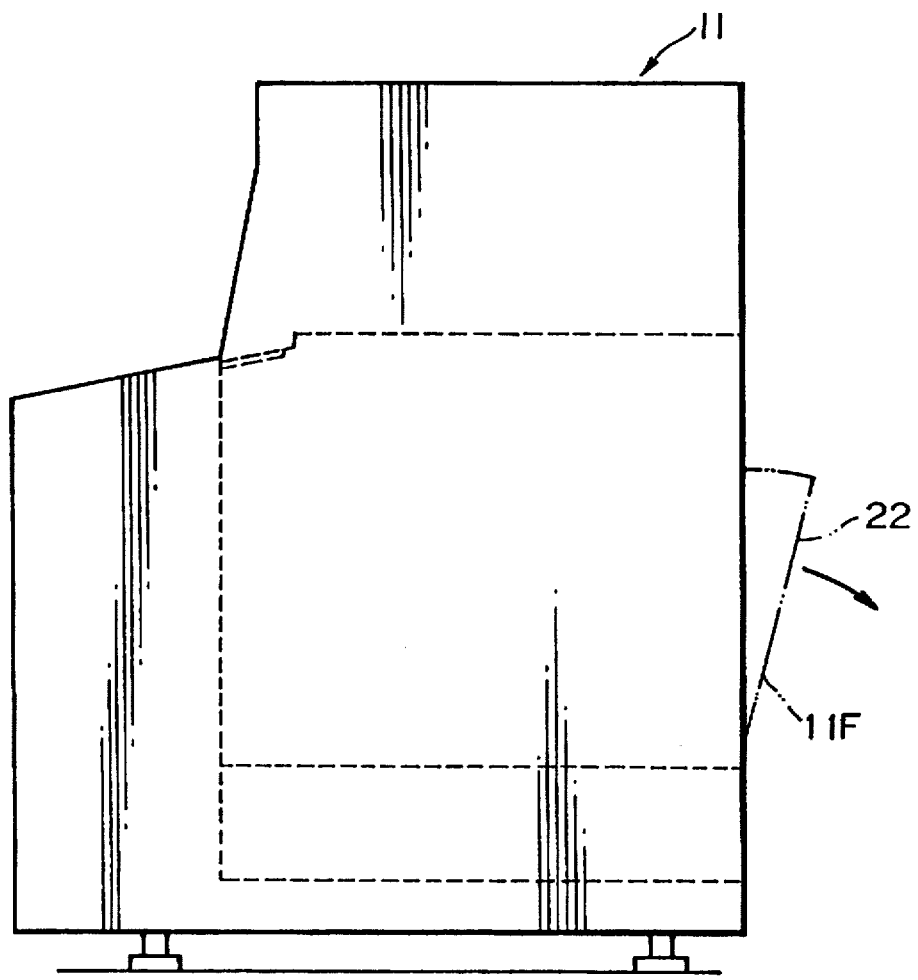
FIG. 49 side elevational view of the ATM shown in FIG. 48.

The chuck unit 73A moves in a direction parallel to the direction in which a cash cassette 22 (cassette holder 11F) shown in FIGS. 48 and 49 is inclined. Accordingly, the cash cassette 22 can be pulled out from the cassette holder 11F of an ATM 11 by lifting the cassette pullout-insertion unit 73 while the handle 22A of the cash cassette 22 is grasped by the chuck unit 73A, and can be inserted into the cassette holder 11F of the ATM 11 by lowering the cassette pullout-insertion unit 73.

The handler section 72 includes a cassette pushing-in unit 74, a lever operation unit 75 and a cash cassette insertion guide unit 76.

The cassette pushing-in unit 74 moves in an X direction in order to push the cash cassette 22 and the cassette holder 11F, which extend outwardly in an inclined condition from the cassette holder 11F after the cash cassette 22 is inserted into the cassette holder 11F of the ATM 11, into the ATM 11.

The lever operation unit 75 cancels a locked condition of the cash cassette 22 by manual operation of a lever not shown for the ATM 11 when it is tried to pull out the cash cassette 22 from the cassette holder 11F of the ATM 11.

The cash cassette insertion guide unit 76 guides the opposite sides of the cash cassette 22 which is moved substantially in an upward or downward direction by the cassette pullout-insertion unit 73 when the cash cassette 22 is removed or mounted.

A keeping box transport unit 77 is mounted for movement in the Y direction on the self-traveling truck 50A. The keeping box transport unit 77 temporarily holds a cash cassette 22 to be transported by the self-traveling car 50. By moving the keeping box transport unit 77 in the Y direction until it is positioned to the handler section 72 and moving the cassette pullout-insertion unit 73 upwardly or downwardly, the cash cassette 22 can be removed from or inserted into the keeping box transport unit 77 in a similar manner as upon removal or insertion of the cash cassette 22 from or into an ATM 11.

The X-Y stage section 71 and the units 73 to 75, 77 and 73A are driven to move by a robot power section 94 (refer to FIG. 51) including several drive motors. The robot power section 94 is operated by power fed from the station controller 54 as hereinafter described. Further, operation of the robot mechanism 50B is controlled by adjustment of the operation condition of the robot power section 94 by a robot control section 78 (refer to FIGS. 40 and 51) in response to an instruction from the personal computer 50C.

As shown in FIG. 40, a pair of front and rear guide rollers 79 are provided on a side face of the self-traveling car 50 (self-traveling truck 50A) for engagement with a guide rail 60A of a positioning mechanism 60 which will be hereinafter described with reference to FIGS. 44 to 46. Also, a pair of current collection terminals 80A and 80B for receiving supply of power from the outside are provided on the side face of the self-traveling car 50 (self-traveling truck 50A).

Subsequently, removing and mounting operations of a cash cassette 22 from and into an ATM 11 which are performed by the robot mechanism 50B having the construction described above will be described with reference to FIGS. 57 and 58.

Figure 57:
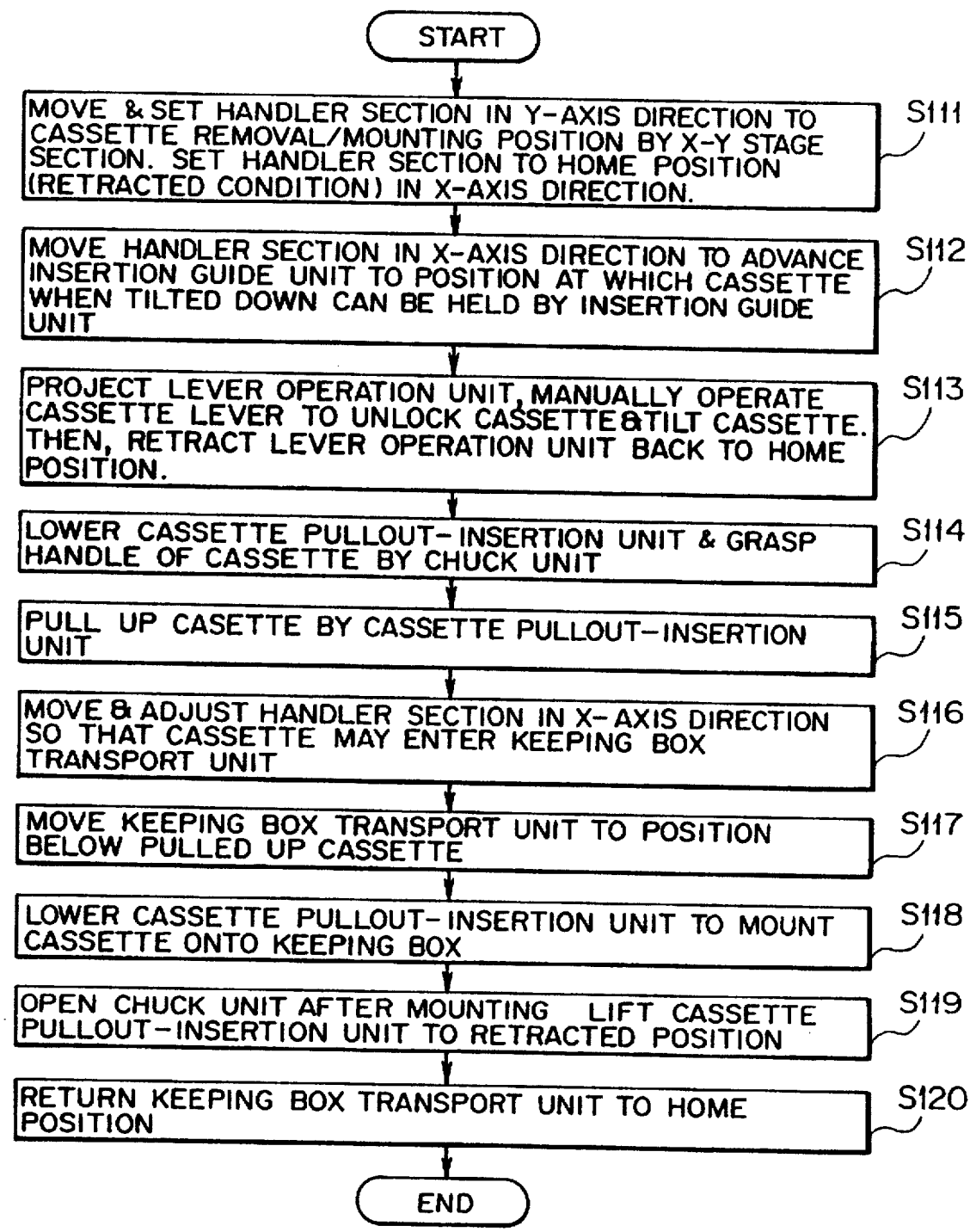
FIG. 57 is a flow chart illustrating a cash cassette removing operation of the robot mechanism of FIG. 41.

First, a removing operation of a cash cassette 22 will be described with reference to the flow chart (steps S111 to S120) shown in FIG. 57.

In order for the self-traveling car 50 to remove a cash cassette 22 from a particular ATM 11 (or the cassette station 53) (to perform a cash extraction operation), the self-traveling car 50 travels to and stops at the position of the ATM 11 (or the cassette station 53). Then, the automatic door 11D of the ATM 11 (or the cassette station 53) is opened by a procedure which will be hereinafter described with reference to FIGS. 53 to 56, and thereafter, the following operations are performed.

In particular, the handler section 72 is positioned to a cassette removal/mounting position with respect to the Y axis direction by the X-Y stage section 71. In this instance, the handler section 72 is positioned to its home position (retracted condition) with respect to the X axis direction (step S111). Then, the handler section 72 is moved in the X axis direction by the X-Y stage section 71 to advance the cash cassette insertion guide unit 76 to a position at which, when the cash cassette 22 is tilted down from the ATM 11 side, the cash cassette insertion guide unit 76 can receive the cash cassette 22 (step S112).

Then, the lever operation unit 75 is projected toward the ATM 11 side, and a cassette lever not shown of the ATM 11 is manually operated to unlock the cash cassette 22. Then, the cash cassette 22 is tilted together with the cassette holder 11F. Thereafter, the lever operation unit 75 is returned to its home position (step S113).

In this condition, the cassette pullout-insertion unit 73 is moved down until the handle 22A of the cash cassette 22 is grasped by the chuck unit 73A (step S114), and then, the cassette pullout-insertion unit 73 is lifted to pull up the cash cassette 22 (step S115).

After the cash cassette 22 is pulled out from the cassette holder 11F in this manner, the handler section 72 is moved in the X axis direction by the X-Y stage section 71 and adjusted to a position at which the handler section 72 can mount the cash cassette 22 onto the keeping box transport unit 77 (step S116). Then, the keeping box transport unit 77 is moved in the Y axis direction to a position below the cash cassette 22 which has already been lifted above (step S117), and then the cassette pullout-insertion unit 73 is moved down to mount the cash cassette 22 onto the keeping box transport unit 77 (step S118).

After the cash cassette 22 is mounted onto the keeping box transport unit 77 in this manner, the chuck unit 73A is opened and the cassette pullout-insertion unit 73 is lifted to its retracted position (step S119), and the keeping box transport unit 77 is returned to its home position (step S120), thereby completing the series of steps of removing operation of the cash cassette 22.

Figure 58:
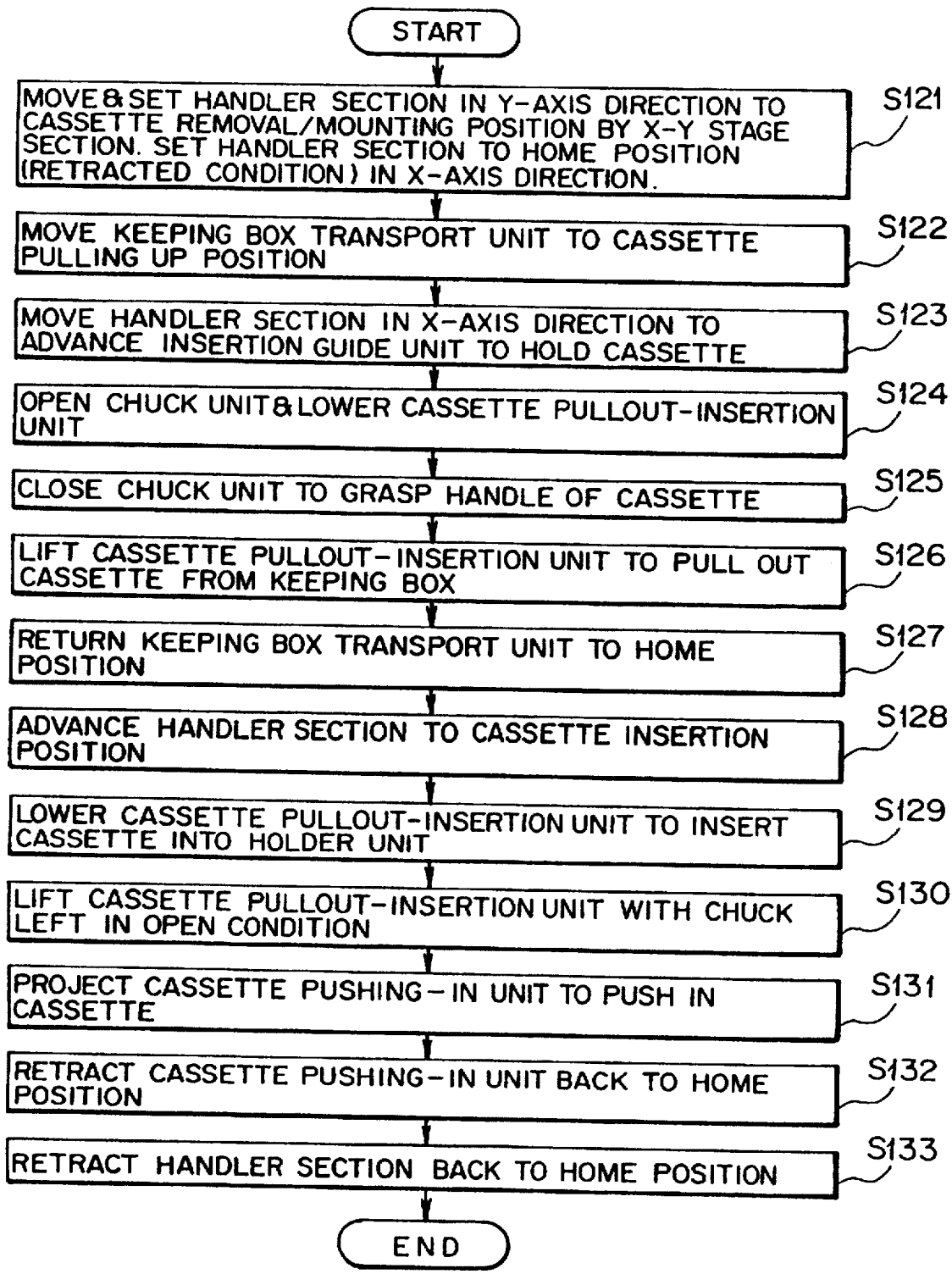
FIG. 58 is a flow chart illustrating a money cassette loading operation of the robot mechanism of FIG. 41.

A mounting operation of the cash cassette 22 will be described below with reference to the flow chart (steps S121 to S133) will be described with reference to FIG. 58.

In order for the self-traveling car 50 to mount the cash cassette 22 onto a particular ATM 11 (to perform a cash supplementing operation), the self-traveling car 50 travels to and stops at the position of the ATM 11. Then, the automatic door 11D of the ATM 11 is opened by a procedure which will be hereinafter described with reference to FIGS. 53 to 56, and the cassette holder 11F is tilted outwardly as seen in FIGS. 48 and 49. Thereafter, the following operations are performed.

In particular, the handler section 72 is positioned to a cassette removal/mounting position with respect to the Y axis direction by the X-Y stage section 71. In this instance, the handler section 72 is positioned to its home position (retracted condition) with respect to the X axis direction (step S121). Then, the keeping box transport unit 77 in which the handler section 72 is kept is moved in the Y axis direction to a cassette pulling up position at which the cash cassette 22 is to be pulled up by the handler section 72 (step S122), and then, the handler section 72 is moved in the X axis direction by the X-Y stage section 71 to advance the cash cassette insertion guide unit 76 until the cash cassette 22 kept in the keeping box transport unit 77 is received by the cash cassette insertion guide unit 76 (step S123).

Then, while the chuck unit 73A is in an open condition, the cassette pullout-insertion unit 73 is moved down (step S124), and at a point of time at which the chuck unit 73A comes to the position of the handle 22A of the cash cassette 22, the chuck unit 73A is closed to grasp the handle 22A of the cash cassette 22 in the chuck unit 73A (step S125).

In this condition, the cassette pullout-insertion unit 73 is moved up to pull out the cash cassette 22 from the keeping box transport unit 77 (step S126), and then the keeping box transport unit 77 is returned to its home position (step S127).

Thereafter, the handler section 72 is moved in the X axis direction to a cassette insertion position by the X-Y stage section 71 (step S128), and the cassette pullout-insertion unit 73 is moved down to insert the cash cassette 22 into the cassette holder 11F of the ATM 11 (step S129).

After the cash cassette 22 is mounted in position into the cassette holder 11F in this manner, the chuck unit 73A is opened and the cassette pullout-insertion unit 73 is moved up (step S130), whereafter the cassette pushing-in unit 74 is projected in the X axis direction to push the cash cassette 22 and the cassette holder 11F, which are in a condition tilted outwardly, into the ATM 11 (step S131).

Then, the cassette pushing-in unit 74 is retracted to its home position (step S132), and the handler section 72 is retracted to its home position by the X-Y stage section 71 (step S133), thereby completing the series of steps of mounting operation of the cash cassette 22.

The sequence of operations described above with reference to FIGS. 57 and 58 is performed by operation of the robot power section 94 which is controlled by the robot control section 78 receiving instructions from the personal computer 50C.

A detailed construction of the positioning mechanism 60 in the present embodiment will be described below with reference to FIGS. 44 to 46 and 50.

First, a basic construction of the positioning mechanism 60 will be described with reference to FIGS. 44 and 45. As shown in FIGS. 44 and 45, a guide rail 60A serving as a positioning mechanism 60 is provided on the rear face side of each of the ATMs 11 or on the rear face side of the cassette station 53. The guide rail 60A has a function of guiding a pair of front and rear guide rollers (positioning metal members) 79 mounted on the self-traveling car 50 at a time to restrict a stopping position of the self-traveling car 50 with respect to an ATM 11 (or the cassette station 53). It is to be noted that, since the cassette station 53 includes two keeping boxes 53A for each of which an automatic door 11D is provided, also the positioning mechanism 60 is provided for each of the keeping boxes 53A.

Accordingly, the self-traveling car 50 moves under the guidance of the magnetic tape 51 until it reaches an ATM 11 (or the cassette station 53), and after the self-traveling car 50 approaches the rear face of the ATM 11 (or the cassette station 53), although it is guided by the magnetic tape 51, it is controlled mechanically and compulsorily by the engagement of the guide rollers 79 thereof with the guide rail 60A so that it may have a fixed distance from the ATM 11 (or the cassette station 53). This allows an automatic cash extraction or supplementing operation to be performed with certainty for the ATM 11 (or the cassette station 53) by the robot mechanism 50B.

Further, the positioning mechanism 60 is fixed to the ATM 11 (or the cassette station 53) side by means of a foot rest fixing section 60B as seen in FIG. 46. As described hereinabove with reference to FIG. 39, the positioning mechanism 60 has an arrival sensor 61 for detecting that the self-traveling car 50 has arrived and stopped at the ATM 11 (or the cassette station 53).

A contact roller 62 is mounted for rotation at an end of the arrival sensor 61. The arrival sensor 61 is disposed such that the contact roller 62 extends a little into the guide rail 60A of the positioning mechanism 60.

Figure 50:
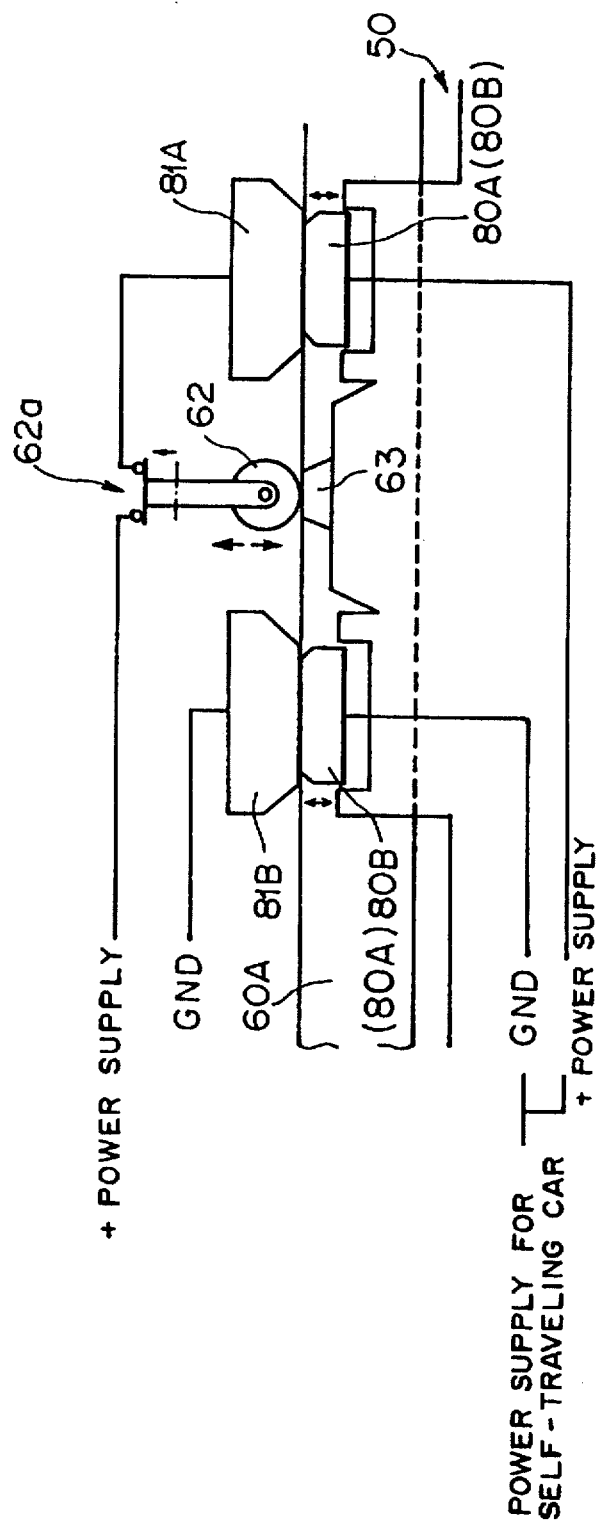
FIG. 50 is a schematic plan view showing a mechanism employed in the remaining money management system for supplying power for the robot mechanism of FIG. 41.

When the self-traveling car 50 arrives and stops, an arrival switch depression metal member 63 on the self-traveling car 50 is brought into contact with the contact roller 62 as seen in FIG. 50 to depress the contact roller 62 toward the ATM 11 (or the cassette station 53) side to turn the arrival sensor 61 into an on-state, thereby detecting arrival of the self-traveling car 50.

When the contact roller 62 is depressed to turn the arrival sensor 61 into an on-state upon arrival of the self-traveling car 50 as seen in FIG. 50, a power supply switch 62a provided for a power supply system for supplying power for the robot mechanism 50B is closed so that power for the robot mechanism 50B is supplied to the robot power section 94 (refer to FIG. 51) of the self-traveling car 50 as hereinafter described.

Further, as shown in FIGS. 46 and 50, faces of a pair of feeder terminals (power supply shoes) 81A and 81B are exposed to a face of the guide rail 60A adjacent the ATM 11 (or the cassette station 53) side with the arrival sensor 61 positioned therebetween.

Meanwhile, the current collection terminals 80A and 80B in pair are provided on the self-traveling car 50 side in an opposing relationship to the feeder terminals 81A and 81B, respectively, as shown in FIG. 40 or 50. As shown in FIG. 50, the current collection terminals 80A and 80B contact with the feeder terminals 81A and 81B, respectively, when the arrival switch depression metal member 63 depresses the contact roller 62 to turn the arrival sensor 61 and the power supply switch 62a on (that is, when the self-traveling car 50 stops at a normal position with respect to the ATM 11 (or the cassette station 53)). The current collection terminals 80A and 80B are provided resiliently in the widthwise direction of the self-traveling car 50 so that they may absorb an impact when they are brought into contact with the feeder terminals 81A and 81B, respectively.

Accordingly, only when the self-traveling car 50 arrives at the ATM 11 (or the cassette station 53) and stops at the normal position to put the arrival sensor 61 into an on-state, power for the robot mechanism 50B is supplied from the power supply section 54B of the station controller 54 to the self-traveling car 50 via the feeder terminals 81A and 81B and the current collection terminals 80A and 80B.

The reason why power is supplied to the feeder terminals 81A and 81B when the arrival sensor 61 is in an on-stage as described above is that it is intended to eliminate the possibility that, if a metal piece or a like conducting element should drop on the guide rail 60A or the guide rollers (positioning metal member) 79 of the self-traveling car 50 should be contacted with the feeder terminals 81A and 81B in a naked condition, short-circuiting may occur, thereby assuring the safety.

Figure 51:
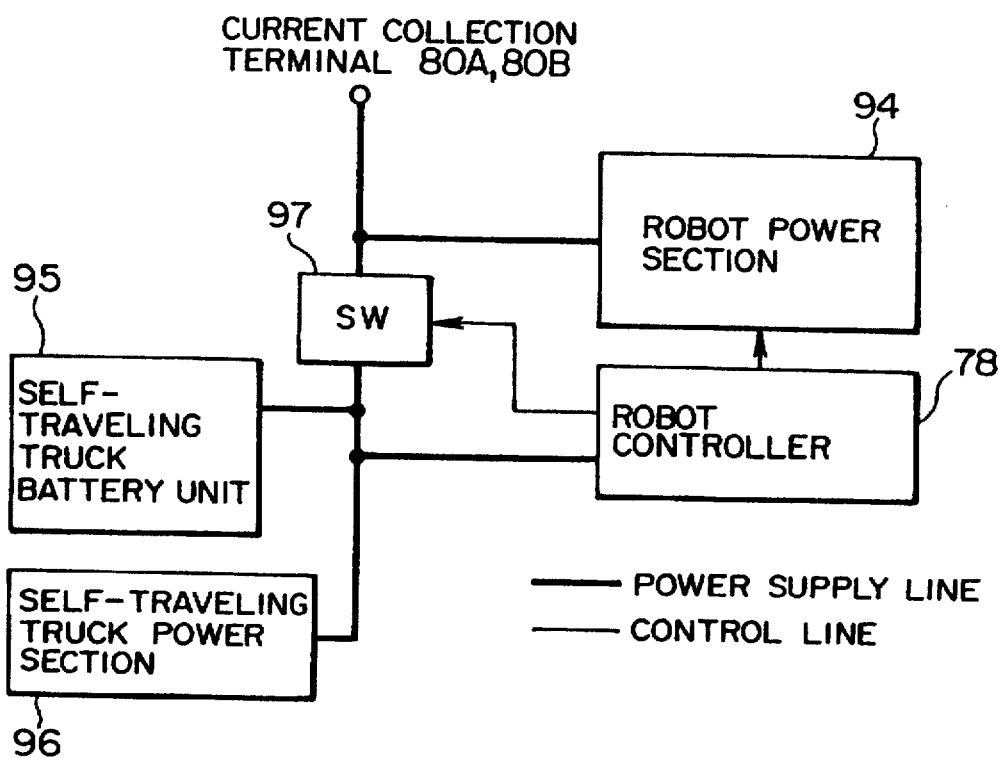
FIG. 51 is a block diagram showing a construction in the remaining money arrangement system for achieving a switching function for power for the robot mechanism of FIG. 41.

In the self-traveling car 50 to which power for the robot mechanism 50B is supplied as described above, power from the current collection terminals 80A and 80B is supplied to the robot power section 94 as seen in FIG. 51. The robot power section 94 is operated by the power thus supplied and drives the robot mechanism 50B.

Meanwhile, a self-traveling truck power section 96 for driving the robot control section 78 and the self-traveling truck 50A of the self-traveling car 50 receives and operates with power supplied thereto from a self-traveling track battery unit (self-traveling truck power supply) 95 provided in the self-traveling car 50 in advance.

In the present embodiment, a switch (switching circuit) 97 which is controlled to switch by the robot control section 78 is provided between the current collection terminals 80A and 80B and the self-traveling track battery unit 95. The switch 97 normally has an off state. However, when the self-traveling car 50 stops at a normal position with respect to an ATM 11 (or the cassette station 53) while the robot mechanism 50B of the self-traveling car 50 is inoperative, that is, when the self-traveling car 50 enters a waiting condition at the ATM 11 (or the cassette station 53), the switch 97 is switched to an on state by the robot control section 78 so that the self-traveling track battery unit 95 is charged with power supplied to the current collection terminals 80A and 80B.

With the construction described above, since power for the robot mechanism 50B is supplied from the feeder terminals 81A and 81B of the positioning mechanism 60 via the current collection terminals 80A and 80B on the self-traveling car 50 side only when arrival of the self-traveling car 50 at a normal position is detected by the arrival sensor 61 and the robot mechanism 50B must operate, the power supply for the robot mechanism 50B need not be provided on the self-traveling car 50. Consequently, the self-traveling car 50 can be constructed light and compact, and power can be supplied very efficiently.

Further, while the robot mechanism 50B is inoperative (while the self-traveling car 50 is in a waiting condition), since the self-traveling track battery unit 95 is automatically charged with power for the robot mechanism 50B via the switch 97, the peak of electric current consumed by the self-traveling car 50 can be moderated.

Subsequently, an automatic door compulsory closing function upon interruption of power supply by a backup battery provided in the station controller 54 will be described with reference to FIG. 52. When interruption of power supply occurs while the robot mechanism 50B of the self-traveling car 50 is performing a cash extraction or supplementing operation for an ATM 11 (or the cassette station 53), for the sake of security, interruption of the operation must be prevented while the automatic door 11D of the ATM 11 (or the cassette station 53) is left open.

Therefore, the station controller 54 in the present embodiment has a function of establishing, when interruption of power supply is detected, a battery backed up mode, completing the cash extraction or supplementing operation and compulsorily closing the automatic door 11D of the ATM 11 (or the cassette station 53).

Figure 52:
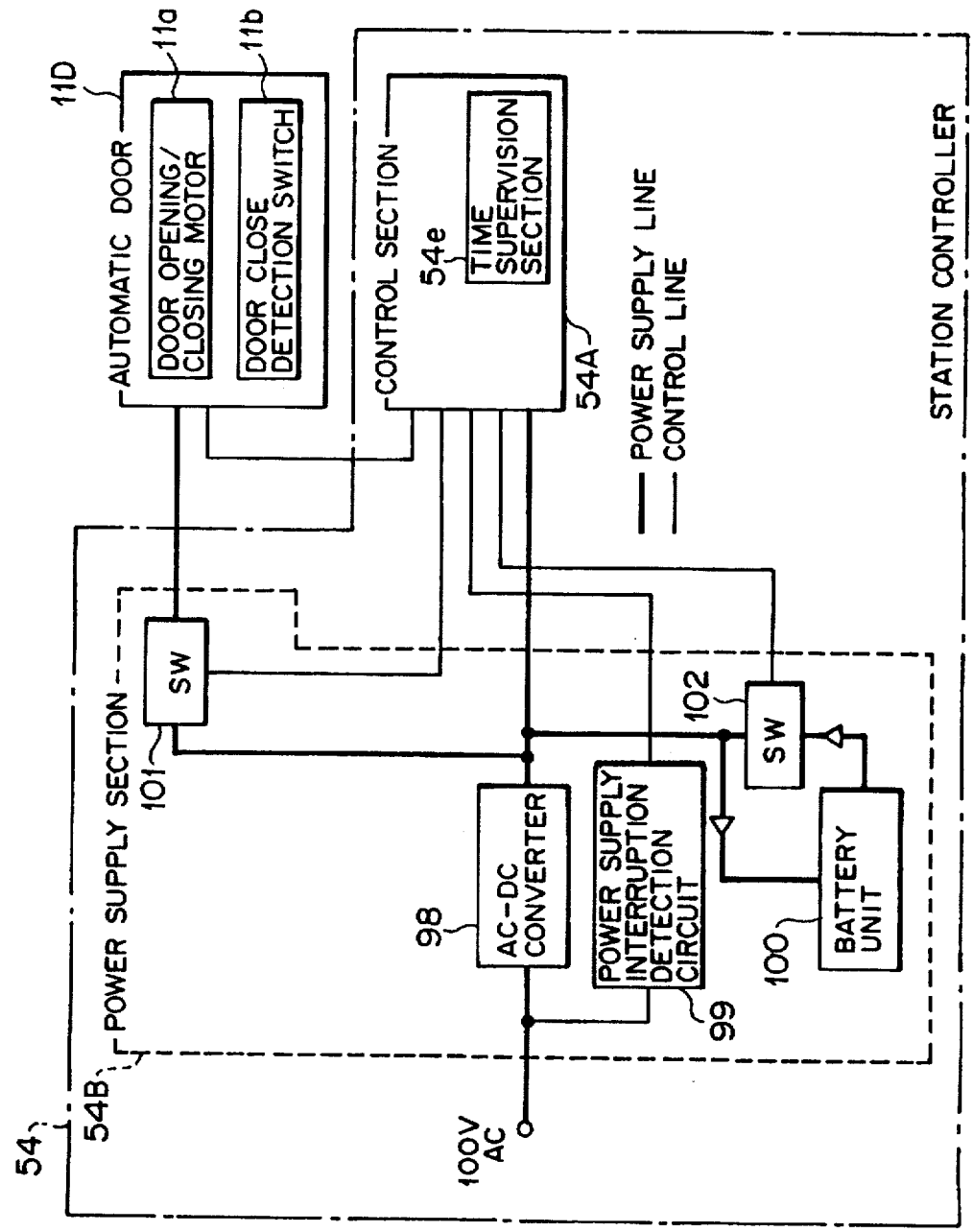
FIG. 52 is a block diagram showing a construction in the remaining money arrangement system for achieving an automatic door compulsory closing function by a station controller upon service interruption.

In particular, referring to FIG. 52, the power supply section 54B of the station controller 54 includes an AC-DC converter 98 for converting ac current of, for example, 100 volt into dc current, a power supply interruption detection circuit 99 for discriminating that interruption of power supply has occurred when the input of 100 volt to the input side of the AC-DC converter 98 becomes lower than a power supply interruption detection reference voltage and outputting a power supply interruption detection signal to the control section 54A, a battery unit 100 for providing backup power upon interruption of power supply, a switch 101 for connecting or disconnecting the power supply to or from the automatic door 11D or the robot mechanism 50B (not shown in FIG. 52), and another switch 102 for connecting or disconnecting the power supply to or from an output of the battery unit 100. The switches 101 and 102 are controlled between connection and disconnection by the control section 54A as hereinafter described.

The control section 54A includes a time supervision section 54e for supervising a lapse of time after it receives a power supply interruption detection signal from the power supply interruption detection circuit 99.

Further, each of the ATMs 11 (or the cassette station 53) includes a door opening/closing motor 11a provided adjacent the automatic door 11D for driving the automatic door 11D to slidably open or close, and a door close detection switch 11b provided adjacent the automatic door 11D for detecting a closed condition of the automatic door 11D.

An automatic door compulsory closing operation by the station controller 54 constructed in such a manner as described above (controlling operation of the control section 54A) upon interruption of power supply will be described in more detail.

First, when power supply is to be made available, the control section 54A closes the switch 101 in order to supply the power to the door opening/closing motor 11a of the automatic door 11D and also closes the switch 102 so that the automatic door 11D may be backed up by the battery power supply even if interruption of the power supply occurs at any time.

If interruption of the power supply is detected by the power supply interruption detection circuit 99 while ordinary processing is proceeding in this condition, then the control section 54A confirms a condition of the door close detection switch 11b of the automatic door 11D. If the automatic door 11D is in a closed condition, then the control section 54A disconnects the switch 101 to suppress the current consumed by the battery unit 100 and performs predetermined power interruption processing.

On the other hand, if the confirmation of the condition of the door close detection switch 11b of the automatic door 11D by the control section 54A reveals that the automatic door 11D is in an open condition, then while one of the switches 101 and 102 is left closed, the control section 54A supplies power from the battery unit 100 to the door opening/closing motor 11a of the automatic door 11D and the robot mechanism 50B (backing up by the battery). As a result of the backing up by the battery, the cash extraction or supplementing operation by the robot mechanism 50B is completed and the automatic door 11D of the ATM 11 (or the cassette station 53) is compulsorily driven to close. At a point of time when the closing of the automatic door 11D is detected by the door close detection switch 11b in this manner, the control section 54A disconnects the switches 101 and 102 and performs predetermined power interruption processing.

After the battery backup is started (after the power interruption is detected), the time supervision section 54e of the control section 54A measures the backup time. Even if closing of the automatic door 11D is not detected by the door close detection switch 11b at a time when the predetermined time passes after the battery backup is started, the control section 54A determines that the automatic door 11D cannot be closed because of some trouble, and disconnects the switches 101 and 102 and performs trouble ending processing.

In this manner, if interruption of power supply occurs while a cash extraction or supplementing operation by the self-traveling car 50 is proceeding with the automatic door 11D of an ATM 11 (or the cassette station 53) opened, then power is supplied until the cash extraction or supplementing operation by the self-traveling car 50 comes to an end and the automatic door 11D of the ATM 11 (or the cassette station 53) is closed, it can be prevented that processing is interrupted while the automatic door 11D of the ATM 11 (or the cassette station 53) is left open. Consequently, the safety against the robbery required for an apparatus which handles cash can be assured.

Further, in this instance, if the automatic door 11D remains in an open condition even if the lapse of time supervised by the time supervision section 54e after interruption of power is detected by the power supply interruption detection circuit 99 exceeds the predetermined time, trouble ending processing is performed by the control section 54A to eliminate the trouble.

By the way, in the present embodiment, since a plurality of ATMs 11 are covered by one self-traveling car 50, there is the possibility that the self-traveling car 50 may perform processing for an ATM different from that designated from the remaining money management terminal 18, which makes a problem in security management.

Therefore, in the present embodiment, when the automatic door 11D of an ATM 11 (or the cassette station 53) is to be opened in response to an instruction from the self-traveling car 50 side, the automatic door lid of the ATM 11 (or the cassette station 53) is opened only when a predetermined optical signal is transmitted from the self-traveling car 50 to the ATM 11 (or the cassette station 53).

Figure 53:
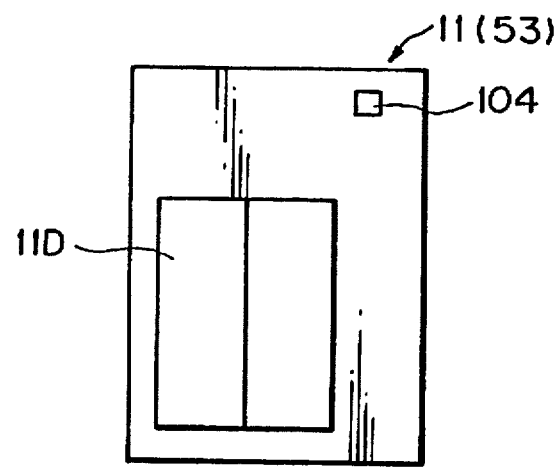
FIG. 53 is a schematic view showing the rear face of the ATM of FIG. 48 where a light reception element is provided.
Figure 54:
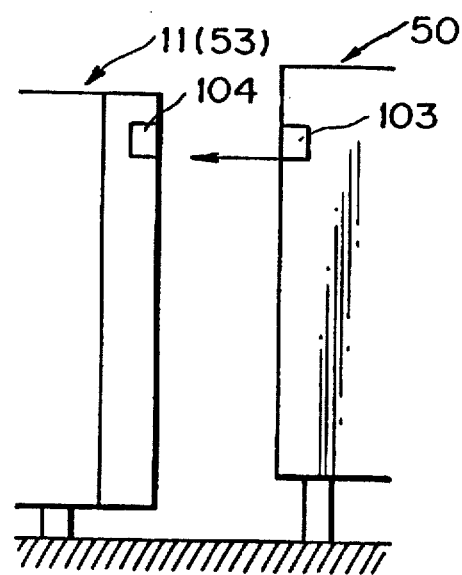
FIG. 54 is a schematic side elevational view illustrating an optical signal communication condition when the door of the ATM of FIG. 48 is automatically opened or closed.
Figure 55:
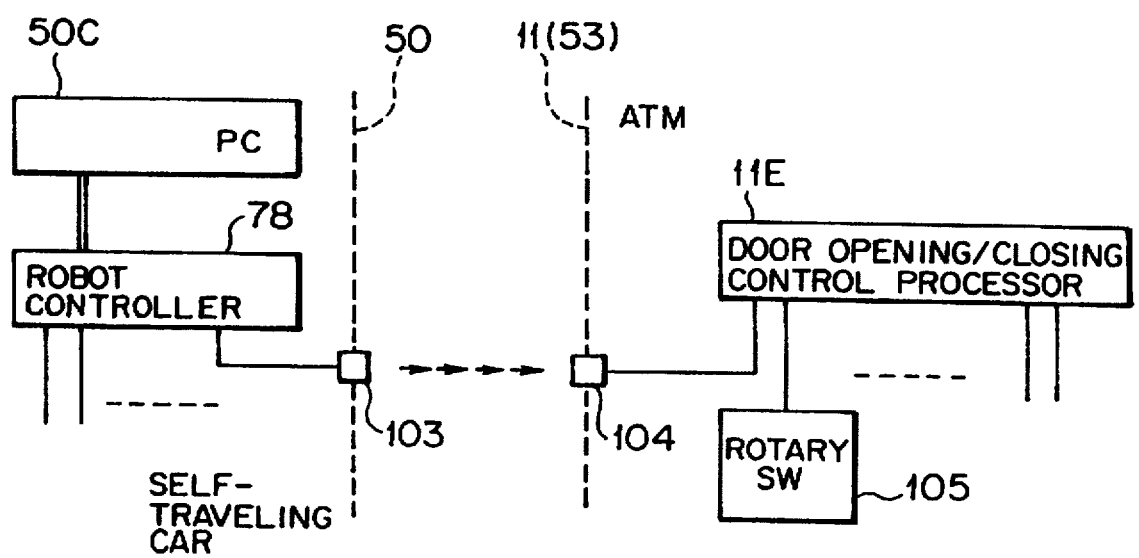
FIG. 55 is a block diagram showing a construction of an optical signal communication system of the ATM of FIG. 48 when the door of the ATM is automatically opened or closed.

Referring to FIGS. 53 to 55, a light emitting element (photoelectric switch) 103 is provided on a face of the self-traveling car 50 opposing to an ATM 11 (or the cassette station 53), and a light receiving element 104 for receiving the optical signal from the light emitting element 103 on the self-traveling car 50 side is provided on a rear face side of each of the ATMs 11 (or the cassette station 53).

Here, the locations of the light emitting element 103 and the light receiving element 104 are determined such that they are opposed to each other when the self-traveling car 50 stops at a normal position (described hereinabove with reference to FIG. 50) with respect to the ATM 11 (or the cassette station 53).

Further, as seen from FIG. 55, driving of the light emitting element 103 to emit light is controlled by the robot control section 78, and an optical signal received by the light receiving element 104 is processed by the door opening/closing control processor (automatic door control section) 11E. Each of the ATMs 11 includes a rotary switch 105 for setting an identification number (for example, of 4 bits×2) peculiar to the ATM 11 (or the cassette station 53) is provided on the ATM 11 side.

The door opening/closing control processor 11E has a function of performing collation between ID information obtained by decoding an optical signal received by the light receiving element 104 and the ID information set by the rotary switch 105 and driving, if the ID informations coincide with each other, the automatic door 11D to open.

With the construction described above, if the self-traveling car 50 travels in response to a moving instruction from the remaining money management terminal 18 and arrives at the rear face side of a predetermined ATM 11 (or the cassette station 53) and then the remaining money management terminal 18 receives arrival information of the self-traveling car 50 from the arrival sensor 61 of the ATM 11 (or the cassette station 53) via the station controller 54, then the remaining money management terminal 18 transmits an instruction to the self-traveling car 50 to open the automatic door 11D of the ATM 11 (or the cassette station 53).

Upon reception of the instruction, the robot control section 78 of the self-traveling car 50 drives the light emitting element 103 to emit and transmit an optical signal to the light receiving element 104 on the ATM 11 (or the cassette station 53) side. The driving condition for the light emitting element 103 upon such door opening instruction is such as illustrated in, for example, FIG. 56(a). In particular, a start code is set to the first 3 bits; door opening instruction data are set to the 4th to 11th bits; ATM number data (ID information) for specifying the ATM 11 (or the cassette station 53) are set to the 12th to 17th bits; a parity is set to the 18th bit; and an end code is set to the last 3 bits.

On the ATM 11 (or the cassette station 53) side, when such an optical signal as described above is received at the light receiving element 104, the optical signal is decoded by the door opening/closing control processor 11E, and only when the ATM number data included in the optical signal coincide with the ID information set to the rotary switch 105, the automatic door 11D is opened.

Also when an instruction to close the automatic door 11D which has been opened once is to be delivered from the self-traveling car 50 side, the robot control section 78 of the self-traveling car 50 drives the light emitting element 103 to emit and transmit an optical signal toward the light receiving element 104 on the ATM 11 (or the cassette station 53) side. The driving condition for the light emitting element 103 upon such door closing instruction is such as illustrated in, for example, FIG. 56(b). In particular, a start code is set to the first 3 bits; door closing instruction data are set to the 4th to 11th bits; ATM number data (ID information) for specifying the ATM 11 (or the cassette station 53) are set to the 12th to 17th bits; a parity is set to the 18th bit; and an end code is set to the last 3 bits.

Then, similarly as upon door opening instruction, on the ATM 11 (or the cassette station 53) side, when such an optical signal as described above is received at the light receiving element 104, the optical signal is decoded by the door opening/closing control processor 11E, and only when the ATM number data included in the optical signal coincide with the ID information set to the rotary switch 105, the automatic door 11D is closed.

Figures 56A, 56B:
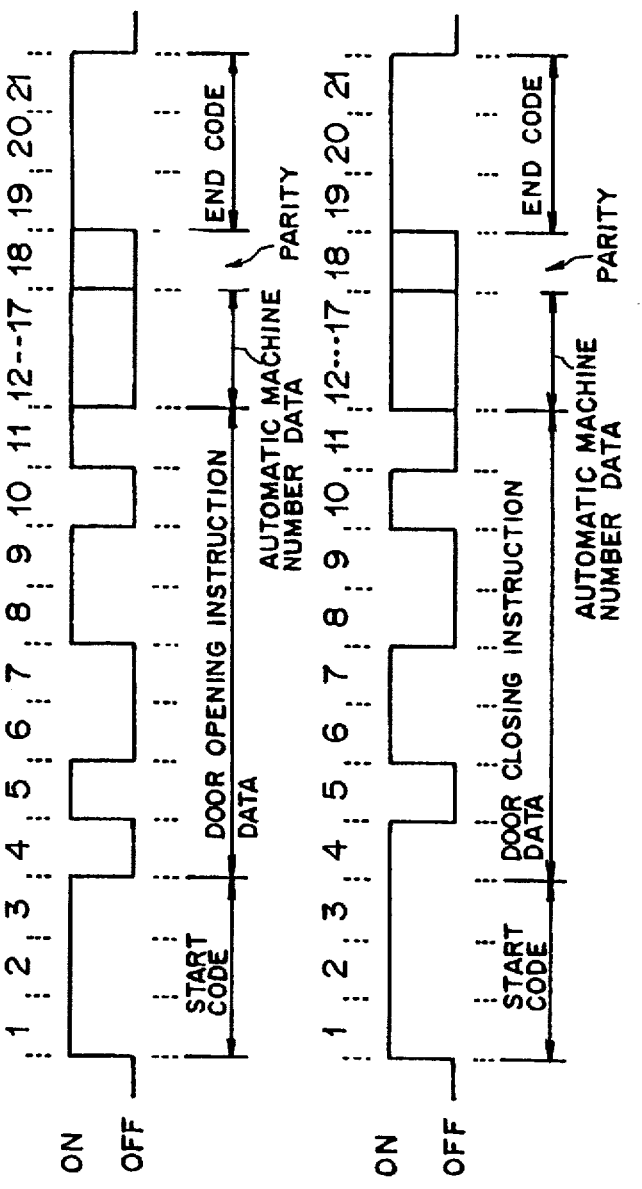
FIGS. 56(a) and 56(b) are waveform diagrams illustrating driving conditions of a light emitting element of the optical signal communication system of FIG. 55 when the door of the ATM is automatically opened or closed.

It is to be noted that the maximum time of one bit length in FIGS. 56(a) and 56(b) is set, for example, to approximately 50 msec.

In this manner, when the self-traveling car 50 is to open or close the automatic door 11D of any ATM 11 (or the cassette station 53), since an optical signal (ATM number data) for specifying the ATM 11 (or the cassette station 53) is emitted from the light emitting element 103 toward the light receiving element 104 of the ATM 11 (or the cassette station 53) and the automatic door 11D is opened by the door opening/closing control processor 11E only when the received optical signal is correct, such a situation that the self-traveling car 50 opens the automatic door 11D of a wrong ATM 11 (or the cassette station 53 in error) to perform a cash extraction or supplementing operation in error can be prevented with certainty. Consequently, the safety against the robbery required for an apparatus which handles cash can be assured.

It is to be noted that, although the automatic door opening and closing procedures based on an optical signal described hereinabove with reference to FIGS. 53 to 56 are applied quite similarly as described above to the cassette station 53, since the cassette station 53 in the present embodiment includes two keeping boxes 53A and an automatic door 11D is provided for each of the keeping boxes 53A, a light receiving element 104 is provided for each of the automatic doors 11D.

Figure 59:
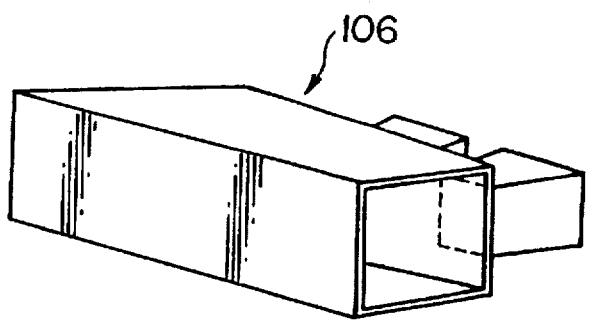
FIG. 59 is a perspective view showing a receipt roll supplement unit employed in the remaining money management system.
Figure 60:
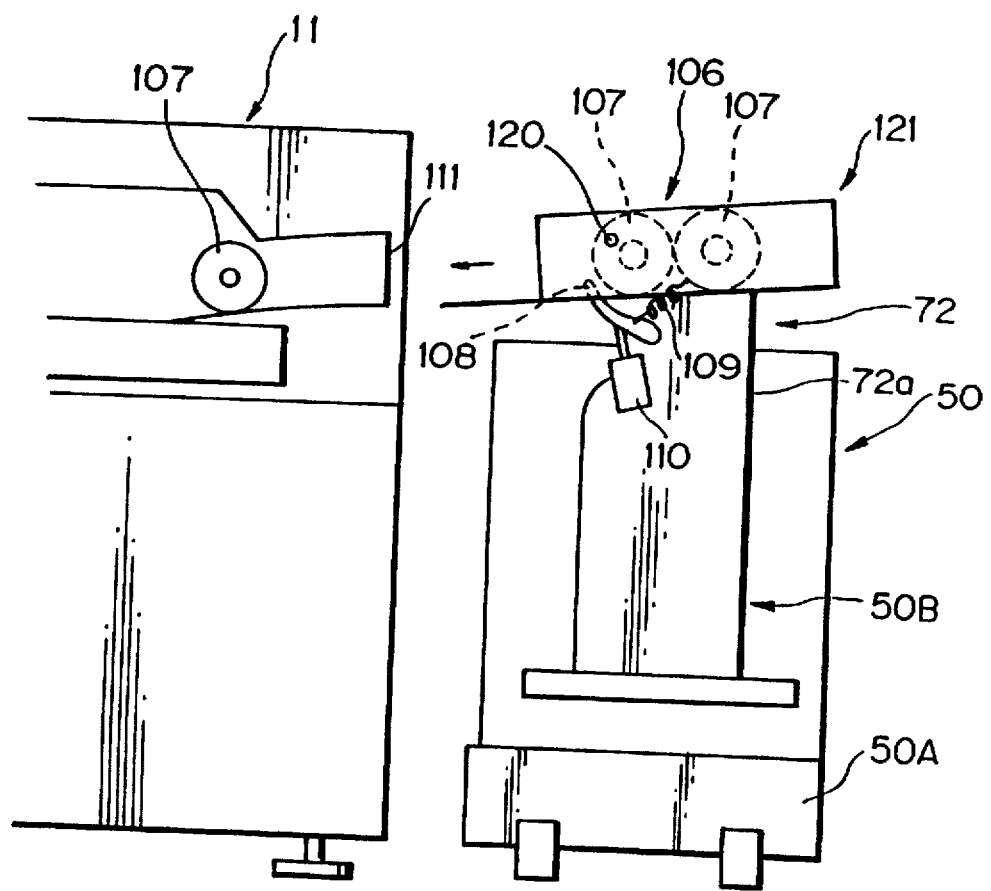
FIG. 60 is a side elevational view schematically showing a receipt roll supplementing mechanism employed in the remaining money management system.

While, in the embodiment described above, only removing or mounting processing of a cash cassette 22 is performed for any of the ATMs 11 (or the cassette station 53) by means of the self-traveling car 50, where the self-traveling car 50 has such a structure as shown in FIGS. 59 and 60, when the self-traveling car 50 performs a cash extraction or supplementing operation for any of the ATMs 11, processing of supplementing a receipt roll 107 to the ATM 11 can be performed additionally.

In particular, as shown in FIG. 60, a receipt roll supplementing mechanism (receipt paper supplementing mechanism) 121 is carried on the self-traveling car 50. As hereinafter described, the receipt roll supplementing mechanism 121 includes a receipt roll supplementing unit 106, a stopper 108, a spring 109, a stopper canceling magnet 110 and a receipt roll passage detection sensor 120.

The receipt roll supplementing unit 106 having such a construction as shown in FIG. 59 is mounted on a support post 72a of the handler section 72 of the robot mechanism 50B of the self-traveling car 50. The receipt roll supplementing unit 106 is mounted such that, when the handler section 72 is positioned at a removing and mounting operation position for a cash cassette 22 with respect to an ATM 11, a discharge port of the receipt roll supplementing unit 106 and a receipt roll inlet port 111 on the ATM 11 side may be positioned in a closely opposed relationship to each other at substantially same heights as seen in FIG. 60.

The stopper 108 is provided on the receipt roll supplementing unit 106 for controlling discharge of a receipt roll 107 as seen in FIG. 60. The stopper 108 is normally biased in a direction to prevent discharge of a receipt roll 107 by the spring 109.

The stopper canceling magnet 110 is energized by the robot control section 78 when a receipt roll 107 is to be discharged so as to be supplied to an ATM 11. When the stopper canceling magnet 110 is energized, the stopper 108 is moved downwardly against the biasing force of the spring 109 by an electromagnetic force of the magnet 110 to cancel the restriction of a receipt roll 107 by the stopper 108. After the restriction of the stopper 108 is canceled, the receipt roll 107 in the receipt roll supplementing unit 106 rolls along the slope and is supplemented into the ATM 11 through the receipt roll inlet port 111 on the ATM 11 side as indicated by an arrow mark.

The receipt roll passage detection sensor 120 for detecting passage of a receipt roll 107 is provided on a side face of the receipt roll supplementing unit 106. If passage of a receipt roll 107 is detected by the receipt roll passage detection sensor 120, then the stopper canceling magnet 110 is deenergized by the robot control section 78. Consequently, the stopper 108 is returned, by the biasing force of the spring 109, to the condition in which discharge of another receipt roll 107 is prevented.

In this manner, when a cash extraction or supplementing operation is performed for any ATM 11 by the self-traveling car 50, also supplementing of a receipt roll 107 into the ATM 11 can be performed simultaneously by the receipt roll supplementing mechanism 121 additionally provided on the robot mechanism 50B. This contributes very much to reduction of the burden to a staff member.

Finally, the cassette station 53 in the present embodiment described hereinabove with reference to FIG. 38, and particularly a construction of a portion of the cassette station 53 which relates to a locking mechanism provided for security management, will be described with reference to FIGS. 61 to 63.

Figure 61:
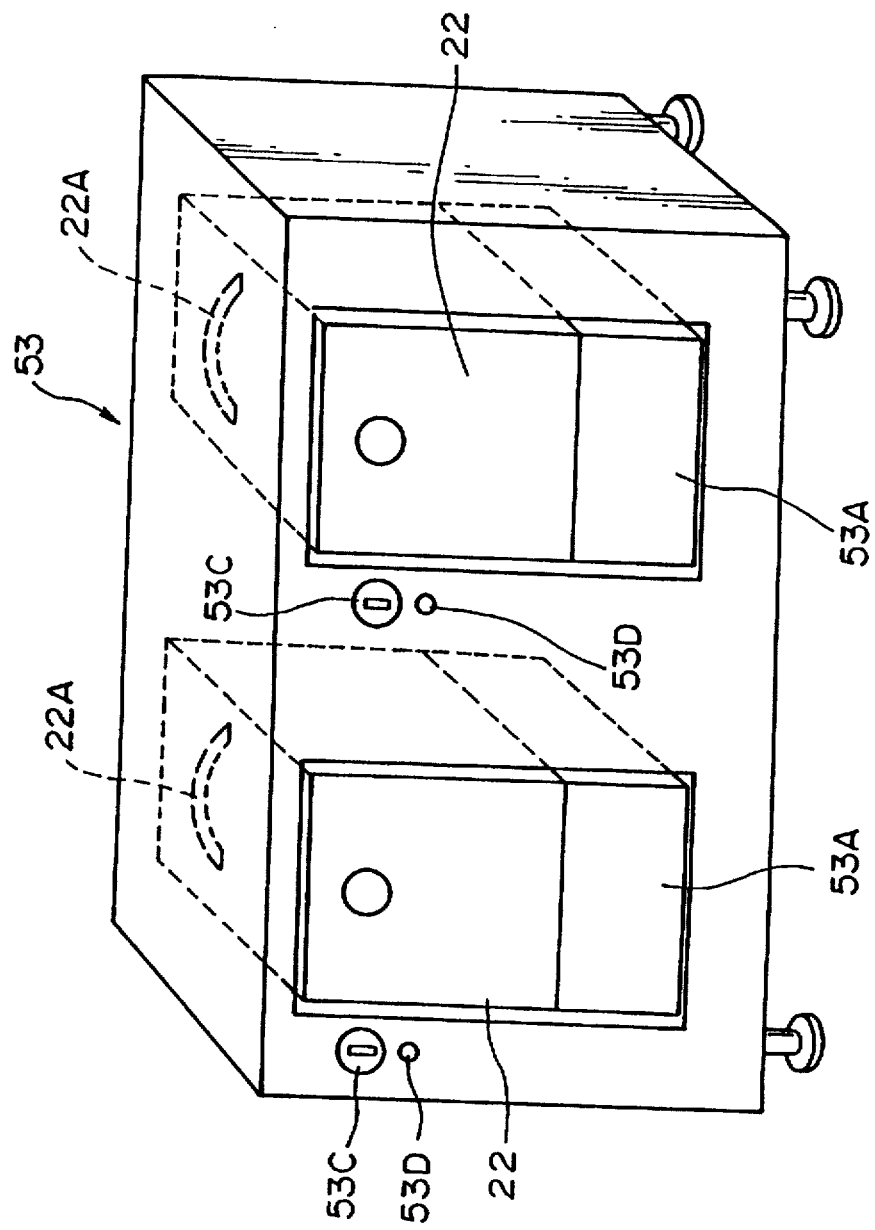
FIG. 61 is a perspective view schematically showing a cassette station employed in the remaining money management system.

The cassette station 53 keeps, for example, two cash cassettes 22 as shown in FIG. 61. Each of the cash cassettes 22 is mounted on and kept in a keeping box 53A, which is mounted for pivotal motion together with the cash cassette 22 around a pin 53B as shown in FIG. 62. By tilting the keeping box 53A and the cash cassette 22 to such an outwardly tilted condition as indicated by solid lines in FIG. 62, the cash cassette 22 can be removed from or mounted onto the cassette station 53 in a quite similar manner as in the removal or mounting operation procedure of a cash cassette 22 from or onto an ATM 11 described hereinabove with reference to FIGS. 57 and 58.

Figure 62:
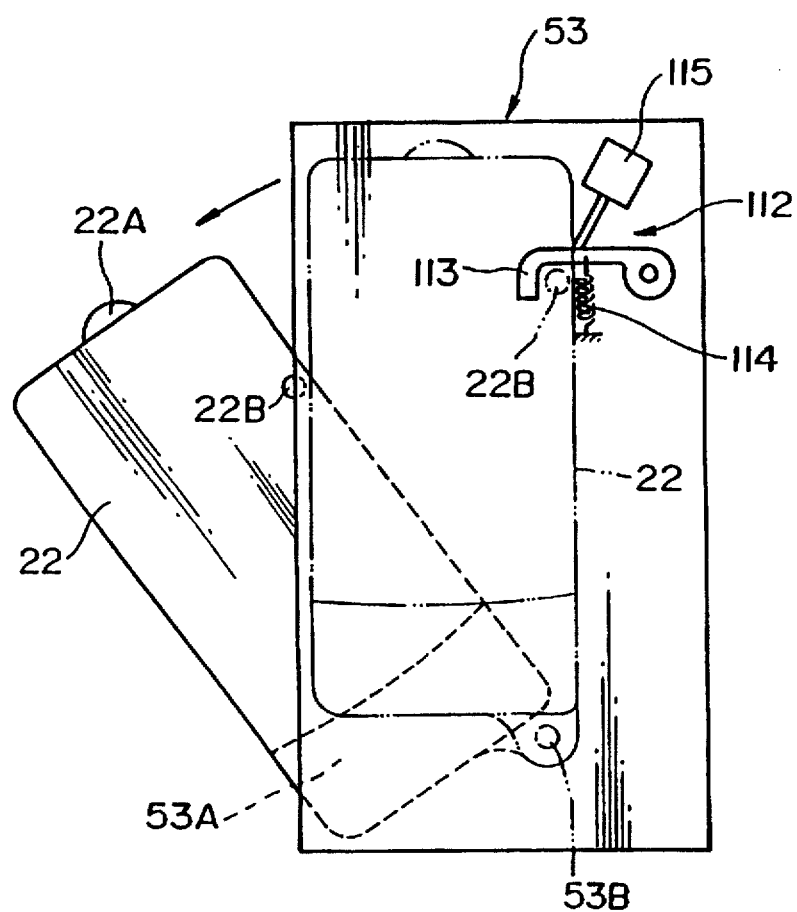
FIG. 62 is a side elevational view schematically showing a locking mechanism of the cassette station of FIG. 61.

As shown in FIGS. 61 to 63, the cassette station 53 includes, for each of the cash cassettes 22 (for each of the keeping boxes 53A), a key locking mechanism 53C and an electromagnetic locking mechanism 112 for restricting removal of the cash cassette 22 from the cassette station 53. Also a light emitting diode (LED) 53D for indicating whether a key operation is effective or ineffective is provided for each of the cash cassettes 22 (for each of the keeping boxes 53A).

In the following, structures of the key locking mechanism 53C and the electromagnetic locking mechanism 112 and operation of the locking mechanisms 53C and 112 will be described.

Referring to FIG. 62, the electromagnetic locking mechanism 112 includes a locking engagement member 22B securely mounted on a cash cassette 22, a locking member 113 engageable with the engagement member 22B for locking the cash cassette 22, a spring 114 for biasing the locking member 113 in a direction to engage with the engagement member 22B, and an electromagnetic locking cancellation magnet 115 which is energized when the electromagnetic locking is to be cancelled.

Upon electromagnetic locking by the electromagnetic locking mechanism 112, the electromagnetic locking cancellation magnet 115 is deenergized, and the locking member 113 is biased by the biasing force of the spring 114 in a direction in which it is engaged with the engagement member 22B as indicated by an alternate long and two short dashes line in FIGS. 62 and 63. Then, when the electromagnetic locking is to be canceled, the electromagnetic locking cancellation magnet 115 is energized so that, by an electromagnetic force of the magnet 115, the locking member 113 is moved in a direction which the engagement thereof with the engagement member 22B is cancelled against the biasing force of the spring 114 to cancel the electromagnetic locking.

As shown in FIG. 63, the locking member 113 is connected to a magnet clutch 119 by a wire 116 which is guided by a pair of pulleys 117 and 118. The magnet clutch 119 is directly coupled to a key cylinder of the key locking mechanism 53C.

When the magnet clutch 119 is in a deenergized and connecting condition, the key turning force when the key locking mechanism 53C is manually operated by means of a key is transmitted to the wire 116 via the magnet clutch 119. Consequently, by the key turning force, the locking member 113 is operated in a direction in which the engagement thereof with the engagement member 22B is cancelled against the biasing force of the spring 114 so that the locked condition of the cash cassette 22 (keeping box 53A) can be cancelled.

On the other hand, when the magnet clutch 119 is in an energized and disconnecting condition, the key turning force when the key locking mechanism 53C is manually operated by means of the key is not transmitted from the magnet clutch 119 to the wire 116 at all. Consequently, even if the key locking mechanism 53C is manually operated by means of the key, the locked condition of the cash cassette 22 (keeping box 53A) cannot be cancelled.

In the cassette station 53 which includes such locking mechanisms 53C and 112 as described above, when power supply is on and the cash cassettes 22 are kept therein, both of the key locking mechanism 53C and the electromagnetic locking mechanism 112 for each of the cash cassettes 22 always remain in their locking conditions. Since removal of the cash cassette 22 in the cassette station 53 is restricted by the key locking mechanism 53C and the electromagnetic locking mechanism 112, the cash cassette 22 cannot be pulled off arbitrarily from the keeping box 53A, thereby assuring the security against the robbery.

When the self-traveling car 50 is to pull off a cash cassette 22, an instruction from the remaining money management terminal 18 is notified to the cassette lock controller 53b via the cassette station controller 54b of the station controller 54 and the cassette communication controller 53a. Consequently, the electromagnetic locking cancellation magnet 115 is energized by the cassette lock controller 53b to cancel the locked condition of the cash cassette 22 (keeping box 53A).

It is to be noted that the automatic door opening and closing procedures based on an optical signal described hereinabove with reference to FIGS. 53 to 56 may be adapted to the cassette station 53 such that, when an optical signal (cassette station number data) which specifies the cassette station 53 is emitted from the light emitting element 103 of the self-traveling car 50 toward the light receiving element 104 of the cassette station 53 and the optical signal received by the light receiving element 104 is a correct optical signal, the electromagnetic locking cancellation magnet 115 is energized by the cassette lock controller 53b to cancel the locked condition of the cash cassette 22 (keeping box 53A).

On the other hand, when a staff member tries to pull off a cash cassette 22, since the magnet clutch 119 is normally in a deenergized and connecting condition, the locked condition of the cash cassette 22 (keeping box 53A) is cancelled by the staff member manually operating the key locking mechanism 53C by means of the key.

In this instance, if some processing (counting processing, automatic loading or extraction processing or some other processing) is proceeding for a cash cassette 22 in the cassette station 53 and removal of the cash cassette 22 should be restricted, the operation of the key is rendered ineffective by energizing the magnet clutch 119 into its disconnecting condition, thereby restricting removal of the cash cassette 22. Consequently, the cash cassette 22 can be prevented from being pulled off inadvertently by a staff member. When the magnet clutch 119 is energized to restrict unlocking by a key operation in this manner, this is notified to the staff member depending upon a lit condition of the LED 53D.

On the other hand, if power supply is put into an off condition, although the locking condition by the electromagnetic locking mechanism 112 is maintained, since the magnet clutch 119 always remains in a connecting condition, the locked condition of the cash cassette 22 (keeping box 53A) can be cancelled by manually operating the key locking mechanism 53C by means of the key.

It is to be noted that the magnet clutch 119 and the electromagnetic locking cancellation magnet 115 may be omitted so that the cash cassette 22 may be locked only by means of the key locking mechanism 53C. In this instance, in order for the self-traveling car 50 to cancel the locked condition of the cash cassette 22, a key operation to the cassette station 53 is performed directly using the lever operation unit 75 described hereinabove or some other means.

Further, in the embodiment described hereinabove, as it includes the cassette station 53 for removing or mounting a cash cassette 22 from or onto the self-traveling car 50, a staff member places a cash cassette 22 loaded with cash to be supplemented in position into the cassette station 53 or receives a cash cassette 22 holding extracted cash at the cassette station 53.

Or, for the location at which a cash cassette 22 is to be removed from or mounted onto the self-traveling car 50, an ATM 11 itself which is located, for example, nearest to a staff member may be used. In this instance, such a cassette station 53 as a separate component as described hereinabove need not be provided. Consequently, this contributes to simplification in construction and reduction in cost of the system.

Further, where an ATM 11 itself is used as a location for removal and mounting of a cash cassette 22 from and onto the self-traveling car 50, the amount of cash in a cash cassette 22 can be counted making use of a counting function which is inherent to the ATM 11 and a result of the counting can be notified to the remaining money management terminal 18. Consequently, the remaining money in the entire ATM group can be settled readily.

The present invention is not limited to the specifically described embodiment, and variations and modifications may be made without departing from the scope of the present invention.

What is claimed is:

1. A remaining money management system, comprising:
   one or more automatic cash transaction apparatus; and
   a remaining money management apparatus for managing remaining money amounts corresponding to cash accommodated in said automatic cash transaction apparatus based on transaction data from said automatic cash transaction apparatus;
   said remaining money management apparatus including a storage section for cumulatively storing transaction data from said automatic cash transaction apparatus, and a prediction section for calculating and predicting demanded cash amounts within a designated period of time for said automatic cash transaction apparatus based on the transaction data in the past stored in said storage section.

2. A remaining money management system as claimed in claim 1, wherein said prediction section
   calculates a mean value of the demanded cash amounts in the past based on the transaction data in the past stored in said storage section and converts, for each of qualitative factors which may have an influence on the demanded cash amount, a degree of influence of the qualitative factor on the demanded cash amount into a numerical value, and
   calculates a sum value of the mean value and the numerical data of the degrees of influence of the quality factors as a predicted value of the demanded cash amount.

3. A remaining money management system as claimed in claim 2, wherein said prediction section converts the degree of influence of each of the quality factors for each of said automatic cash transaction apparatus and produces and holds a prediction table of the numerical data for each of said automatic cash transaction apparatus.

4. A remaining money management system as claimed in claim 3, wherein said prediction table is produced for each of different currencies and after each fixed time interval.

5. A remaining money management system as claimed in claim 2, wherein said remaining money management apparatus calculates an error between an actual result value of the demanded cash amount and the predicted value of the demanded cash amount obtained by said prediction section and automatically selects, based on the error, a qualitative factor to be used for calculation of the predicted value of the demanded cash amount.

6. A remaining money management system as claimed in claim 1, wherein said prediction section predicts, before money is supplemented to said automatic cash transaction apparatus, demanded cash amounts for a period of time after the current money supplementing time until a next money supplementing time and outputs the predicted values as initial load money amounts to said automatic cash transaction apparatus.

7. A remaining money management system as claimed in claim 1, wherein said prediction section predicts demanded cash amounts per unit time of said automatic cash transaction apparatus and predicts demanded cash amounts on the real time basis till a predetermined point of time, normally supervises errors between actual remaining money amounts and the real time predicted values obtained by said prediction section, calculates amounts of cash to be supplemented or extracted with which the errors are canceled, and indicates the calculated amounts of cash to be supplemented or extracted.

8. A remaining money management system as claimed in claim 7, wherein said remaining money management apparatus
   calculates, for each of said automatic cash transaction apparatus, errors between actual remaining cash amounts and the real time predicted values obtained by said prediction section,
   discriminates, based on the errors calculated for each of said automatic cash transaction apparatus, one of said automatic cash transaction apparatus which requires cash to be supplemented thereto and another one of said automatic cash transaction apparatus which holds surplus cash, and
   develops an instruction to extract cash from the automatic cash transaction apparatus which holds surplus cash and supplement the extracted cash to the automatic cash transaction apparatus which requires cash to be supplemented thereto.

9. A remaining money management system as claimed in claim 8, wherein said remaining money management apparatus displays the instruction regarding the extraction and supplementing of cash so that a staff member referring to the displayed instruction may perform extraction and supplementing of cash from and to the relevant automatic cash transaction apparatus.

10. A remaining money management system as claimed in claim 8, further comprising a self-traveling robot for automatically performing extraction and supplementing of cash from and to the relevant automatic cash transaction apparatus, said remaining money management apparatus including a robot control section for controlling cash extraction and supplementing operations of said self-traveling robot in response to the instruction regarding the extraction and supplement of cash.

11. A remaining money management system as claimed in claim 10, wherein said remaining money management apparatus displays the instruction regarding the extraction and supplementing of cash so that, when said self-traveling robot is out of order or the extraction or supplementing of cash by said self-traveling robot is impossible, a staff member referring to the displayed instruction may perform extraction and supplementing of cash from and to the relevant automatic cash transaction apparatus.

12. A remaining money management system as claimed in claim 1, wherein said prediction section
   produces and holds, for each of said automatic cash transaction apparatus, a predicted error table of errors between actual result values of the demanded cash amount and predicted values of the demanded cash amount obtained by said prediction section is stored,
   calculates a standard deviation of the errors of the predictive error table as a standard error, and
   calculates a value obtained by multiplying the calculated standard error by a safety coefficient as a safety cash amount to be added to the predicted value of the demanded cash amount obtained by said prediction section.

13. A remaining money management system as claimed in claim 1, wherein said prediction section
   predicts, where a plurality of automatic cash transaction apparatus are involved, a total demanded cash amount for said plurality of automatic cash transaction apparatus,
   produces and holds a predicted error table of errors between sums of actual result values of the demanded cash amount of said plurality of automatic cash transaction apparatus and predicted values of the total demanded cash amounts obtained for said plurality of automatic cash transaction apparatus by said prediction section,
   calculates a standard deviation of the errors of said predicted error table as a standard error,
   multiplies the calculated standard error by a safety coefficient to obtain a safety cash amount to be added to the predicted value of the total demanded cash amount obtained for said plurality of automatic cash transaction apparatus by said prediction section, and
   distributes the calculated safety cash amount at a distribution ratio to said automatic cash transaction apparatus.

14. A remaining money management system as claimed in claim 13, wherein the safety cash amount is distributed equally to said plurality of automatic cash transaction apparatus.

15. A remaining money management system as claimed in claim 13, wherein the safety cash amount is distributed to said automatic cash transaction apparatus at a ratio of safety cash amounts individually calculated for said automatic cash transaction apparatus.

16. A remaining money management system as claimed in claim 13, wherein the safety cash amount is distributed to said automatic cash transaction apparatus at a ratio of squares of safety cash amounts individually calculated for said automatic cash transaction apparatus.

17. A remaining money management system as claimed in claim 1, wherein said prediction section predicts a predicted value of the demanded cash amount for each of said automatic cash transaction apparatus after the current point of time after each time interval and determines a point of time at which the predicted value coincides with a current remaining cash amount in the automatic cash transaction apparatus as an operable time.

18. A remaining money management system as claimed in claim 1, wherein, where said remaining money management apparatus is provided for each of a plurality of business offices, transaction data in the past of said plurality of business offices are analyzed to obtain a plurality of transaction form patterns to which said business offices individually belong, and in a first one of said business offices with which transaction data in the past to be used for prediction of demanded cash amounts by said prediction section are not cumulatively stored in said storage section, transaction data in the past of a second one of the other business offices which belongs to the same transaction form pattern as that of the first business office are stored into said storage section, said prediction section of the first business office predicting demanded cash amounts using the transaction data in the past of the second business office until new sufficient transaction data of the first business office are accumulated in said storage section.

19. A remaining money management system as claimed in claim 1, wherein, when an installation environment condition of said automatic cash transaction apparatus changes, a predicted value of a sum of demanded cash amounts obtained by said prediction section for said automatic cash transaction apparatus before the change of the installation environment condition is distributed at a distribution ratio to said automatic cash transaction apparatus after the change of the installation environment condition, and the thus distributed values are used as predicted values for said automatic cash transaction apparatus after the change of the installation environment condition.

20. A remaining money management system as claimed in claim 19, wherein the predicted value of the sum is distributed equally to said automatic cash transaction apparatus after the change of the installation environment condition.

21. A remaining money management system as claimed in claim 19, wherein the predicted value of the sum is distributed at a distribution ratio set by a staff member to said automatic cash transaction apparatus after the change of the installation environment condition.

22. A remaining money management system as claimed in claim 19, wherein the predicted value of the sum is distributed to said automatic cash transaction apparatus after the change of the installation environment condition at a distribution ratio calculated based on actual result data of said automatic cash transaction apparatus after the change of the installation environment condition.

23. A remaining money management system as claimed in claim 1, wherein an accounting system host computer connected by means of dedicated lines to said automatic cash transaction apparatus in a plurality of business offices functions as said remaining money management apparatus.

24. A remaining money management system as claimed in claim 1, wherein a staff member terminal provided at a window in a business office functions as said remaining money management apparatus.

25. A remaining money management system as claimed in claim 1, wherein transaction data of a staff member terminal provided at a window in a business office are cumulatively stored into said storage section, and said prediction section calculates and predicts demanded cash amounts within a designated time for said staff member terminal based on the transaction data in the past of said staff member terminal accumulated in said storage section.

26. A remaining money management system as claimed in claim 1, wherein a remote supervision apparatus connected by means of a communication line to said automatic cash transaction apparatus in a plurality of business offices functions as said remaining money management apparatus.

27. A remaining money management system as claimed in claim 21, wherein an instruction for said self-traveling robot to move to an object one of said automatic cash transaction apparatus and another instruction for said self-traveling robot to extract or supplement cash from or to the object automatic cash transaction apparatus are conveyed from said robot control section of said remaining money management apparatus to said self-traveling robot by a radio communication channel via a radio communication base station.

28. A remaining money management system as claimed in claim 21, wherein a free track for said self-traveling robot is formed from a magnetic tape applied to a floor, and said self-traveling robot includes a self-traveling truck for traveling along said free track while detecting said magnetic tape by means of a guiding magnetic sensor, and a robot mechanism mounted on said self-traveling truck for removing or mounting a cash cassette from or onto one of said automatic cash transaction apparatus from the rear side of the automatic cash transaction apparatus to perform extraction or supplementing of cash.

29. A remaining money management system as claimed in claim 28, wherein marking magnetic tapes for individually specifying positions of said automatic cash transaction apparatus are applied along said magnetic tape which forms said free track, and said self-traveling robot detects any of said marking magnetic tapes by means of a marking magnetic sensor to specify one of said automatic cash transaction apparatus designated by said robot control section.

30. A remaining money management system as claimed in claim 29, wherein a positioning apparatus for guiding a guide roller mounted on said self-traveling robot to control a stopping position of said self-traveling robot with respect to one of said automatic cash transaction apparatus is provided on a rear face side of each of said automatic cash transaction apparatus.

31. A remaining money management system as claimed in claim 30, wherein said positioning apparatus includes an arrival sensor for detecting that said self-traveling robot arrives and stops at one of said automatic cash transaction apparatus in order to extract or supplement cash from or to the automatic cash transaction apparatus.

32. A remaining money management system as claimed in claim 31, wherein said positioning apparatus includes a pair of feed terminals for supplying power for operating said robot mechanism of said self-traveling robot when said self-traveling robot stops while said self-traveling robot includes a pair of collection terminals for contacting with said feed terminals, and when said arrival sensor detects arrival of said self-traveling robot, power is supplied from said feed terminals to said collection terminals.

33. A remaining money management system as claimed in claim 32, wherein said self-traveling robot includes a switching circuit for automatically switching power for said robot mechanism supplied to said collection terminals so that the power may be used to charge a self-traveling car power supply while said self-traveling robot stops and said robot mechanism of said self-traveling robot is inoperative.

34. A remaining money management system as claimed in claim 32, wherein a power supply circuit for supplying power for said robot mechanism to said feed terminals is provided separately from a power supply circuit for supplying power to said automatic cash transaction apparatus.

35. A remaining money management system as claimed in claim 34, further comprising a station controller including an arrival sensor supervision section for supervising detection conditions of said automatic cash transaction apparatus by the arrival sensors in a concentrated manner and notifying the detection conditions by the arrival sensors as an operation condition of said self-traveling robot to said remaining money management apparatus, an operation panel for inputting an instruction to control the operation condition of said self-traveling robot, a power supply section for supplying power for said robot mechanism, and a door opening/closing supervision section for supervising an opening/closing condition of a rear side door of one of said automatic cash transaction apparatus which is opened when a cash extracting or supplementing operation is to be performed for the automatic cash transaction apparatus by said self-traveling robot.

36. A remaining money management system as claimed in claim 35, wherein said rear side door of any of said automatic cash transaction apparatus is automatically driven to open or close by power supplied from said power supply section of said station controller, and each of said automatic cash transaction apparatus includes a door control section for driving, when a cash extracting or supplementing operation by said self-traveling robot is to be performed for the automatic cash transaction apparatus, said rear side door to open to provide a space sufficient to allow said cash cassette to be removed or mounted from or onto the automatic cash transaction apparatus therethrough in response to an instruction from said self-traveling robot and for driving, when the removal or mounting of said cash cassette comes to an end, said rear side door to be closed.

37. A remaining money management system as claimed in claim 36, wherein said self-traveling robot includes a light emitting element for emitting an optical signal to open or close said rear side door of any of said automatic cash transaction apparatus while each of said automatic cash transaction apparatus includes a light receiving element for receiving the optical signal from said light emitting element, and, when to open or close said rear side door of one of said automatic cash transaction apparatus in order to perform a cash extraction or supplementing operation by said self-traveling robot, said light emitting element of said self-traveling robot emits an optical signal for the automatic cash transaction apparatus toward said light receiving element of the automatic cash transaction apparatus and, only when said light receiving element of the automatic cash transaction apparatus receives an optical signal specified for the automatic cash transaction apparatus, said door control section of the automatic cash transaction apparatus drives said rear side door to open or close.

38. A remaining money management system as claimed in claim 36, wherein each of said automatic cash transaction apparatus includes a door open/close detection sensor for detecting and notifying an open or closed condition of said rear side door of any of said automatic cash transaction apparatus to said door opening/closing supervision section, which supervises a detection condition by said door open/close detection sensor, and said station controller includes a service interruption detection circuit for detecting a service interruption of said power supply section, and a control section for causing, if the detection condition by said door open/close detection sensor is an open condition in any of said automatic cash transaction apparatus when a service interruption is detected by said service interruption detection circuit, power of a backup power supply to be supplied until said door open/close detection sensor detects that said rear side door of the automatic cash transaction apparatus enters a closing condition.

39. A remaining money management system as claimed in claim 38, wherein said station controller includes a time supervision section for supervising an elapsed time after detection of a service interruption by said service interruption detection circuit, and said control section stops the backup power supply and performs trouble ending processing if the detection condition of said door open/close detection sensor still is the open condition in the automatic cash transaction apparatus at a point of time when it is detected by said time supervision section that a fixed time elapses.

40. A remaining money management system as claimed in claim 28, wherein said robot mechanism includes a receipt paper supplementing apparatus for supplementing receipt paper to any of said automatic cash transaction apparatus.

41. A remaining money management system as claimed in claim 28, further comprising a cassette station for defining a location at which said cash cassette is removed from or mounted onto said self-traveling robot.

42. A remaining money management system as claimed in claim 41, wherein said cassette station includes a locking mechanism for restricting removal of said cash cassette from said cassette station.

43. A remaining money management system as claimed in claim 41, wherein said cassette station includes a counting apparatus for counting an amount of cash in said cash cassette, and an automatic cash loading and extracting apparatus for automatically loading or extracting cash into or from said cash cassette.

44. A remaining money management system as claimed in claim 28, wherein one of said automatic cash transaction apparatus is used as a location where said cash cassette is removed from or mounted onto said self-traveling robot.

45. A remaining money management system as claimed in claim 44, wherein an amount of cash in said cash cassette is counted making use of a counting function of the automatic cash transaction apparatus which is used as the location where said cash cassette is removed from or mounted onto said self-traveling robot, and a result of the counting is notified to said remaining money management apparatus.

* * * * *